(12) United States Patent
Peebler et al.

(10) Patent No.: US 12,724,578 B2
(45) Date of Patent: Sep. 1, 2026

(54) MULTIVIEW DISPLAY OF CONTENT ITEMS IN A COMPUTER-GENERATED ENVIRONMENT

(71) Applicant: Apple Inc., Cupertino, CA (US)

(72) Inventors: Bradley W. Peebler, Redwood City, CA (US); Danvin Ruangchan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/673,127

(22) Filed: May 23, 2024

(65) Prior Publication Data

US 2024/0402969 A1 Dec. 5, 2024

Related U.S. Application Data

(60) Provisional application No. 63/505,416, filed on May 31, 2023.

(51) Int. Cl.
*G06F 3/14* (2006.01)
*G06F 3/01* (2006.01)
(Continued)

(52) U.S. Cl.
CPC ................ *G06F 3/14* (2013.01); *G06F 3/013* (2013.01); *G06F 3/017* (2013.01);
(Continued)

(58) Field of Classification Search
CPC .......... G06F 3/011; G06F 3/013; G06F 3/017; G06F 3/0481; G06F 3/14;
(Continued)

(56) References Cited

U.S. PATENT DOCUMENTS 5,195,179 A 3/1993 Tokunaga
5,521,841 A 5/1996 Arman et al.
(Continued)

FOREIGN PATENT DOCUMENTS

EP 2631773 A2 8/2013
WO 2013/169849 A2 11/2013
(Continued)

OTHER PUBLICATIONS

LMAOWTF, "How to Change Camera Angle in Madden 23 (Xbox, Playstation, PC)", Available online at <https://www.youtube.com/watch?v=yNcTgV4JXiw>, [Retrieved from Internet on Aug. 13, 2024], Sep. 10, 2022, 1 page.
(Continued)

*Primary Examiner* — Ryan A Lubit
(74) *Attorney, Agent, or Firm* — Kubota & Basol LLP

(57) ABSTRACT

Displaying and updating content items in a primary viewing screen and one or more secondary viewing screens in a computer-generated environment is disclosed. The primary and secondary viewing screens can present different content items, or in some examples the secondary viewing screens can present content items that correspond to the content items in the primary viewing screen. A viewer can provide input to change the size and arrangement of the viewing screens, change the content items being displayed in the viewing screens, or change the designations (primary or secondary) of the viewing screens. The viewer can also establish criteria that can trigger the automatic updating of content items being displayed in the viewing screens. In some examples, a viewer can join a multi-user communication session to jointly view the primary viewing screen and the one or more secondary screens while maintaining control over some of the viewing screens.

49 Claims, 44 Drawing Sheets

(51) Int. Cl.
*H04N 21/218* (2011.01)
*H04N 21/431* (2011.01)
*H04N 21/472* (2011.01)

(52) U.S. Cl.
CPC ... *H04N 21/21805* (2013.01); *H04N 21/4312* (2013.01); *H04N 21/472* (2013.01)

(58) Field of Classification Search
CPC .... G06F 2203/04806; H04N 21/21805; H04N 21/2187; H04N 21/4312; H04N 21/4316; H04N 21/472; H04N 21/816
See application file for complete search history.

(56) References Cited

U.S. PATENT DOCUMENTS 5,760,767 A 6/1998 Shore et al.
5,852,435 A 12/1998 Vigneaux et al.
5,884,056 A 3/1999 Steele
6,069,606 A 5/2000 Sciammarella et al.
6,323,846 B1 11/2001 Westerman et al.
6,332,147 B1 12/2001 Moran et al.
6,463,444 B1 10/2002 Jain et al.
6,570,557 B1 5/2003 Westerman et al.
RE38,401 E 1/2004 Goldberg et al.
6,677,932 B1 1/2004 Westerman
RE38,609 E 10/2004 Chen et al.
6,807,361 B1 10/2004 Girgensohn et al.
7,143,362 B2 11/2006 Dieberger et al.
7,149,974 B2 12/2006 Girgensohn et al.
7,343,026 B2 3/2008 Niwa et al.
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
9,348,458 B2 5/2016 Hotelling et al.
9,361,521 B1 6/2016 Mclean et al.
9,933,937 B2 4/2018 Lemay et al.
10,203,762 B2 2/2019 Bradski et al.
10,298,643 B1 5/2019 Toal et al.
10,325,410 B1 6/2019 Smith et al.
10,491,943 B1 11/2019 Wahlquist-Ortiz et al.
10,491,958 B2 11/2019 Taylor et al.
10,531,137 B1 1/2020 Matak et al.
10,937,239 B2 3/2021 Huston et al.
11,606,608 B1 3/2023 Kalam
11,622,156 B1 4/2023 Mendell et al.
11,632,531 B1 4/2023 Bryan et al.
2002/0015024 A1 2/2002 Westerman et al.
2003/0184598 A1 10/2003 Graham
2003/0189588 A1 10/2003 Girgensohn et al.
2005/0162384 A1 7/2005 Yokoyama
2005/0190059 A1 9/2005 Wehrenberg
2006/0017692 A1 1/2006 Wehrenberg et al.
2006/0033724 A1 2/2006 Chaudhri et al.
2006/0090141 A1 4/2006 Loui et al.
2006/0103631 A1 5/2006 Mashima et al.
2006/0120624 A1 6/2006 Jojic et al.
2006/0197753 A1 9/2006 Hotelling
2006/0252541 A1 11/2006 Zalewski et al.
2007/0098350 A1 5/2007 Gibbon et al.
2008/0096654 A1 4/2008 Mondesir et al.
2009/0115902 A1* 5/2009 Fukushima ............ H04N 21/47 348/565
2010/0050082 A1 2/2010 Katz et al.
2011/0141359 A1 6/2011 Digiovanni et al.
2012/0102526 A1 4/2012 Lejeune
2012/0233640 A1 9/2012 Odryna et al.
2014/0062696 A1 3/2014 Packard et al.
2014/0258854 A1 9/2014 Li
2014/0289668 A1* 9/2014 Mavrody .............. G06F 1/1643 715/781
2015/0058730 A1 2/2015 Dubin et al.
2015/0103131 A1 4/2015 Denoue et al.
2015/0350639 A1* 12/2015 Maule .................. G06F 3/0481 348/187
2016/0066053 A1 3/2016 Bielman et al.
2016/0149956 A1 5/2016 Birnbaum et al.
2016/0182965 A1 6/2016 Peterson et al.
2016/0225012 A1 8/2016 Ha et al.
2017/0134778 A1 5/2017 Christie et al.
2017/0180780 A1 6/2017 Jeffries
2017/0264936 A1* 9/2017 Depies ............... G02B 27/0093
2017/0347144 A1 11/2017 Da Fonseca et al.
2018/0249113 A1* 8/2018 Faulkner .............. G11B 27/002
2018/0262782 A1 9/2018 Mateik et al.
2019/0014378 A1 1/2019 Shah et al.
2019/0206129 A1 7/2019 Khalid
2019/0236364 A1 8/2019 Hall
2019/0255386 A1* 8/2019 Trotter ............... A63B 24/0062
2019/0317657 A1 10/2019 Oddy
2019/0373322 A1* 12/2019 Rojas-Echenique ......................... H04N 21/472
2020/0201529 A1 6/2020 Mclean et al.
2021/0342590 A1* 11/2021 Choi ....................... G06T 11/60
2021/0397332 A1* 12/2021 Park ..................... H04N 23/633
2022/0100270 A1* 3/2022 Pastrana Vicente ......................... G06F 3/04842
2022/0121344 A1* 4/2022 Pastrana Vicente ......................... G06F 3/04815
2022/0229524 A1 7/2022 Mckenzie et al.
2022/0321944 A1 10/2022 Hosseini et al.
2023/0082513 A1 3/2023 Rowley
2023/0128243 A1 4/2023 Sundareson et al.
2023/0146677 A1* 5/2023 Woo ........................ G06F 3/017 345/156
2023/0276189 A1* 8/2023 Elff ........................ H04R 1/406 381/303
2023/0298242 A1* 9/2023 Djuric ..................... G06T 17/00 345/419
2023/0351758 A1* 11/2023 Kumar ................... G06V 20/52
2023/0360278 A1* 11/2023 Keller ................... G06T 3/4092
2024/0107118 A1 3/2024 Ellingford et al.
2024/0214521 A1* 6/2024 Zuo .................. H04N 21/44008
2024/0231741 A1* 7/2024 Agrawal ............. G06F 3/04842
2024/0355004 A1* 10/2024 Zaghetto .............. H04N 19/147
2024/0406490 A1 12/2024 Ruangchan et al.
2025/0247577 A1 7/2025 Chua et al.

FOREIGN PATENT DOCUMENTS

WO 2014/105276 A1 7/2014
WO 2023/034231 A1 3/2023

OTHER PUBLICATIONS

Madden Guides, "Madden NFL 23 Tips—Jailbreak Screen—Attacking Cover 0 Press Man", Available online at <https://www.youtube.com/watch?v=LuZ-lub9vkA>, [Retrieved from Internet on Aug. 13, 2024], Sep. 16, 2022, 2 pages.
Throne, "Playing Madden With An Eye-Tracker", Available online at <https://www.youtube.com/watch?v=xum92xmCnUc>, [Retrieved from Internet on Aug. 13, 2024], Jan. 29, 2022, 1 page.
Non-Final Office Action received for U.S. Appl. No. 18/677,782, mailed on Jul. 3, 2025, 13 pages.
International Search Report received for PCT Patent Application No. PCT/US2024/030869, mailed on Sep. 9, 2024, 5 pages.
International Search Report received for PCT Patent Application No. PCT/US2023/074974, mailed on Mar. 11, 2024, 6 pages.
Reichherzer, et al., "SecondSight: Demonstrating Cross-Device Augmented Reality", SIGGRAPH '21 Immersive Pavilion, Aug. 9-13, 2021, Virtual Event, USA, Retrieved from the internet: <https://dl.acm.org/doi/fullHtml/10.1145/3450615.3464545>, 2 pages.

(56) References Cited

OTHER PUBLICATIONS

Somolinos, José, "Augmented Reality disrupts Television", Medium, Feb. 28, 2019 [online], Retrieved from the internet: <https://medium.com/@josesomolinos/augmented-reality-disrupts-television-9d79ed01f27>, [retrieved on Jun. 12, 2025], 13 pages.
Zhu, et al., "BISHARE: Exploring Bidirectional Interactions Between Smartphones and Head-Mounted Augmented Reality", CHI '20, Apr. 25-30, 2020, Honolulu, USA, Retrieved from the internet: <https://dl.acm.org/doi/fullHtml/10.1145/3313831.3376233>, [retrieved on: Jun. 13, 2025], 10 pages.
Final Office Action received for U.S. Appl. No. 18/677,782, mailed on Oct. 20, 2025, 15 pages.
Non-Final Office Action received for U.S. Appl. No. 18/473,244, mailed on Aug. 25, 2025, 23 pages.
Notice of Allowance received for U.S. Appl. No. 18/677,782, mailed on Mar. 24, 2026, 9 Pages.

* cited by examiner

MULTIVIEW DISPLAY OF CONTENT ITEMS IN A COMPUTER-GENERATED ENVIRONMENT

CROSS-REFERENCE TO RELATED APPLICATIONS

This application claims the benefit of U.S. Provisional Application No. 63/505,416, filed May 31, 2023, the content of which is incorporated herein by reference in its entirety for all purposes.

FIELD OF THE DISCLOSURE

This relates generally to systems and methods of presenting multiple views of two-dimensional content items in a three-dimensional environment.

BACKGROUND OF THE DISCLOSURE

Some computer graphical environments provide two-dimensional and/or three-dimensional environments (e.g., extended reality environments) where at least some objects displayed for a user's viewing are virtual and generated by a computer. In some examples, the objects can include a virtual playback user interface that is displayed in the three-dimensional environment. Live content items (e.g., live content items such as sports, news, artistic performances, live streaming, and other events) and pre-recorded content items (e.g., television shows, movies, video, documentaries, animation, etc.) can be presented in a virtual playback user interface for a user's viewing. However, the live and pre-recorded content items that are displayed (e.g., the specific views or scenes of the content items) are at the discretion of the producer of those content items, and only one content item can be viewed at any one time.

SUMMARY OF THE DISCLOSURE

Some examples of the disclosure are directed to displaying live or pre-recorded content items in multiple virtual playback user interfaces (virtual viewing screens) including a primary viewing screen and one or more secondary viewing screens within an extended reality environment. The multiple viewing screens can be presented in a variety of arrangements. In some examples, a larger primary viewing screen is surrounded by one or more smaller secondary viewing screens, and in some instances the secondary viewing screens are grouped and clustered around the primary viewing screen in accordance with an established relationship. In some examples, the primary and secondary viewing screens are arranged in a two-dimensional grid or in a panoramic view. The multiple viewing screens can display content items from different events (e.g., different live content items, or different pre-recorded content items), or different views or information related to the same event (e.g., different camera angles or information related to the same live event, or different camera angles or information related to the same pre-recorded content items). In some examples, the viewer can change the location of multiple or individual viewing screens by manually selecting and moving the multiple or individual screens.

In some examples, the viewer can select the content item presented in the primary viewing screen, and also different content items presented in the one or more secondary viewing screens (e.g., content items that are unrelated to the content item being presented in the primary viewing screen).

For example, different baseball games, different movies, etc. can be presented in the primary viewing screen and the one or more secondary viewing screens. The selection of these different content items depends on the sources of content items available to the viewer. For example, an apparatus capable of presenting different content items in primary and secondary virtual viewing screens in an extended reality environment may be able to present content items obtained from streaming services, web browsers, connected storage devices, television feeds, and the like.

In other examples, the viewer may select video content items for presentation in the one or more secondary viewing screens that correspond to the content item being presented in the primary viewing screen. For example, different camera angles of the same baseball game, statistics relevant to the baseball game, different views of the same scene in a movie, biographies of the actors in a movie scene, etc. can be presented in the primary viewing screen and the one or more secondary viewing screens. However, the selection of these related video content items is dependent on the metadata present in the available content items, and/or the availability of alternate video data. For example, a live event may be captured by multiple video cameras at different locations, and although the producer of the content items will select one camera angle as the default view, the other related camera angles may be made available as alternate video data. Similarly, a pre-recorded event may also be captured by multiple video cameras at different locations, and although the producer of the content items will select one camera angle as the default view, the other related camera angles may be made available as alternate video data. These related video content items may be made available to the viewer for selection and presentation on one or more secondary viewing screens. Note that when the related video content items in the one or more secondary viewing screens are related in time to the content item being presented in the primary viewing screen (e.g., different camera angles of the same action in a baseball game, or different views of the same scene in a movie), then if the viewer scrubs through the content items in the primary viewing screen (e.g., uses an interface to move backwards or forwards in time), the related content items in the one more secondary viewing screens also change in time synchronization with the changing content items in the primary viewing screen.

In another example, the viewer may select informational content items for presentation in the one or more secondary viewing screens that corresponds to the content item being presented in the primary viewing screen. For example, the viewer of a baseball game in the primary viewing screen may select the fantasy points per game (FPPG) for each batter for presentation in a secondary viewing screen. If metadata is available identifying each player that makes a plate appearance, and the FFPG for each player is available in the metadata, that information can be presented in a secondary viewing screen. Alternatively, the FFPG for the identified player can be automatically retrieved from another source (e.g., over the Internet) and presented in the secondary viewing screen.

The content item presented in the primary viewing screen is typically intended to represent the current focus or interest of the viewer, while the content items of the one or more secondary viewing screens is intended present one or more secondary focuses or interests of the viewer. In recognition that the viewer's primary focus or interest may change over time, in some examples the viewer can change the content items being presented the primary and secondary viewing screens. In some examples, the viewer can change the content items of the primary and secondary viewing screens by placing the viewer's focus (e.g., gaze) on a secondary viewing screen for a predetermined duration to swap the content items of that secondary viewing screen and the primary viewing screen. In other examples, the viewer can manually switch the content items in the viewing screens using one or more gestures or user input. In still other examples, the content items of one of the secondary viewing screens can be automatically swapped with the content items of the primary viewing screen in accordance with pre-determined alerts (e.g., favorite player and/or team preferences, favorite actor, key words, etc.). For example, a sports viewer may pre-select a favorite player (e.g., Player 1), and select that player's current game (e.g., Game A) for presentation in a secondary viewing screen. If the video data for Game A includes metadata that indicates when Player 1 appears in the secondary viewing screen, that metadata can be detected and cause Game A to be presented in the primary viewing screen so that the viewer can watch Player 1 in the primary view (e.g., the primary viewing screen). In still other examples, the content items of one of the secondary viewing screens can be automatically swapped with the content items of the primary viewing screen in accordance with pre-determined significant moments. For example, an American football viewer may pre-select a two-minute warning as a significant moment, and also select a game (e.g., Game B) for presentation in a secondary viewing screen. If the video data for Game B includes metadata that indicates when the two-minute warning has been reached, that metadata can be detected and cause Game B to move into the primary viewing screen so that the viewer can watch the last two minutes of Game B in the primary view.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
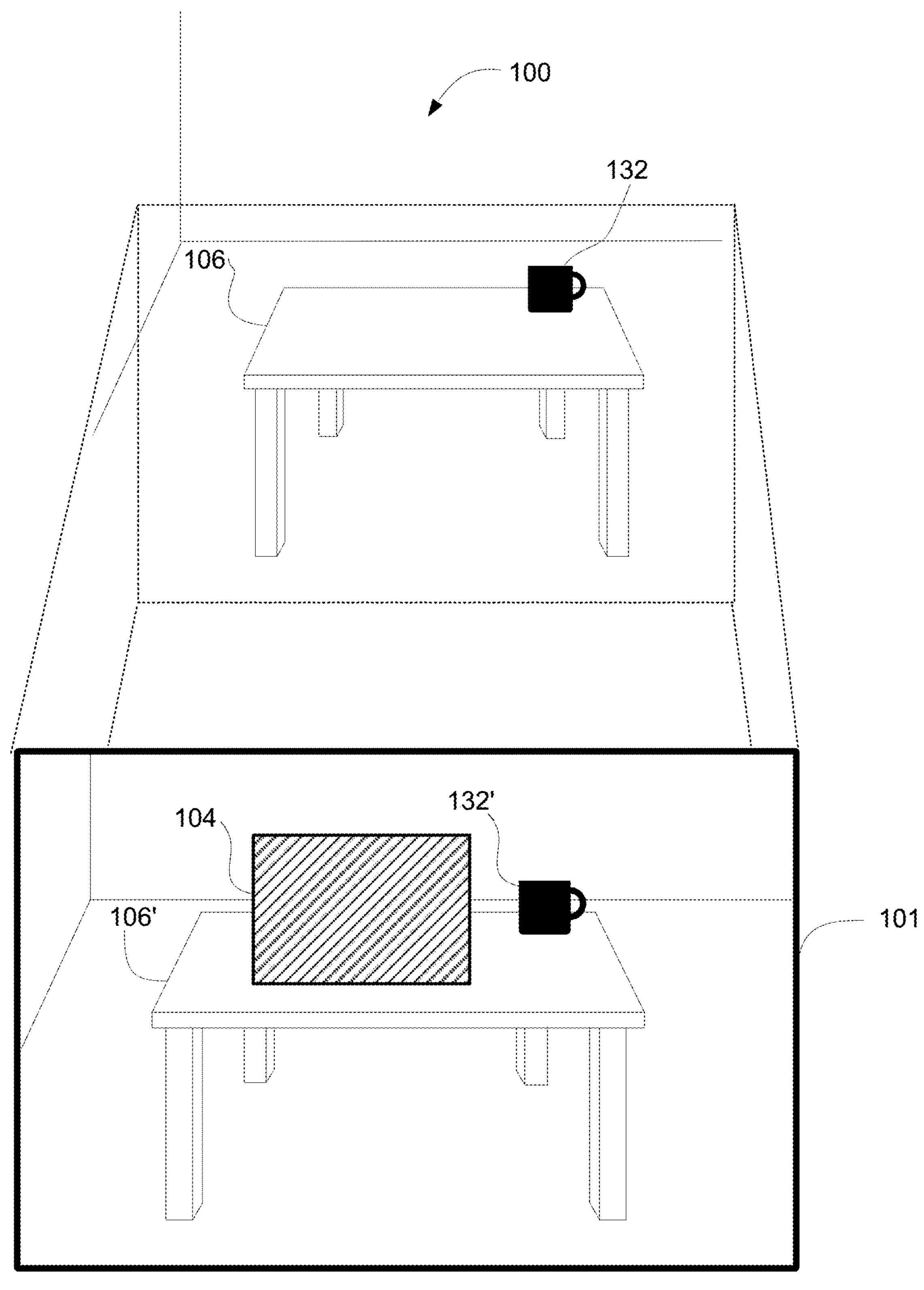
FIG. 1 illustrates an electronic device presenting an extended reality environment according to some examples of the disclosure.

Some examples of the disclosure are directed to displaying live or pre-recorded content items in multiple virtual playback user interfaces (virtual viewing screens) including a primary viewing screen and one or more secondary viewing screens within an extended reality environment. The multiple viewing screens can be presented in a variety of arrangements. In some examples, a larger primary viewing screen is surrounded by one or more smaller secondary viewing screens, and in some instances the secondary viewing screens are grouped and clustered around the primary viewing screen in accordance with an established relationship. In some examples, the primary and secondary viewing screens are arranged in a two-dimensional grid or in a panoramic view. The multiple viewing screens can display content items from different events (e.g., different live content items, or different pre-recorded content items), or different views or information related to the same event (e.g., different camera angles or information related to the same live event, or different camera angles or information related to the same pre-recorded content items). In some examples, the viewer can change the location of multiple or individual viewing screens by manually selecting and moving the multiple or individual screens.

In some examples, the viewer can select the content item presented in the primary viewing screen, and also different content items presented in the one or more secondary viewing screens (e.g., content items that are unrelated to the content item being presented in the primary viewing screen). For example, different baseball games, different movies, etc. can be presented in the primary viewing screen and the one or more secondary viewing screens. The selection of these different content items depends on the sources of content items available to the viewer. For example, an apparatus capable of presenting different content items in primary and secondary virtual viewing screens in an extended reality environment may be able to present content items obtained from streaming services, web browsers, connected storage devices, television feeds, and the like.

In other examples, the viewer may select video content items for presentation in the one or more secondary viewing screens that correspond to the content item being presented in the primary viewing screen. For example, different camera angles of the same baseball game, statistics relevant to the baseball game, different views of the same scene in a movie, biographies of the actors in a movie scene, etc. can be presented in the primary viewing screen and the one or more secondary viewing screens. However, the selection of these related video content items is dependent on the metadata present in the available content items, and/or the availability of alternate video data. For example, a live event may be captured by multiple video cameras at different locations, and although the producer of the content items will select one camera angle as the default view, the other related camera angles may be made available as alternate video data. Similarly, a pre-recorded event may also be captured by multiple video cameras at different locations, and although the producer of the content items will select one camera angle as the default view, the other related camera angles may be made available as alternate video data. These related video content items may be made available to the viewer for selection and presentation on one or more secondary viewing screens. Note that when the related video content items in the one or more secondary viewing screens are related in time to the content item being presented in the primary viewing screen (e.g., different camera angles of the same action in a baseball game, or different views of the same scene in a movie), then if the viewer scrubs through the content items in the primary viewing screen (e.g., uses an interface to move backwards or forwards in time), the related content items in the one more secondary viewing screens also change in time synchronization with the changing content items in the primary viewing screen.

In another example, the viewer may select informational content items for presentation in the one or more secondary viewing screens that corresponds to the content item being presented in the primary viewing screen. For example, the viewer of a baseball game in the primary viewing screen may select the fantasy points per game (FPPG) for each batter for presentation in a secondary viewing screen. If metadata is available identifying each player that makes a plate appearance, and the FFPG for each player is available in the metadata, that information can be presented in a secondary viewing screen. Alternatively, the FFPG for the identified player can be automatically retrieved from another source (e.g., over the Internet) and presented in the secondary viewing screen.

The content item presented in the primary viewing screen is typically intended to represent the current focus or interest of the viewer, while the content items of the one or more secondary viewing screens is intended present one or more secondary focuses or interests of the viewer. In recognition that the viewer's primary focus or interest may change over time, in some examples the viewer can change the content items being presented the primary and secondary viewing screens. In some examples, the viewer can change the content items of the primary and secondary viewing screens by placing the viewer's focus (e.g., gaze) on a secondary viewing screen for a predetermined duration to swap the content items of that secondary viewing screen and the primary viewing screen. In other examples, the viewer can manually switch the content items in the viewing screens using one or more gestures or user input. In still other examples, the content items of one of the secondary viewing screens can be automatically swapped with the content items of the primary viewing screen in accordance with pre-determined alerts (e.g., favorite player and/or team preferences, favorite actor, key words, etc.). For example, a sports viewer may pre-select a favorite player (e.g., Player 1), and select that player's current game (e.g., Game A) for presentation in a secondary viewing screen. If the video data for Game A includes metadata that indicates when Player 1 appears in the secondary viewing screen, that metadata can be detected and cause Game A to be presented in the primary viewing screen so that the viewer can watch Player 1 in the primary view (e.g., the primary viewing screen). In still other examples, the content items of one of the secondary viewing screens can be automatically swapped with the content items of the primary viewing screen in accordance with pre-determined significant moments. For example, an American football viewer may pre-select a two-minute warning as a significant moment, and also select a game (e.g., Game B) for presentation in a secondary viewing screen. If the video data for Game B includes metadata that indicates when the two-minute warning has been reached, that metadata can be detected and cause Game B to move into the primary viewing screen so that the viewer can watch the last two minutes of Game B in the primary view.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of electronic device 101 are described below with reference to the architecture block diagram of FIG. 2. As shown in FIG. 1, electronic device 101, table 106, and coffee mug 132 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106 and coffee mug 132 (illustrated in the field of view of electronic device 101). In some examples, in response to a trigger, the electronic device 101 may be configured to display a virtual object 104 (e.g., two-dimensional virtual content items, such as a two-dimensional user interface) in the computer-generated environment (e.g., represented by a rectangle illustrated in FIG. 1) that is not present in the physical environment 100, but is displayed in the computer-generated environment positioned on (e.g., anchored to) the top of a computer-generated representation 106' of real-world table 106. For example, virtual object 104 can be displayed on the surface of the computer-generated representation 106' of the table in the computer-generated environment next to the computer-generated representation 132' of real-world coffee mug 132 displayed via electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional computer-generated environment. For example, the virtual object can represent an application or a user interface displayed in the computer-generated environment. In some examples, the virtual object can represent content items corresponding to the application and/or displayed via the user interface in the computer-generated environment. In some examples, the virtual object 104 is optionally configured to be interactive and responsive to user input, such that a user may virtually touch, tap, move, rotate, or otherwise interact with, the virtual object 104. In some examples, while the virtual object 104 is displayed in the three-dimensional environment, the electronic device selectively moves the virtual object 104 in response to movement of a viewpoint of the user. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
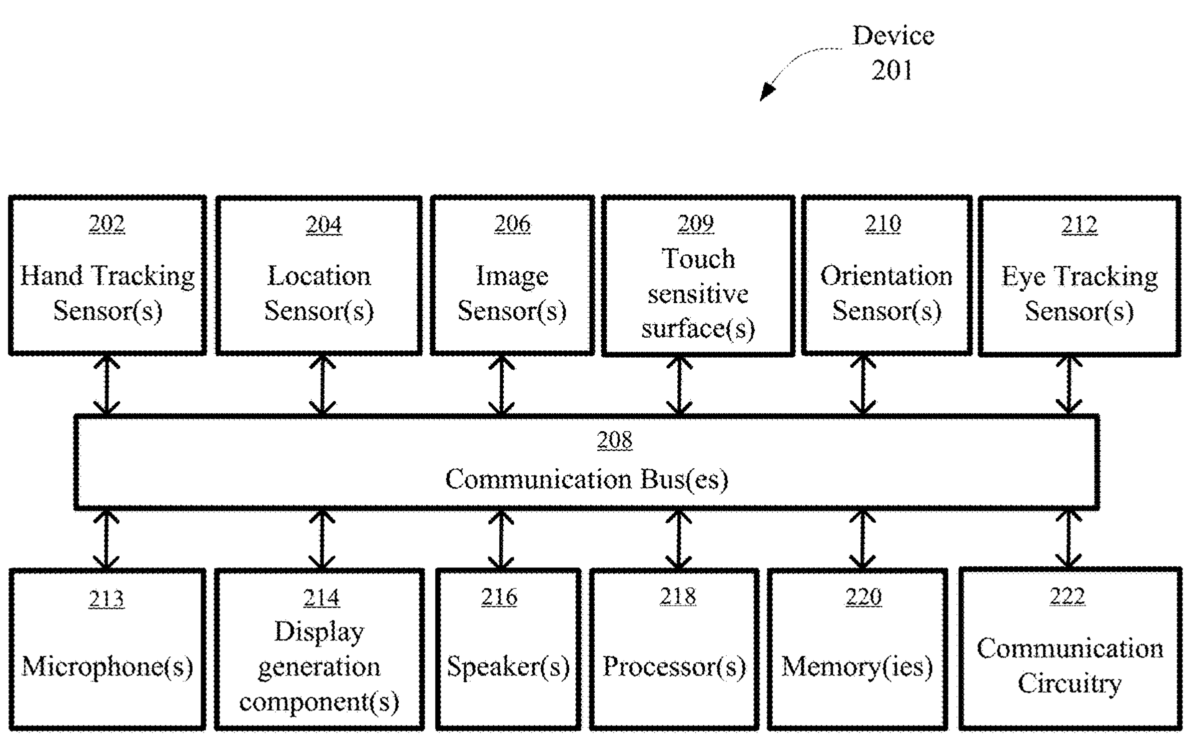
FIG. 2 illustrates a block diagram of an exemplary architecture for a device according to some examples of the disclosure.

FIG. 2 illustrates a block diagram of an exemplary architecture for an electronic device 201 according to some examples of the disclosure. In some examples, electronic device 201 includes one or more electronic devices. For example, the electronic device 201 may be a portable device, such as a mobile phone, smart phone, a tablet computer, a laptop computer, an auxiliary device in communication with another device, a head-mounted display, etc., respectively.

As illustrated in FIG. 2, the electronic device 201 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) (e.g., displays) 214, one or more speaker(s) 216, one or more processor(s) 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays, such as a stereo pair of displays. In some examples, display generation component(s) 214 can include a display with touch capability (e.g., a touch screen), a projector, a holographic projector, a retinal projector, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a GPS receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212, in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Electronic device 201 is not limited to the components and configuration of FIG. 2, but can include fewer, other, or additional components in multiple configurations. In some examples, electronic device 201 can be implemented between two electronic devices (e.g., as a system). A person or persons using electronic device 201, is optionally referred to herein as a user or users of the device.

Attention is now directed towards the display of live or pre-recorded content items in multiple virtual playback user interfaces (virtual viewing screens) including a primary viewing screen and one or more secondary viewing screens in a three-dimensional environment (e.g., an extended reality environment) presented at an electronic device (e.g., corresponding to electronic device 201) according to examples of the disclosure. As discussed below, the multiple viewing screens can be presented in a variety of arrangements. In some examples, a larger primary viewing screen is surrounded by one or more smaller secondary viewing screens, and in some instances the secondary viewing screens are grouped and clustered around the primary viewing screen in accordance with an established relationship. In some examples, the primary and secondary viewing screens are arranged in a two-dimensional grid or in a panoramic view. The multiple viewing screens can display content items from different events (e.g., different live content items, or different pre-recorded content items), or different views or information related to the same event (e.g., different camera angles or information related to the same live event, or different camera angles or information related to the same pre-recorded content items). The display, user interfaces, configuration, selection and manipulation (either manual or automatic) of the virtual primary viewing screen and the one or more virtual secondary viewing screens, as described below, may be associated with a video playback (or other type of) application stored in memory and executed by one or more processors operating within the electronic device of FIG. 2.

Figure 3A:
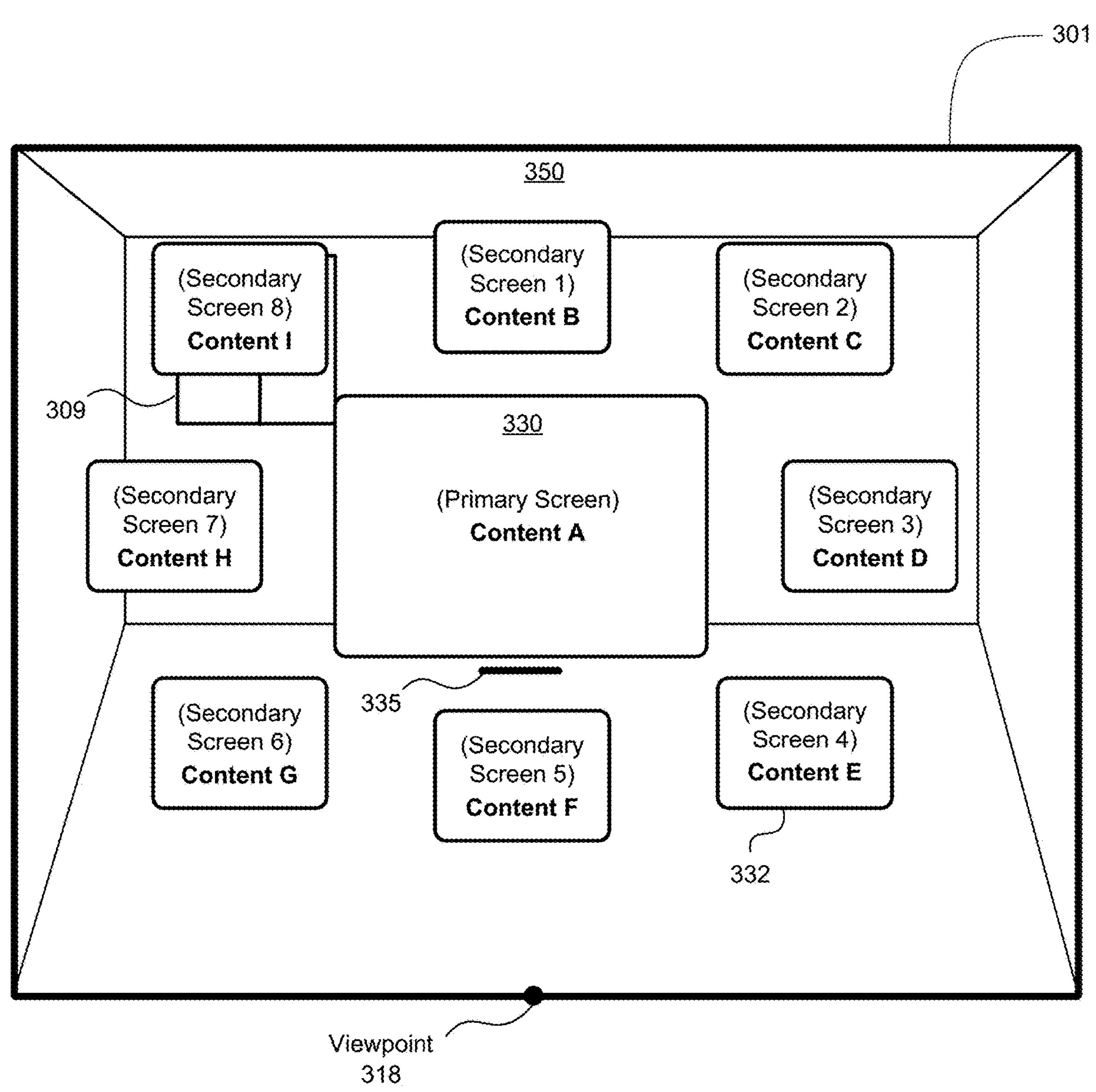
FIG. 3A illustrates the display of live or pre-recorded content items in multiple virtual viewing screens including a primary viewing screen and one or more secondary viewing screens in a 3D environment presented at an electronic device according to examples of the disclosure.

FIG. 3A illustrates the display of live or pre-recorded content items in multiple virtual playback user interfaces (virtual viewing screens) including a primary viewing screen and one or more secondary viewing screens in a 3D environment (e.g., an extended reality environment) presented at an electronic device (e.g., corresponding to electronic device 201) according to examples of the disclosure. In some examples, electronic device 301 may present 3D environment 350 (e.g., an extended reality environment). The electronic device 301 may be similar to electronic devices 101 or 201 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses).

In the example of FIG. 3A, a user is optionally wearing electronic device 301, such that 3D environment 350 can be defined by x, y and z axes as viewed from a perspective of the electronic device (e.g., viewpoint 318 associated with the user of the electronic device). Accordingly, as used herein, electronic device 301 is configured to be movable with six degrees of freedom based on the movement of the user (e.g., the head of the user), such that the electronic device may be moved in the roll direction, the pitch direction, and/or the yaw direction, as well as the front/back, side to side, and up/down directions. 3D environment 350 presented using electronic device 301 optionally includes captured portions of the physical environment surrounding the electronic device, such as a representation 309 of a physical window in the physical environment. Additionally, 3D environment 350 may include representations of the floor, ceiling, and walls of the room in which electronic device 301 is located. In some examples, the representations can include portions of the physical environment viewed through a transparent or translucent display of electronic device 301.

In some examples, primary viewing screen 330 is associated with a video playback application running on electronic device 301. In the example of FIG. 3A, primary viewing screen 330 is displaying a content item (e.g., "Content A"), which can be live or pre-recorded content items. As used herein, live content items refer to content items that are being broadcast and/or streamed live by a content items/media provider (e.g., a network, channel, company, etc.) of the live content items. Live content items are not available for playback at the electronic device 301 until it is broadcast/streamed by the content items provider for consumption at the electronic device 301. Additionally, in some examples, primary viewing screen 330 is configurable to display pre-recorded content items (e.g., other than live content items), such as on-demand content items (e.g., movies, television shows, sports games reruns, procedurally generated content, etc.) or scheduled programming that is readily available for consumption at the electronic device 301 (e.g., via a respective media browsing application). As shown in FIG. 3A, primary viewing screen 330 may be displayed with a grabber bar 335 (also referred to as a handlebar affordance) which is optionally selectable to initiate movement (e.g., translation or rotation) of primary viewing screen 330 (and optionally secondary viewing screens 332) within 3D environment 350.

In some examples, 3D environment 350 also includes one or more secondary viewing screens 332 associated with a video playback application running on electronic device 301. Although eight secondary viewing screens 332 are shown in the example of FIG. 3A, in other examples different numbers of secondary viewing screens in different arrangements around primary viewing screen 330 can also be employed. In some examples, each secondary viewing screen 332 is configured to display content items in 3D environment 350, such as two-dimensional video content items. In the example of FIG. 3A, secondary viewing screens 332 are displaying different content items (e.g., Content items B-I), which can be live or pre-recorded content items. In some examples, Content items A can be unrelated to Content items B-I (e.g., different sporting events, different movies, etc.). In other examples, Content items A can be related to or associated with Content items B-I (e.g., different camera angles of the same sporting event, different camera angles of the same scene in the same movie, etc.). The display, placement, size, viewer interaction, and switching of content items (either manually or automatically) of both primary viewing screen 330 and secondary viewing screens 332, as described below, can be performed under the control of software (collectively referred to herein as a multi-view playback application) running on electronic device 301. To accomplish this, the multi-view playback application can access the video feeds and/or data of a plurality of live or pre-recorded content items including, in some instances, video feeds and/or data from multiple camera angles of the same event. In addition, the multi-view playback application can detect metadata embedded in the video feeds and/or data to obtain information about the video.

Figure 3B:
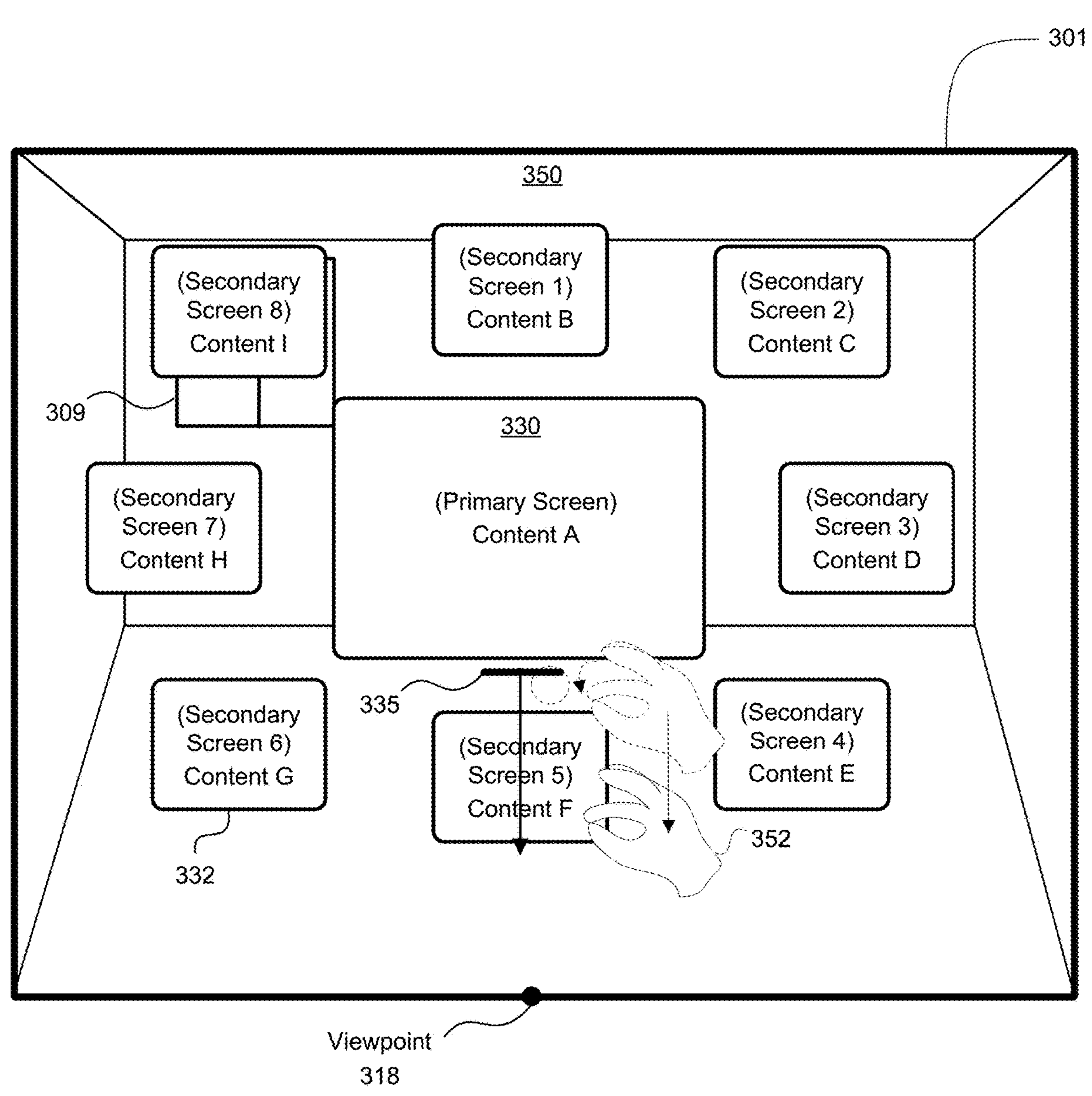
FIG. 3B illustrates the performance of a gesture in a 3D environment to pull a primary viewing screen and a plurality of secondary viewing screens closer to the viewer (thereby enlarging the size of the virtual screens in the 3D environment) according to some examples of the disclosure.

FIG. 3B illustrates the performance of a gesture in 3D environment 350 to pull primary viewing screen 330 and the plurality of secondary viewing screens 332 closer to the viewer (thereby enlarging the size of the virtual screens in the field of view of 3D environment), or push the primary viewing screen and the plurality of secondary viewing screens farther away from the viewer (thereby reducing the size of the virtual screens in the field of view of 3D environment) according to some examples of the disclosure. To accomplish this, in some examples the viewer can perform a pinch and drag gesture within a certain threshold virtual distance of grabber bar 335 by manipulating the viewer's hand to pinch a thumb and index finger together, and while holding the pinch, dragging the hand closer or farther away from the viewer. However, it should be understood that other gestures or viewer input can also be employed to pull or push the virtual viewing screens in different directions. In some examples, the pinch and drag gesture (or other gestures or inputs) can be employed to move primary viewing screen 330 and the plurality of secondary viewing screens 332 left or right, or more generally in any x-y-z location in 3D environment 350. In some examples, primary viewing screen 330 and the plurality of secondary viewing screens 332 can maintain their relative sizes and spacings within 3D space while moving around in 3D environment 350. In other examples, primary viewing screen 330 and the plurality of secondary viewing screens 332 can maintain their relative sizes and spacings within the field of view of 3D environment 350 by adjusting their sizes and spacings within 3D space while moving around in 3D environment. In some examples, while performing the pinch and drag gesture, a representation of the viewer's hand 352 can appear in 3D environment 350, and in other examples, the viewer's physical hand can be viewed through a transparent or translucent display of electronic device 301 and seen in the 3D environment as an optical see-through object.

Figure 3C:
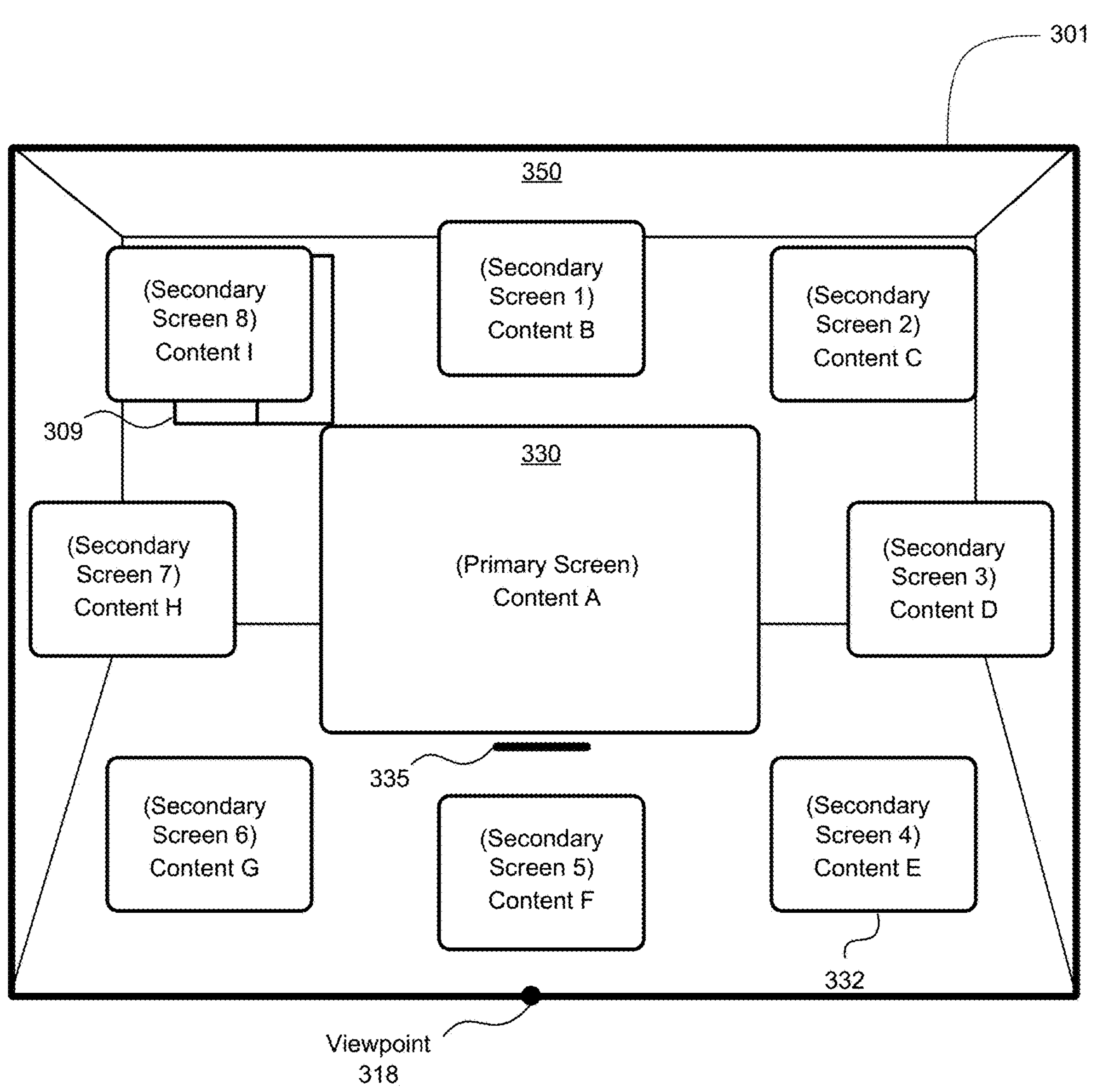
FIG. 3C illustrates the conclusion of the pinch and drag forward gesture of FIG. 3B resulting in the primary viewing screen and secondary viewing screens becoming enlarged and easier to view in the 3D environment according to some examples of the disclosure.

FIG. 3C illustrates the conclusion of the pinch and drag forward (toward the user) gesture of FIG. 3B, resulting in primary viewing screen 330 and secondary viewing screens 332 becoming enlarged within the field of view and easier to view in 3D environment 350 according to some examples of the disclosure. Although not shown, a pinch and drag backward gesture can also be performed to cause the virtual viewing screens to become smaller.

Figure 3D:
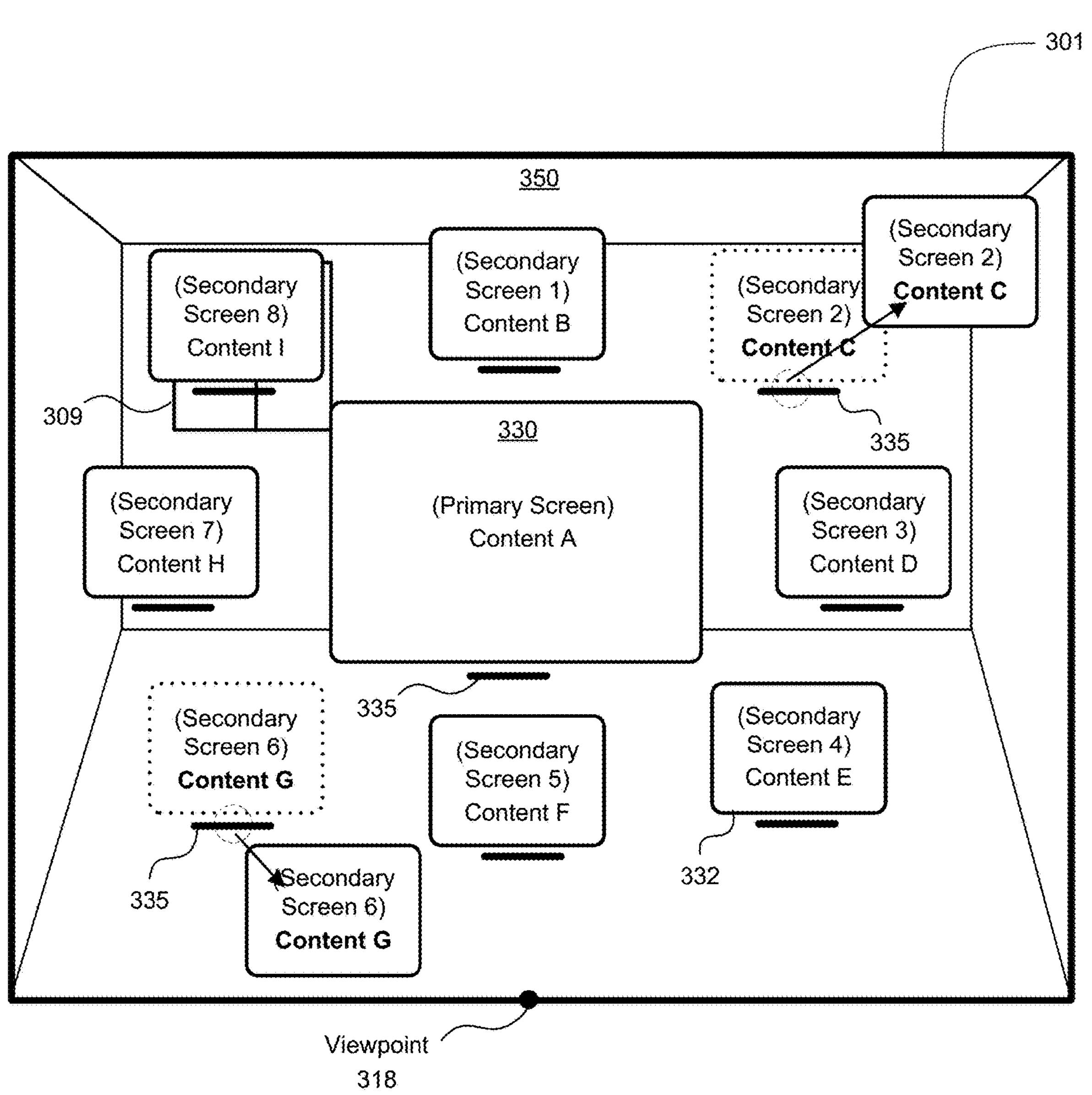
FIG. 3D illustrates the manual repositioning of one or more secondary viewing screens according to some examples of the disclosure.

FIG. 3D illustrates the manual repositioning of one or more secondary viewing screens 332 according to some examples of the disclosure. In the example of FIG. 3D, the plurality of secondary viewing screens 332 each have an associated grabber bar 335, and the viewer has performed a pinch and drag gesture on those grabber bars to reposition Secondary Screen 2 to a location to the right and above its original location, and reposition Secondary Screen 6 to a location to the right and below its original location. (Note that the term "Secondary Screen" is used herein to identify specific secondary viewing screens in the figures.) However, in other examples, each of the plurality of secondary viewing screens 332 can be repositioned in any x-y-z direction with respect to primary viewing screen 330 using gestures or viewer inputs other than a pinch and drag gesture.

Figure 3E:
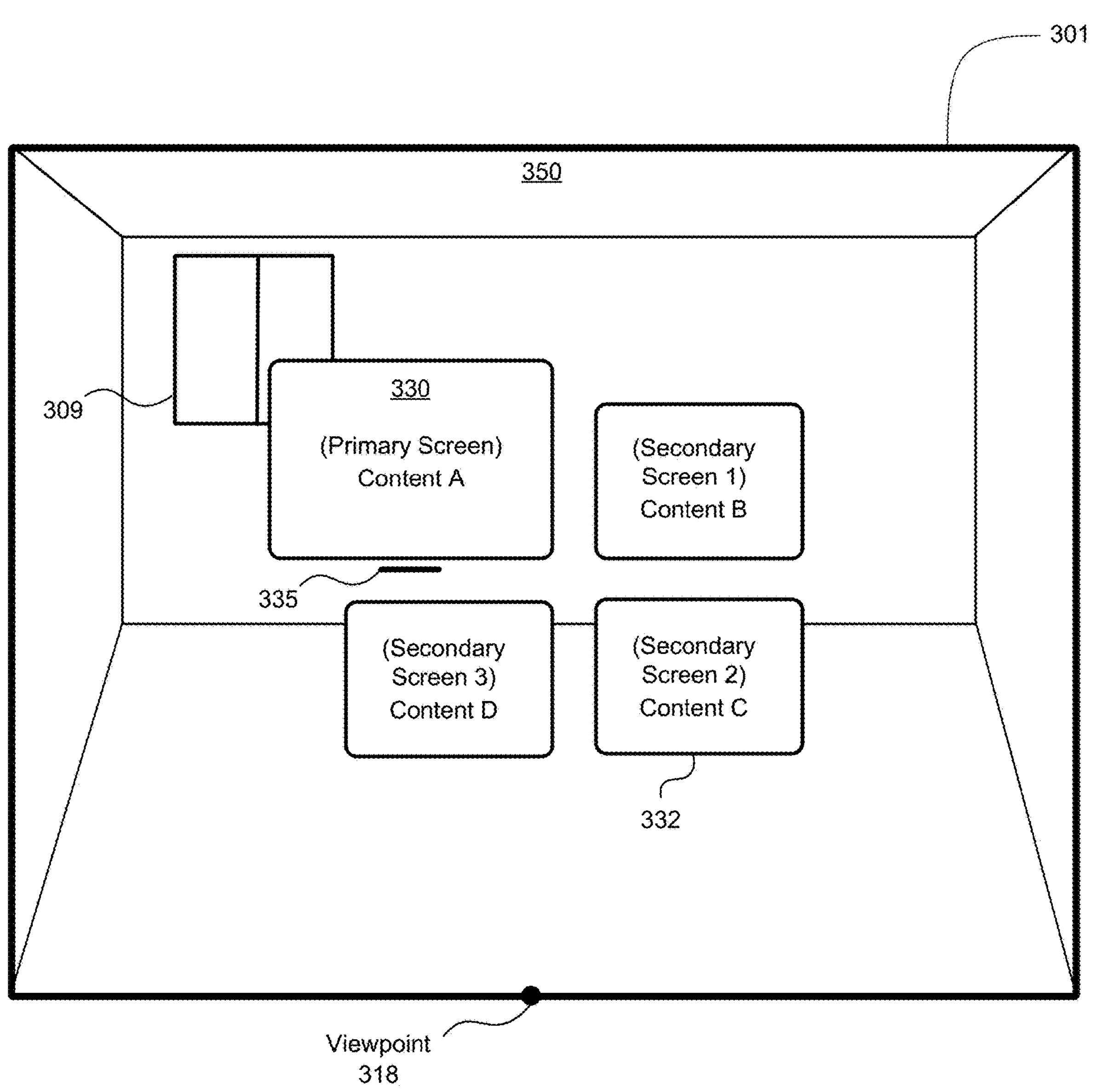
FIG. 3E illustrates an alternative arrangement of a primary viewing screen and a plurality of secondary viewing screens in a grid pattern according to some examples of the disclosure.

FIG. 3E illustrates an alternative arrangement of primary viewing screen 330 and a plurality of secondary viewing screens 332 in a grid pattern according to some examples of the disclosure. Although the example of FIG. 3E illustrates only four virtual viewing screens in a 2×2 grid, in other examples a two-dimensional grid of any size can be employed.

Figure 3F:
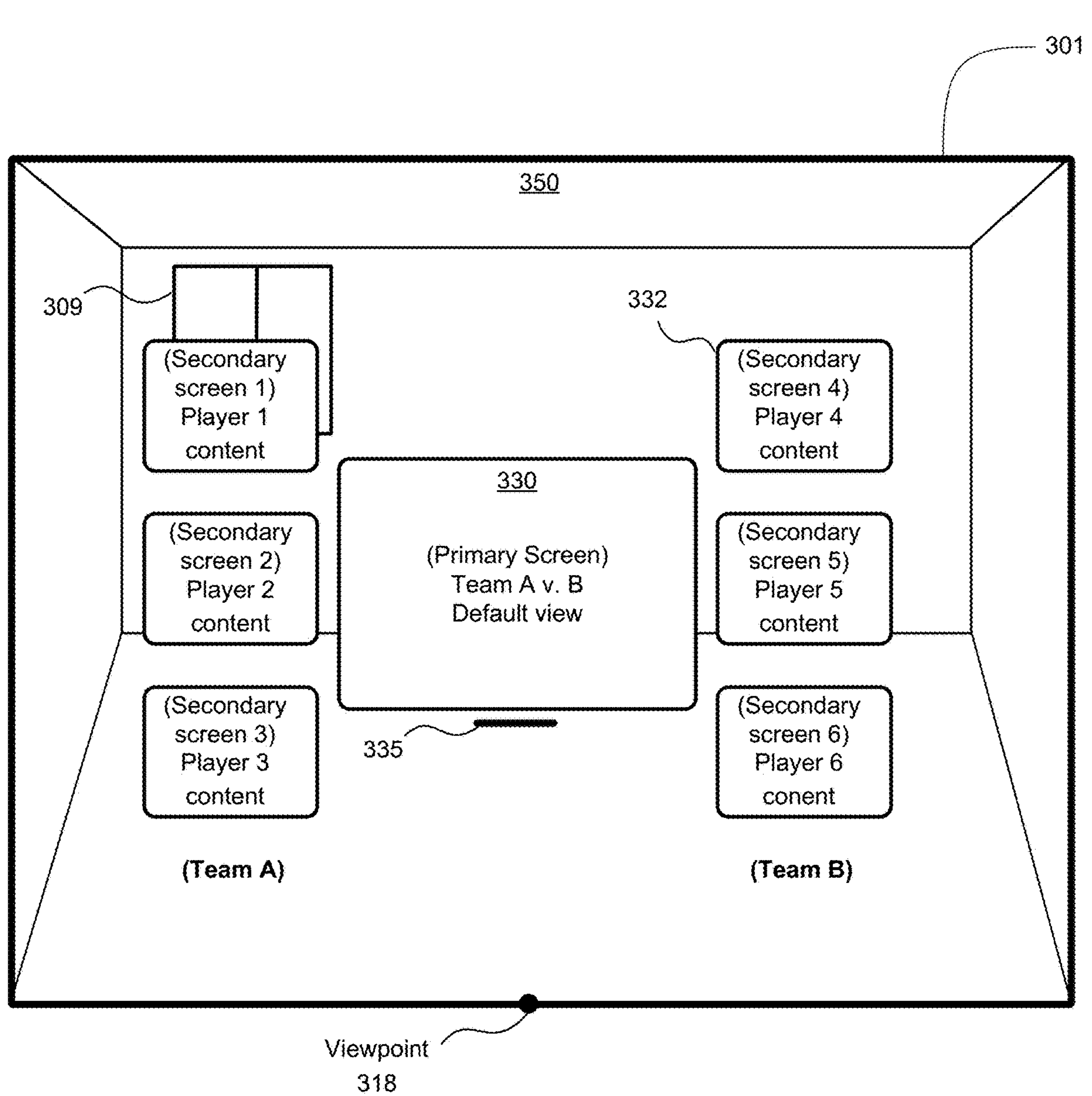
FIG. 3F illustrates an alternative arrangement of a primary viewing screen and a plurality of secondary viewing screens having some established relationship being clustered or grouped around the primary viewing screen according to some examples of the disclosure.

FIG. 3F illustrates an alternative arrangement of primary viewing screen 330 and a plurality of secondary viewing screens 332 wherein those secondary viewing screens having some established relationship are clustered or grouped around the primary viewing screen according to some examples of the disclosure. In the example of FIG. 3F, a sporting event featuring Teams A and B is being presented in primary viewing screen 330. The viewer has selected content items related to Players 1, 2 and 3 on Team A (e.g., statistics or other information on each player, a separate video feed of a video camera mounted to the player (e.g., a helmet cam), or a separate video feed of a camera that is trained on and follows the player) to be presented in Secondary Screens 1, 2 and 3, and has selected content items related to Players 4, 5 and 6 on Team B to presented in Secondary Screens 4, 5 and 6. In some examples, the multi-view playback application can detect and utilize metadata to associate the players with their respective teams and cluster them on opposite sides of primary viewing screen 330 (though other clustering and grouping arrangements are also contemplated), and in other examples the clustering can be performed manually by the viewer as shown in FIG. 3D. Although the example of FIG. 3F is presented in the context of a sporting event, the principles of FIG. 3F are also applicable to non-sporting events.

Figure 3G:
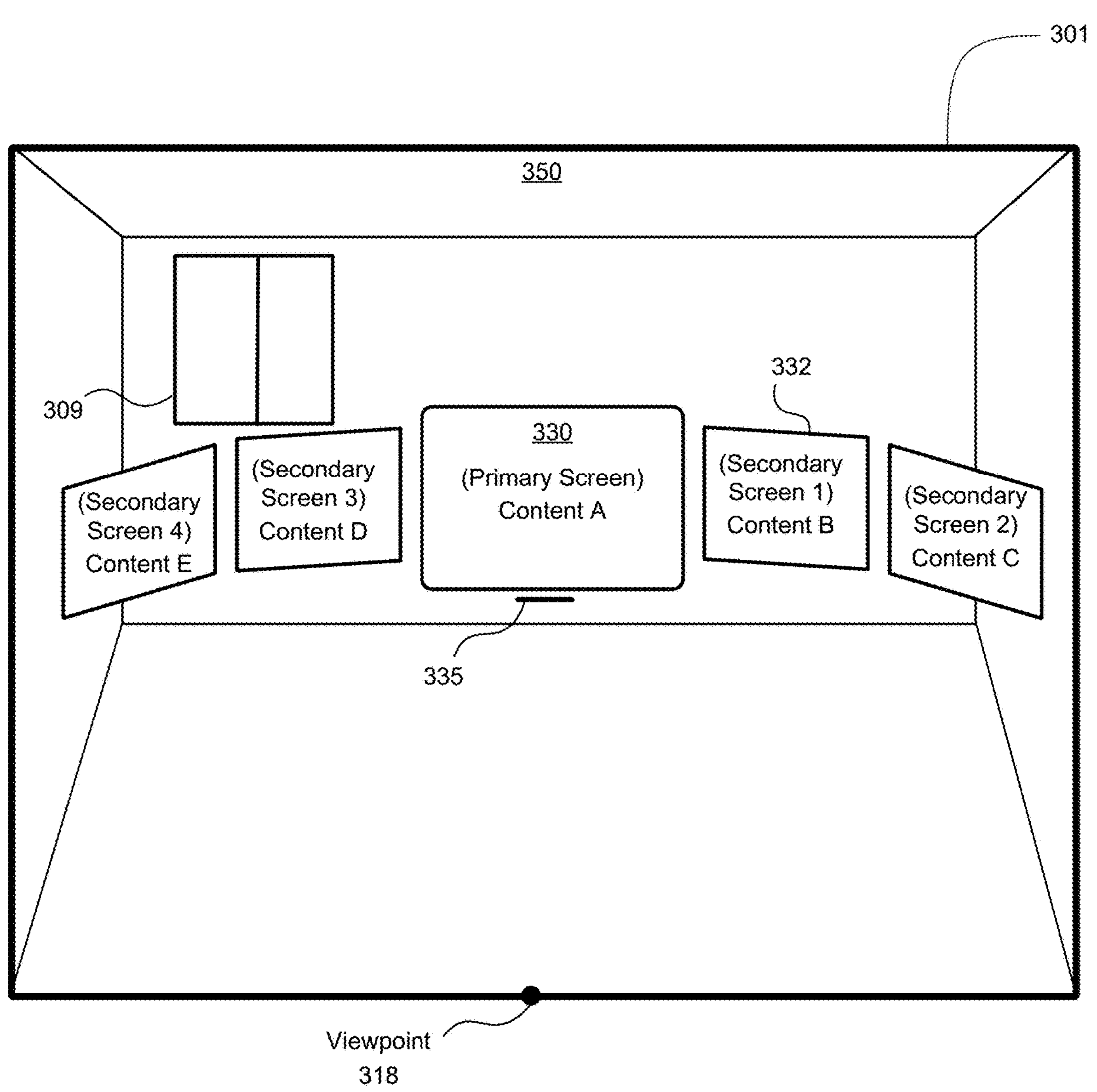
FIG. 3G illustrates an alternative arrangement of a primary viewing screen and a plurality of secondary viewing screens in a panoramic view pattern according to some examples of the disclosure.

FIG. 3G illustrates an alternative arrangement of primary viewing screen 330 and a plurality of secondary viewing screens 332 in a panoramic view pattern according to some examples of the disclosure. Although the example of FIG. 3G illustrates only four secondary viewing screens 332, in other examples any number of secondary viewing screens can be employed. In some examples, not all of the secondary viewing screens 332 are visible in the current viewpoint 318 of the viewer in 3D environment 350, but by rotating the viewer's head to rotate electronic device 301, the other secondary viewing screens can eventually come into view. In some examples, secondary viewing screens 332 can be positioned to partially or fully surround the viewer in 3D environment 350, potentially enabling the viewer to see 360 degrees of content items through the virtual viewing screens.

Figure 3H:
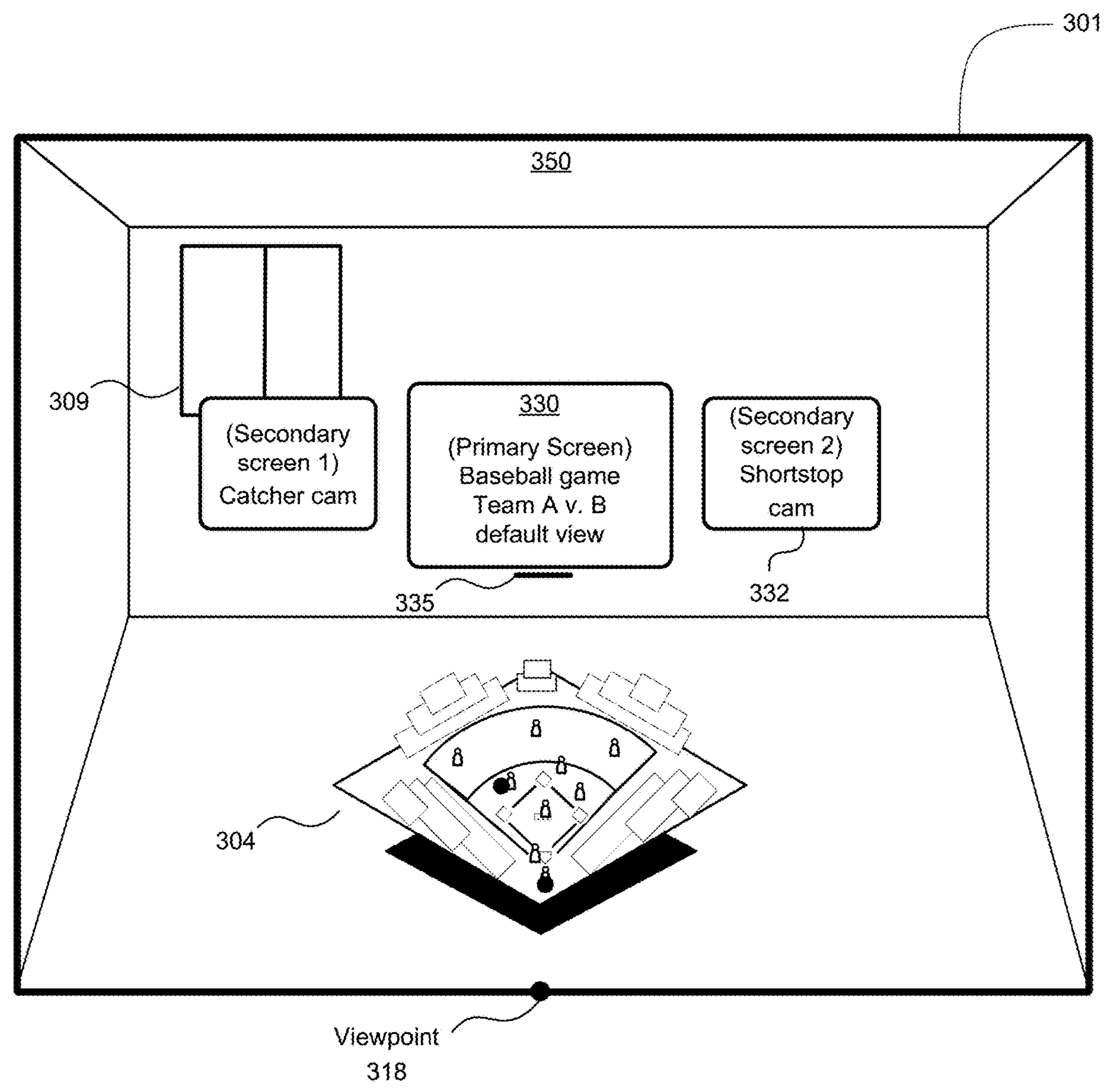
FIG. 3H illustrates the presentation of 3D content items corresponding to content items being presented in the primary viewing screen and optionally one or more secondary viewing screens according to some examples of the disclosure.

FIG. 3H illustrates the presentation of three-dimensional content items corresponding to content items being presented in primary viewing screen 330 and optionally one or more secondary viewing screens 332 according to some examples of the disclosure. In the example of FIG. 3H, the viewer has selected a baseball game to be presented in primary viewing screen 330, has selected a video feed of a camera mounted to the catcher (e.g., a "catcher cam") to be presented in Secondary Screen 1, and has selected a video feed of a camera mounted to the shortstop (e.g., a "shortstop cam"), to be presented in Secondary Screen 2. In some examples, the viewer can also direct the multi-view playback application to select (via a user interface or a voice command not shown in FIG. 3H) and display a three-dimensional representation 304 corresponding to the baseball game being presented in primary viewing screen 330. In the example of FIG. 3H, 3D representation 304 is a baseball stadium, but in other examples the 3D representation can be any 3D representation associated with the content items being displayed in primary viewing screen 330. In some examples, the multi-view playback application can associate the selected content items of Secondary Screens 1 and 2 with default positions in the baseball stadium of representation 304, and place markers (e.g., dots) in default locations on the baseball diamond corresponding to the default positions (e.g., catcher and shortstop), as shown in FIG. 3H. These markers can give the viewer a "birds-eye view" of the locations of the content items being presented in secondary viewing screens 332, which can enhance the viewer's enjoyment and understanding of the content items. In other examples where representations of the players in 304 can be relocated over time in accordance with detected changes in player locations, the markers can move along with the players at the shortstop and catcher positions. Although the example of FIG. 3H is presented in the context of a sporting event, the principles of FIG. 3H are also applicable to non-sporting events.

Figure 3I:
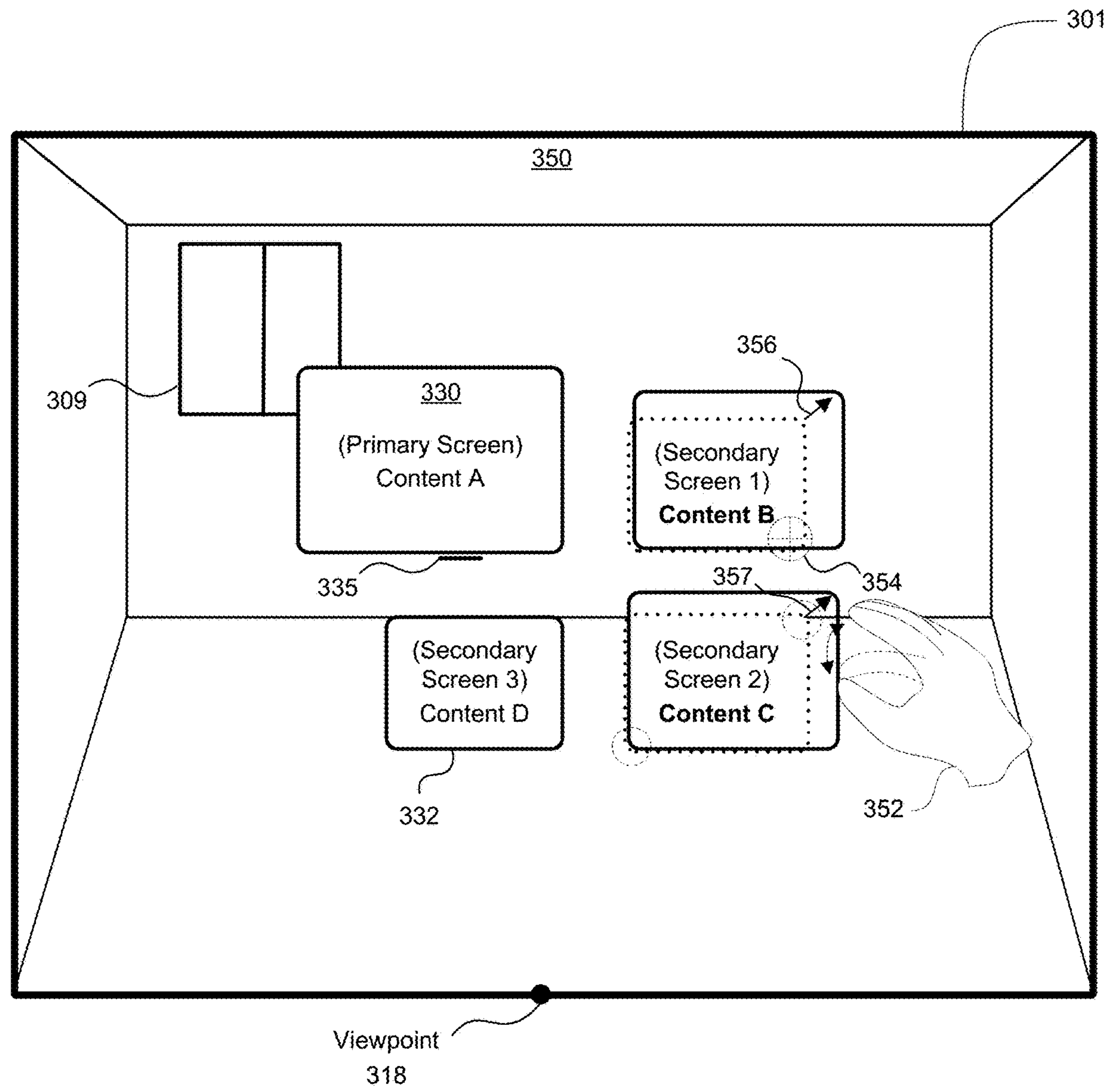
FIG. 3I illustrates the changing of the size of one or more secondary viewing screens according to some examples of the disclosure.

FIG. 3I illustrates the changing of the size of one or more secondary viewing screens 332 according to some examples of the disclosure. The example of FIG. 3I illustrates the viewing screens arranged in the grid pattern of FIG. 3E. In some examples, as the viewer's gaze 354 lingers over a particular secondary viewing screen 332 for at least a first threshold amount of time, the size of that secondary viewing screen can gradually increase in size as indicated at 356, in some instances in accordance with the length of time that the viewer's gaze lingers over the secondary viewing screen, to make viewing easier. In some examples, the size increase of the particular secondary viewing screen 332 is limited by the size of primary viewing screen 330, such that no secondary viewing screen can increase in size to equal or exceed the size of the primary viewing screen. In some examples, when the viewer's gaze 354 leaves the particular secondary viewing screen 332, that screen returns to its default (smaller) size.

In other examples, the viewer can move a representation of their hand 352 close to a corner (e.g., the top right corner in Secondary Screen 2 in FIG. 3I), and perform one or more tap and release gestures with a thumb and index finger. With each tap and release gesture, the size of that secondary viewing screen can incrementally increase in size as indicated at 357 to make viewing easier. In some examples, rather than a tap and release gesture, the user can perform a pinch gesture with a thumb and finger at a corner of the secondary viewing screen (e.g., the top right corner in Secondary Screen 2 in FIG. 3I), and thereafter drag the pinched thumb and finger away from the secondary viewing screen (e.g., diagonally upwards and to the right) to perform a pinch and drag gesture to increase the size of the secondary viewing screen, or drag the pinched thumb and finger into the secondary viewing screen (e.g., diagonally downwards and to the left) to perform and pinch and drag gesture to decrease the size of the secondary viewing screen. In some examples, the size increase of the particular secondary viewing screen 332 is limited by the size of primary viewing screen 330, such that no secondary viewing screen can increase in size to equal or exceed the size of the primary viewing screen. In some examples, the viewer can move a representation of their hand close to a corner (e.g., the lower left corner in Secondary Screen 2 in FIG. 3I), and perform one or more tap and release gestures with a thumb and index finger. With each tap and release gesture, the size of that secondary viewing screen can incrementally decrease in size, but no smaller than its original default size. Although tap and release gestures are described above with respect to FIG. 3I, other gestures or viewer inputs can also be employed.

Figure 3J:
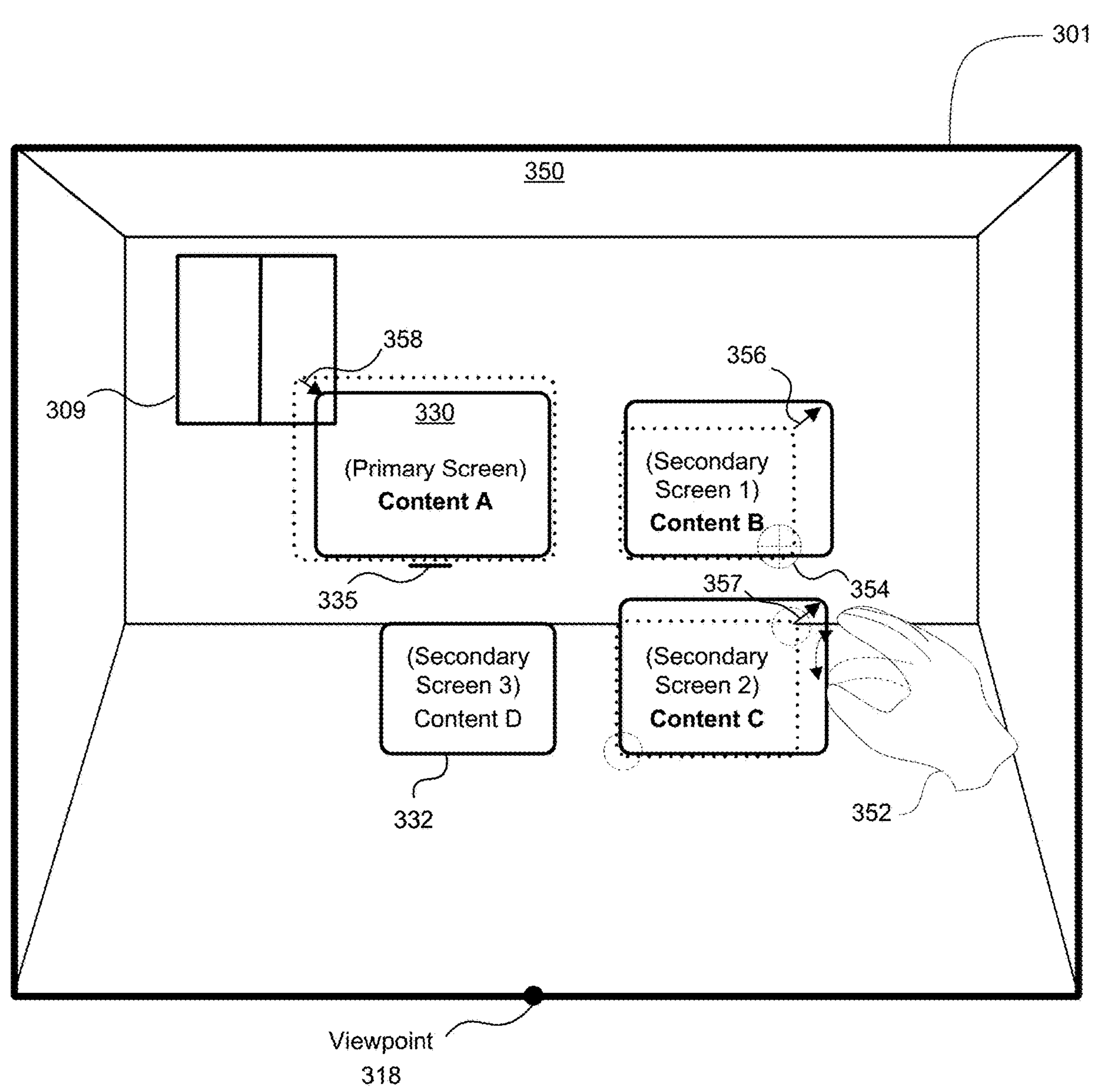
FIG. 3J illustrates the changing of the size of one or more secondary viewing screens with a corresponding opposite change in size of the primary viewing screen according to some examples of the disclosure.

FIG. 3J illustrates the changing of the size of one or more secondary viewing screens 332 with a corresponding opposite change in size of primary viewing screen 330 according to some examples of the disclosure. FIG. 3J is similar to FIG. 3I, except that in the example of FIG. 3J, as a secondary viewing screen increases in size, primary viewing screen 330 decreases in size as indicated at 358, providing a visual indication to the viewer of a potential switch in the primary and secondary viewing screen designations if the viewer's focus continues to remain with a secondary viewing screen. However, as long as primary viewing screen 330 remains larger than the secondary viewing screens 332, the screen designations will remain unchanged.

Figure 4A:
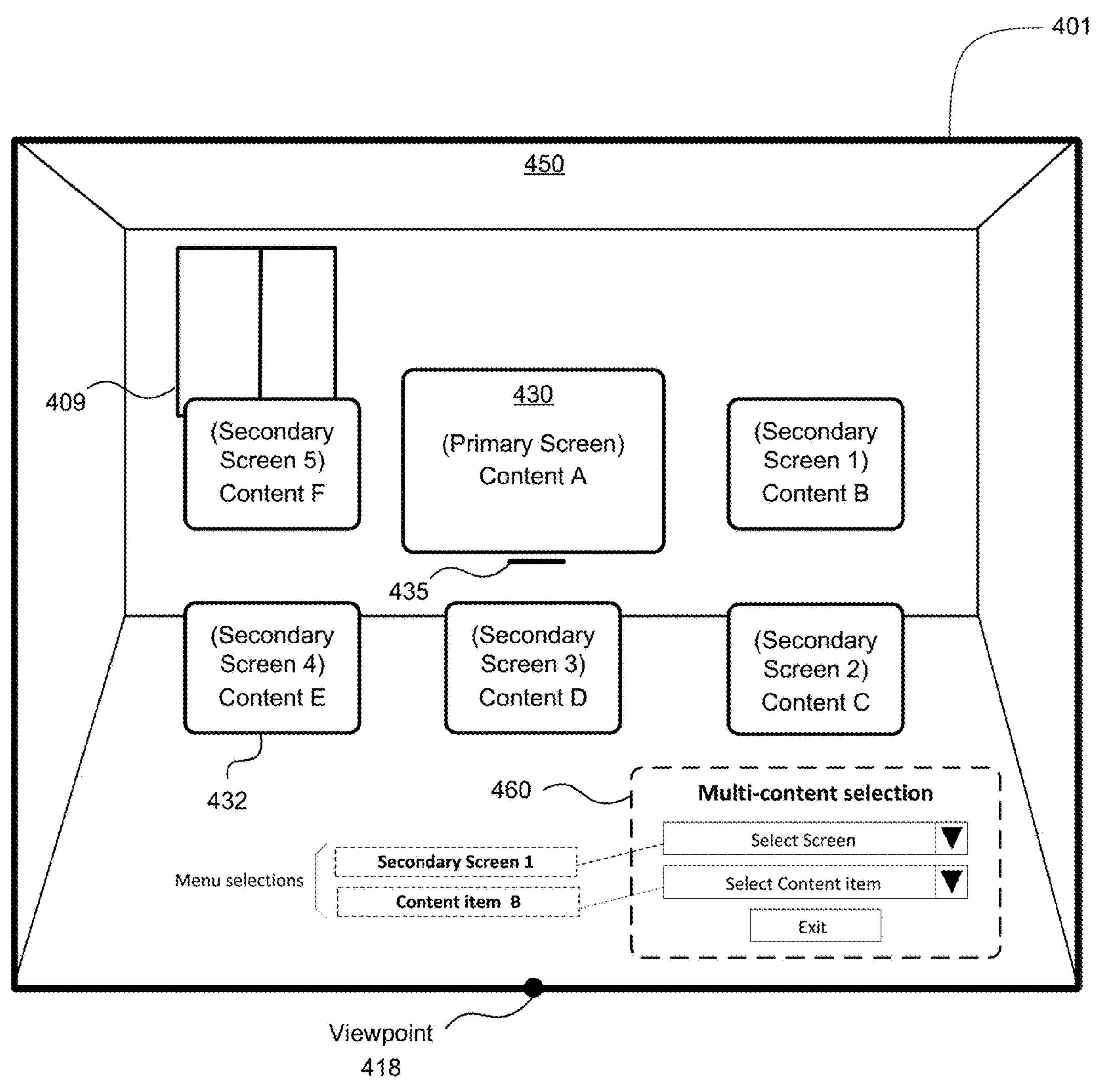
FIG. 4A illustrates a multi-content items selection user interface for selecting the content items to appear on a particular screen according to some examples of the disclosure.

FIG. 4A illustrates a multi-content items selection user interface 460 for selecting the content items to appear on a particular screen according to some examples of the disclosure. Multi-content items selection user interface 460 can be utilized when the viewer wishes to select different, unrelated content items (e.g., different sporting events, different movies) to appear in primary viewing screen 430 and the plurality of secondary viewing screens 432. The viewer can initiate the process of selecting the content items to appear on the various viewing screens by providing input (not shown) to the multi-view playback application, which then causes multi-content items selection user interface (e.g., affordance) 460 to appear. In the example of FIG. 4A, multi-content items selection user-interface 460 is a window floating in 3D environment 450 that includes a pulldown menu to select which screen to configure (e.g., primary viewing screen, Secondary Screen 1, etc.), and a pulldown menu to select the content items for that desired screen. However, it should be understood that this user interface (e.g., affordance) is merely an illustrative example, and that other user interfaces capable of receiving viewer input can alternatively be employed. In the example of FIG. 4A, the viewer has selected Secondary Screen 1 and Content item B, representing the satisfaction of a criterion for updating Secondary Screen 1, and has previously selected the content items for the other viewing screens as shown in FIG. 4A.

Figure 4B:
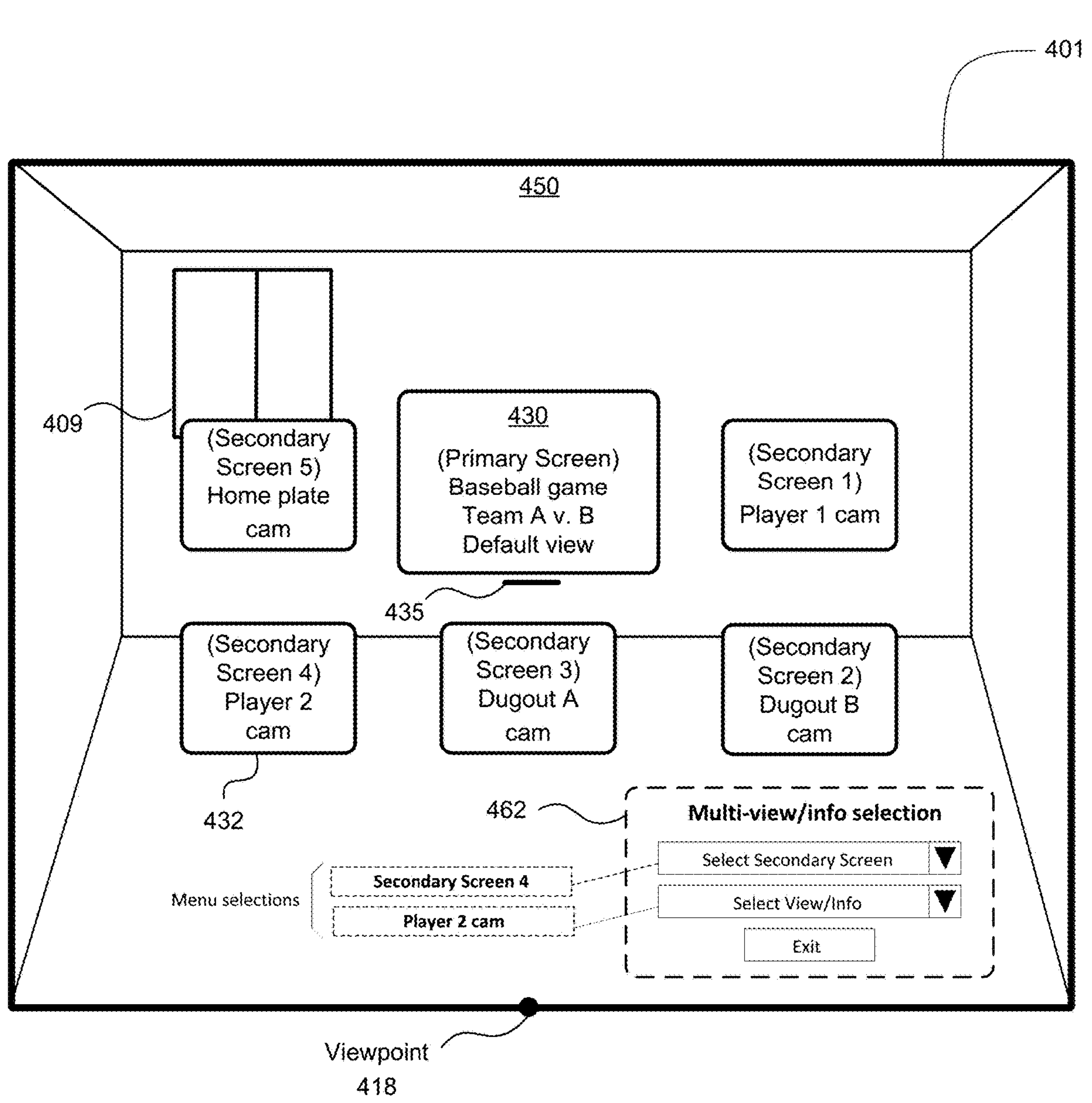
FIG. 4B illustrates a multi-view/info selection user interface for selecting the content items to appear on a particular secondary viewing screen in a sporting event context according to some examples of the disclosure.

FIG. 4B illustrates a multi-view/info selection user interface 462 for selecting the content items to appear on a particular secondary viewing screen in a sporting event context according to some examples of the disclosure. Multi-view/info selection user interface 462 can be utilized when the viewer wishes to select content items in secondary viewing screens 432 that are related to the content items in primary viewing screen 430 (e.g., different camera angles of the same sporting event, different camera angles of the same scene in a movie, information related to the content items being presented in the primary viewing screen, etc.). The viewer can initiate the process of selecting the related content items to appear on the secondary viewing screens by providing input (not shown) to the multi-view playback application, which then causes multi-view/info selection user interface (e.g., affordance) 462 to appear. In the example of FIG. 4B, multi-view/info selection user-interface 462 is a window floating in 3D environment 450 that includes a pulldown menu to select which secondary viewing screen to configure (e.g., Secondary Screen 1, Secondary Screen 2, etc.), and a pulldown menu to select the view or information for that desired screen. However, it should be understood that this user interface (e.g., affordance) is merely an illustrative example, and that other user interfaces capable of receiving viewer input can alternatively be employed. In the example of FIG. 4B, a baseball game featuring Teams A and B is being presented in primary viewing screen 430, and the viewer has selected Player 2 cam (a video feed of a camera attached to Player 2, who is participating in the baseball game) to appear in Secondary Screen 4, representing the satisfaction of a criterion for updating Secondary Screen 4, and has previously selected the content items for the other secondary viewing screens as shown in FIG. 4B.

Figure 4C:
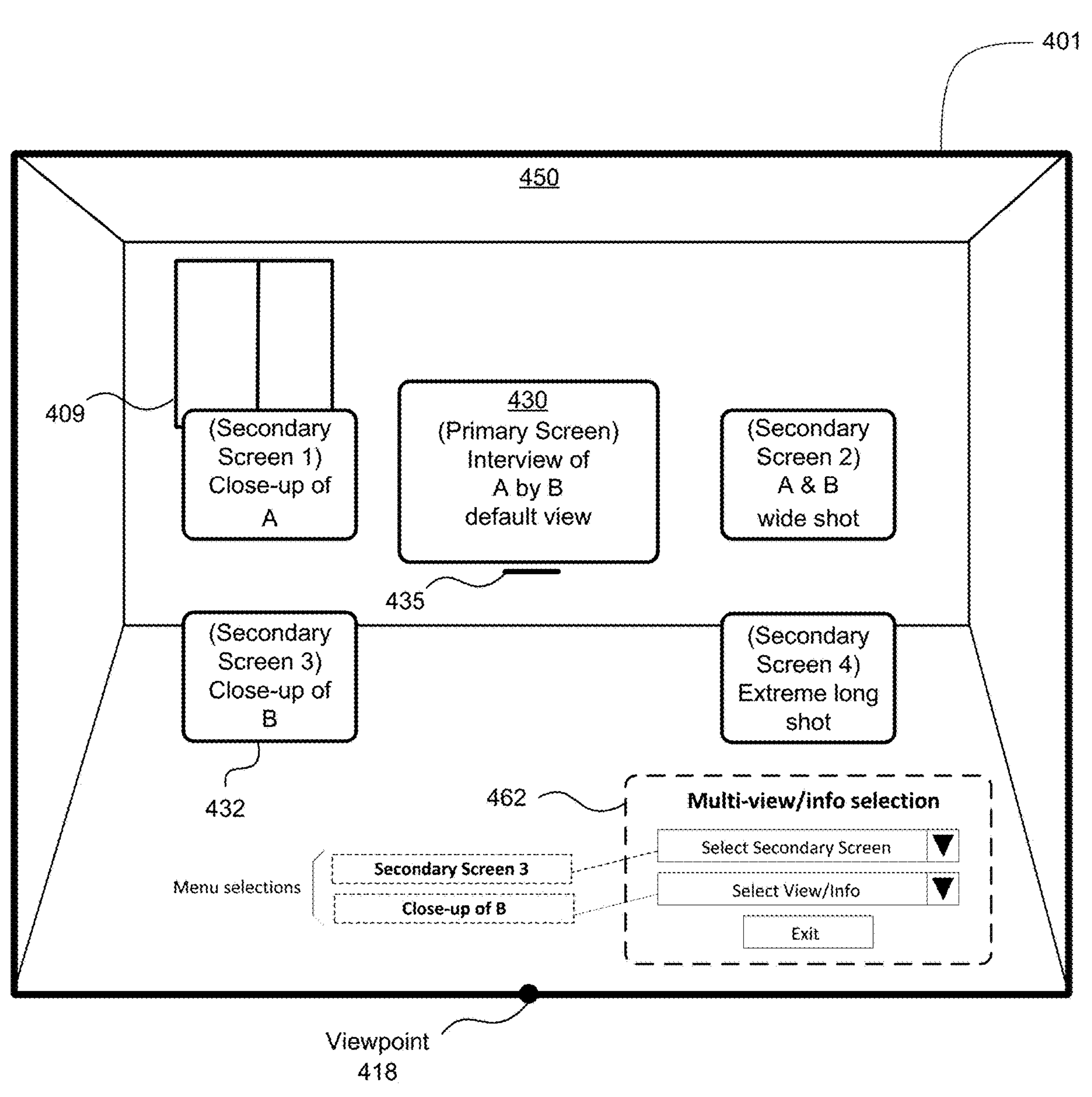
FIG. 4C illustrates a multi-view/info selection user interface for selecting the content items to appear on a particular secondary viewing screen in a non-sports context according to some examples of the disclosure.

FIG. 4C illustrates a multi-view/info selection user interface 462 for selecting the content items to appear on a particular secondary viewing screen in a non-sports context according to some examples of the disclosure. In the example of FIG. 4C, a pre-recorded interview of Person A by Interviewer B is being presented in primary viewing screen 430, and the viewer has selected Close-up of B (close-up video of Interviewer B, different from the default view appearing in primary viewing screen 430) to appear in Secondary Screen 3, representing the satisfaction of a criterion for updating Secondary Screen 3, and has previously selected the content items for the other secondary viewing screens as shown in FIG. 4C.

Figure 4D:
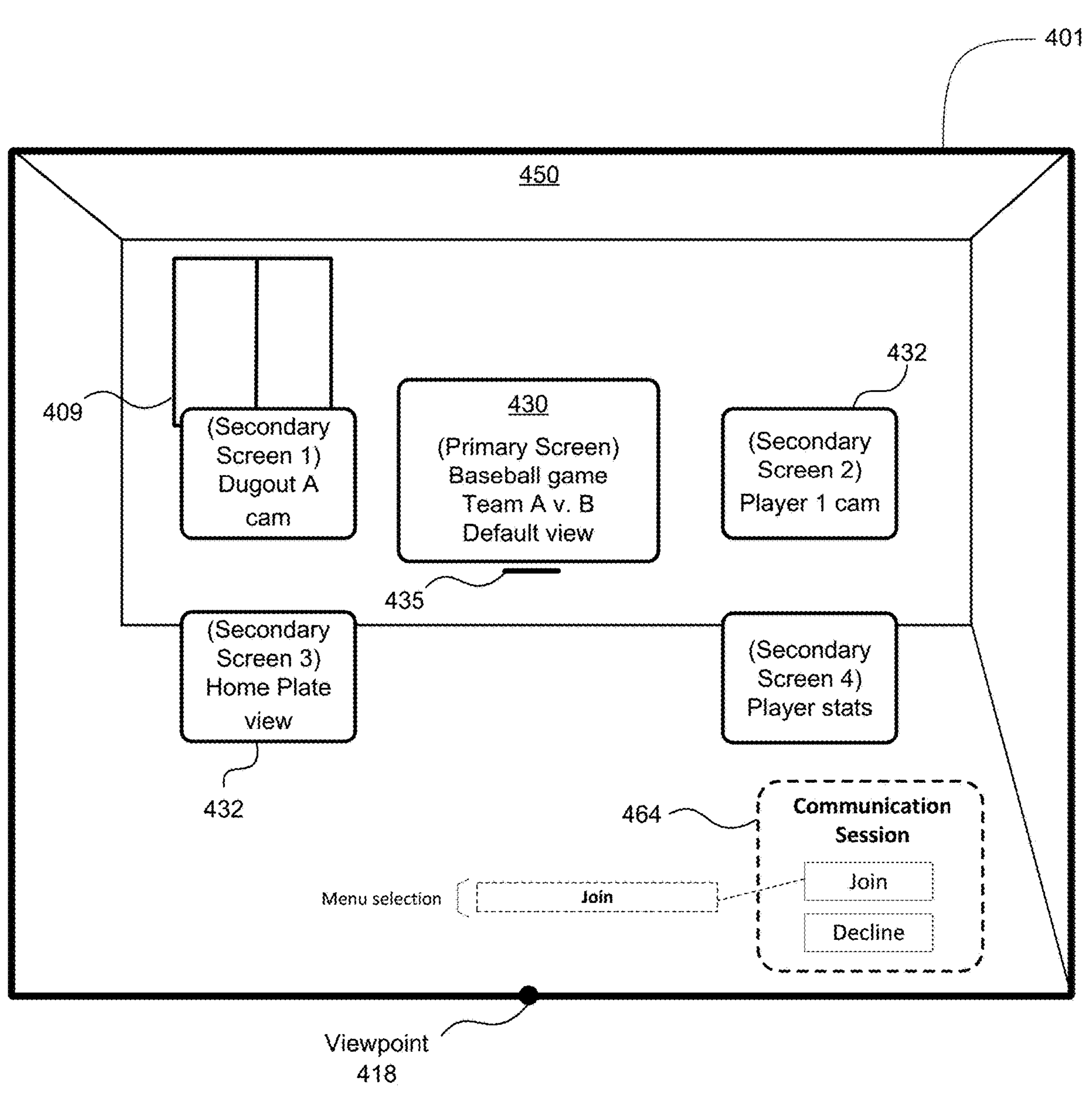
FIG. 4D illustrates a multi-user communication user interface representing a request to join a multi-user communication session in a sporting event context according to some examples of the disclosure.

FIG. 4D illustrates multi-user communication session invitation user interface 464 representing a request to join a multi-user communication session in a sporting event context according to some examples of the disclosure. In the example of FIG. 4D, a first viewer having viewpoint 418 has selected a baseball game featuring Teams A and B to be presented in primary viewing screen 430, and has selected Dugout A cam (a video feed of a camera mounted in the dugout of Team A) for presentation in Secondary Screen 1, Player 1 cam (a video feed of a camera mounted in the helmet of Player 1) for presentation in Secondary Screen 2, Home Plate view (a video feed of a camera mounted behind home plate) for presentation in Secondary Screen 3, and Player Stats (statistics of the player currently at bat) for presentation in Secondary Screen 4. While concurrently displaying primary viewing screen 430 and secondary viewing screens 432 in 3D environment 450, electronic device 401 can detect an indication from a second electronic device (not shown), different from electronic device 401, inviting the first viewer of electronic device 401 to join a second viewer of the second electronic device in a multi-user communication session. In some examples, as shown in FIG. 4D, in response to detecting the indication from the second electronic device, the electronic device 401 displays multi-user communication session invitation user interface 464 corresponding to the invitation to join the second electronic device in the multi-user communication session. In some examples, as shown in FIG. 4D, multi-user communication session invitation user interface 464 includes a first option that is selectable to accept the invitation to join the multi-user communication session and a second option that is selectable to decline the invitation to join the multi-user communication session (e.g., including ceasing display of the multi-user communication session invitation user interface in 3D environment 450). In the example of FIG. 4D, while displaying multi-user communication session invitation user interface 464 in 3D environment 450, the electronic device 401 detects a selection input directed to the first (join) option of the multi-user communication session invitation user interface. For example, the electronic device 401 can detect, via one or more sensors of the electronic device 401, an air pinch gesture performed by a hand of the user, a tap or touch gesture performed by the hand, a verbal command, a gaze dwell directed to the first (join) option, etc. Upon detection of the first (join) option, a multi-user communication session is commenced. In the example of FIG. 4D, multi-user communication session invitation user interface 464 is a window floating in 3D environment 450 that includes virtual buttons, but it should be understood that this user interface is merely an illustrative example, and that other user interfaces capable of receiving viewer input can alternatively be employed.

Figure 4E:
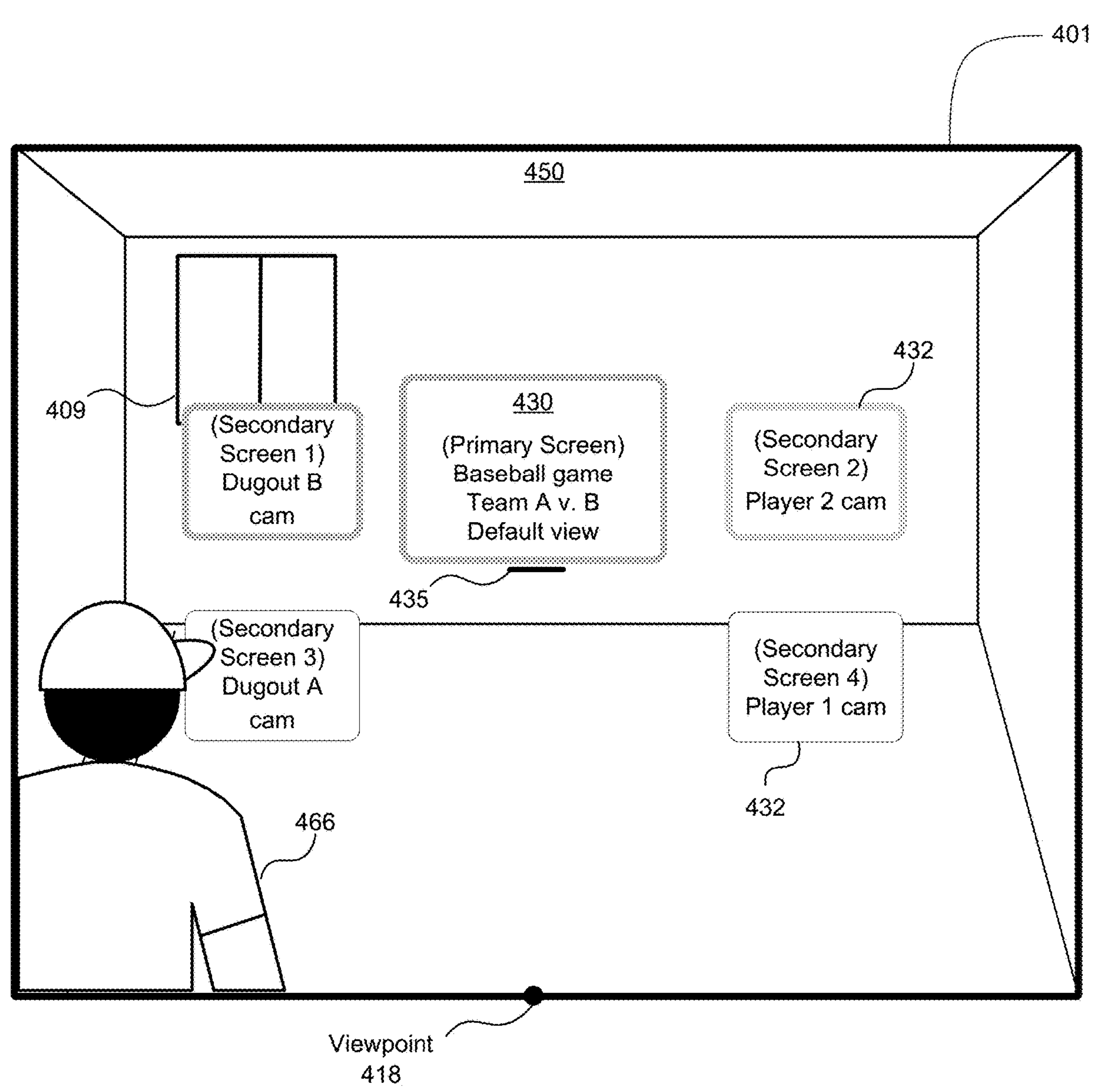
FIG. 4E illustrates a multi-user communication session in a sporting event context after a first viewer has accepted a request from a second viewer of a second electronic device to join a multi-user communication session according to some examples of the disclosure.

FIG. 4E illustrates a multi-user communication session in a sporting event context after a first viewer having viewpoint 418 of 3D environment 450 within electronic device 401 has accepted a request from a second viewer of a second electronic device to join a multi-user communication session according to some examples of the disclosure. In some examples, avatar 466 corresponding to the second viewer is displayed in 3D environment 450. Control of one or more secondary viewing screens 432 can be assigned to the second viewer of the second electronic device, so that the first viewer can no longer change the content items to be presented in those screens. These "off-limits" screens may be visually indicated, such as with greyed out borders. In some examples, the assignment of viewing screens to participants can be negotiated by the multiple users in the session and finalized via selections in a user interface (not shown); in other examples, the multi-view playback application can give priority to a predetermined amount of secondary viewing screens 432 to the initiating viewer. In the example of FIG. 4E, because the second viewer has initiated the multi-user communication, the second viewer has been given priority and retains control of primary viewing screen 430, Secondary Screen 1 and Secondary Screen 2. Accordingly, those screens appear to the first viewer with greyed out borders, indicating that the first viewer does not have control over those screens. In addition, the content items of Secondary Screen 1 and Secondary Screen 2 being presented to the first viewer has been switched (as compared to FIG. 4D) to the second viewer's selections, due to the second viewer's control over those screens. In particular, because the second viewer is a fan of Team B, and Player 2 on Team B, the video feed of the Dugout B cam now appears in Secondary Screen 1, and the video feed of the Player 2 cam now appears in Secondary Screen 2.

The first viewer's previous selection of content items in Secondary Screen 1 and Secondary Screen 2, as shown in FIG. 4D, has now been pushed down to Secondary Screen 3 and Secondary Screen 4 in FIG. 4E, which remain under the control of the first viewer and thus do not have greyed our borders. In this way, although the inviting viewer (the second viewer in the example of FIG. 4E) retains control of primary viewing screen 430, both the first and second viewers can watch the multiple virtual viewing screens together, each having separate content items control over some, but not all, of the viewing screens.

Figure 4F:
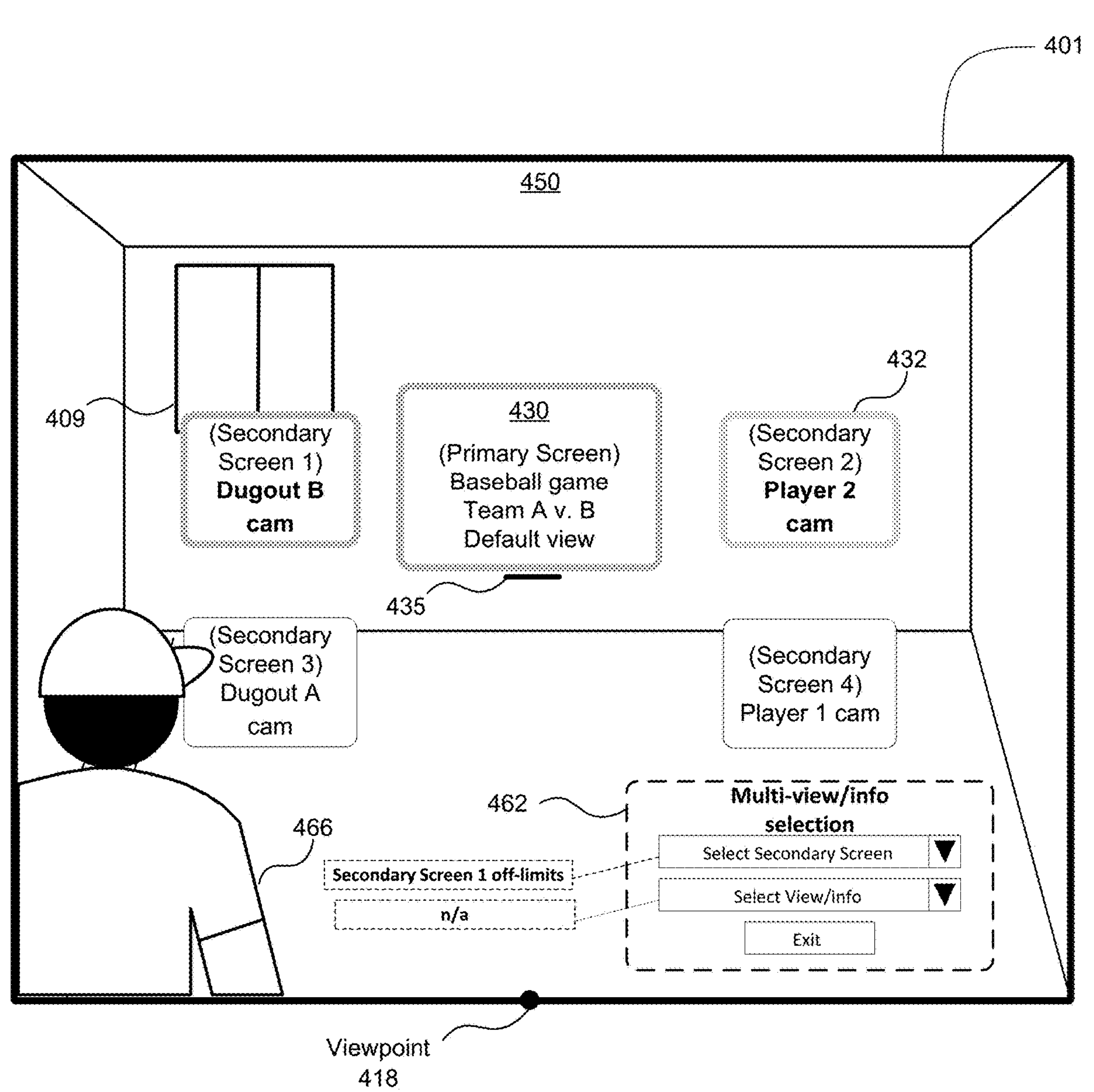
FIG. 4F illustrates an illegal operation in the multi-user communication session of FIG. 4E according to some examples of the disclosure.

FIG. 4F illustrates an illegal operation in the multi-user communication session of FIG. 4E according to some examples of the disclosure. In the example of FIG. 4F, content items control of primary viewing screen 430, Secondary Screen 1 and Secondary Screen 2 has been assigned to the second viewer in the multi-user communication session. Nevertheless, the first viewer has launched multi-view/info selection user interface 462 and has attempted to change the content items of Secondary Screen 1. In response to the attempt, the multi-view playback application can inform the first user that Secondary Screen 1 is off-limits.

Figure 4G:
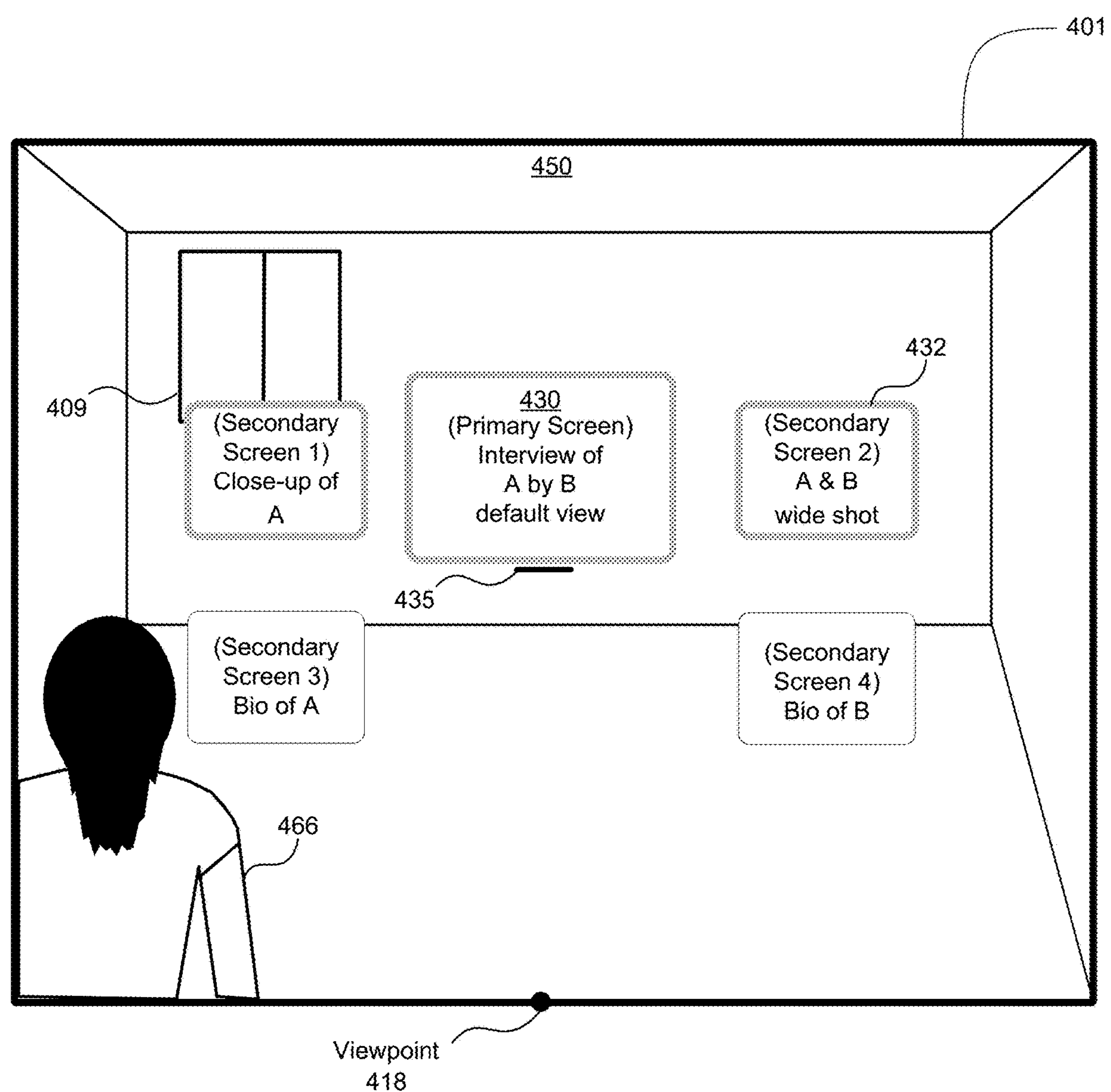
FIG. 4G illustrates a multi-user communication session in a non-sporting event context after a first viewer has accepted a request from a second viewer of a second electronic device to join a multi-user communication session according to some examples of the disclosure.

FIG. 4G illustrates a multi-user communication session in a non-sporting event context after a first viewer having viewpoint 418 of 3D environment 450 within electronic device 401 has accepted a request from a second viewer of a second electronic device to join a multi-user communication session according to some examples of the disclosure. In some examples, avatar 466 corresponding to the second viewer is displayed in 3D environment 450. In the example of FIG. 4G, the multi-view playback application has assigned control of primary viewing screen 430, Secondary Screen 1 and Secondary Screen 2 to the second viewer, so that the first viewer can no longer change the content items to be presented in those secondary viewing screens. Accordingly, these screens appear with greyed out borders in FIG. 4G. However, the content items of Secondary Screen 3 and Secondary Screen 4 remains under control of the first viewer. In this way, although the inviting viewer (the second viewer in the example of FIG. 4G) retains control of primary viewing screen 430, both the first and second viewers can watch the multiple virtual viewing screens together, each having separate content items control over some, but not all, of the viewing screens.

Figure 5A:
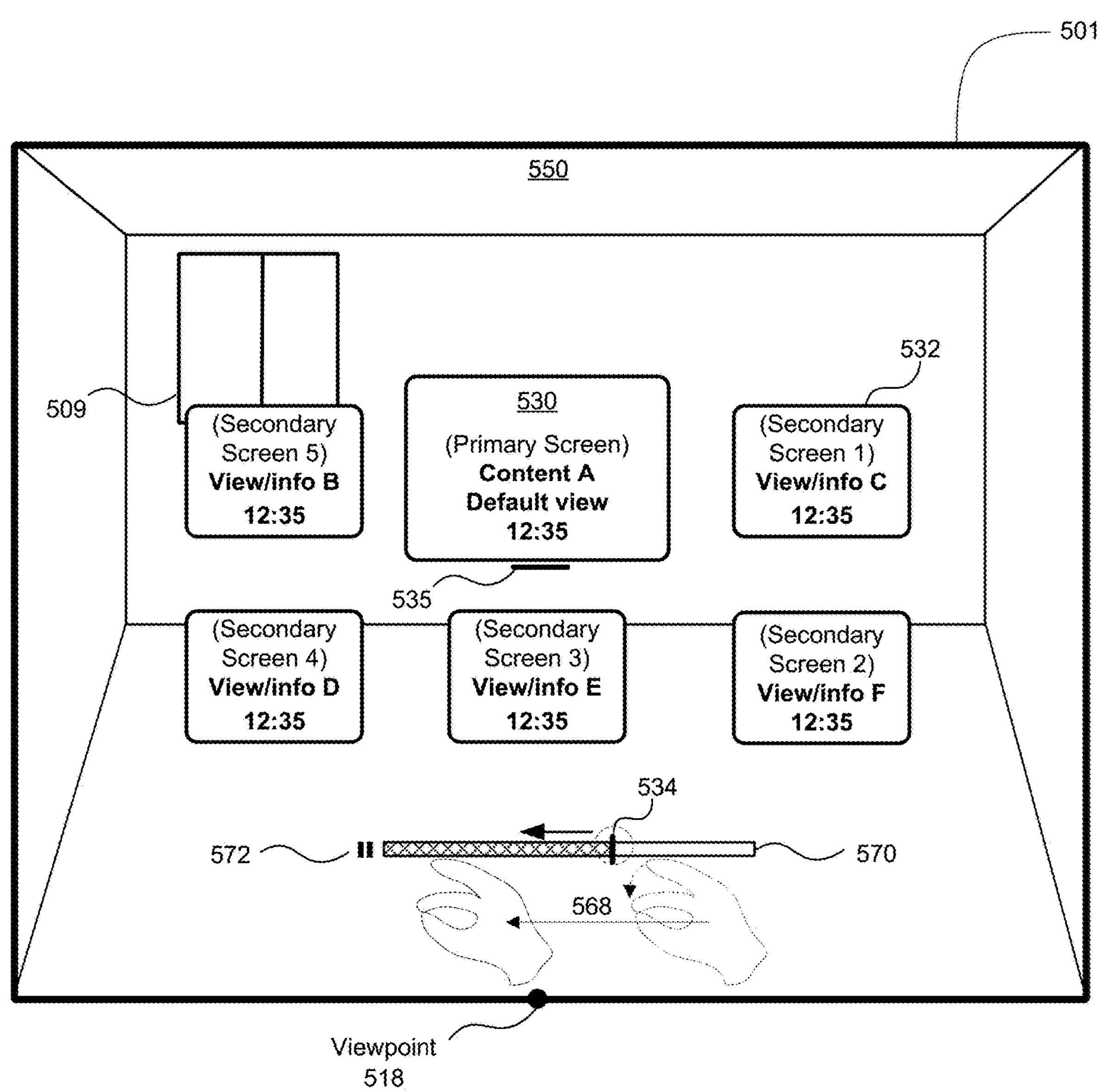
FIG. 5A illustrates the synchronization of the playback of content items in a primary viewing screen and a plurality of secondary viewing screens according to some examples of the disclosure.

FIG. 5A illustrates the synchronization of the playback of content items in primary viewing screen 530 and a plurality of secondary viewing screens 532 according to some examples of the disclosure. In the example of FIG. 5A, Content items A is being presented in primary viewing screen 530, content items related to Content items A are being presented in the plurality of secondary viewing screens 532, and the content items in each of the viewing screens includes an identical timestamp (e.g., 12:35), which may or may not be visible in each of the viewing screens, indicating that the content items of all viewing screens are synchronized in time. In some examples, interactions directed to primary viewing screen 530 that update the current playback position of the content items displayed in the primary viewing screen may cause a corresponding update to be performed on the plurality of secondary viewing screens 532. In some examples, one such interaction includes manipulating a player bar 570 appearing in 3D environment 550. Player bar 570 can be utilized when the viewer wishes to change the current playback position of content items in primary viewing screen 530, and in some instances the current playback position of content items in secondary viewing screens 532. The viewer can initiate the process of changing the current playback position by providing input (not shown) to the multi-view playback application, which then causes player bar 570 to appear. Electronic device 501 can then detect scrubbing input 568 over player bar 570. In some examples, scrubbing input 568 includes interaction with one or more playback controls of player bar 570, which optionally includes player head 534, and a playback affordance 572 (e.g., a play/pause affordance). For example, as shown in FIG. 5A, the electronic device 501 detects a pinch and hold gesture performed by a representation of the viewer's hand within a certain threshold virtual distance of player head 534, followed by movement of the representation of the hand leftward over player bar 570, representing the satisfaction of a criterion for updating the current playback position of primary viewing screen 530, and in some instances the current playback position of content items in secondary viewing screens 532. Although player bar 570 is shown in FIG. 5A, in other examples different user interfaces and user input can be employed to achieve the same effect.

Figure 5B:
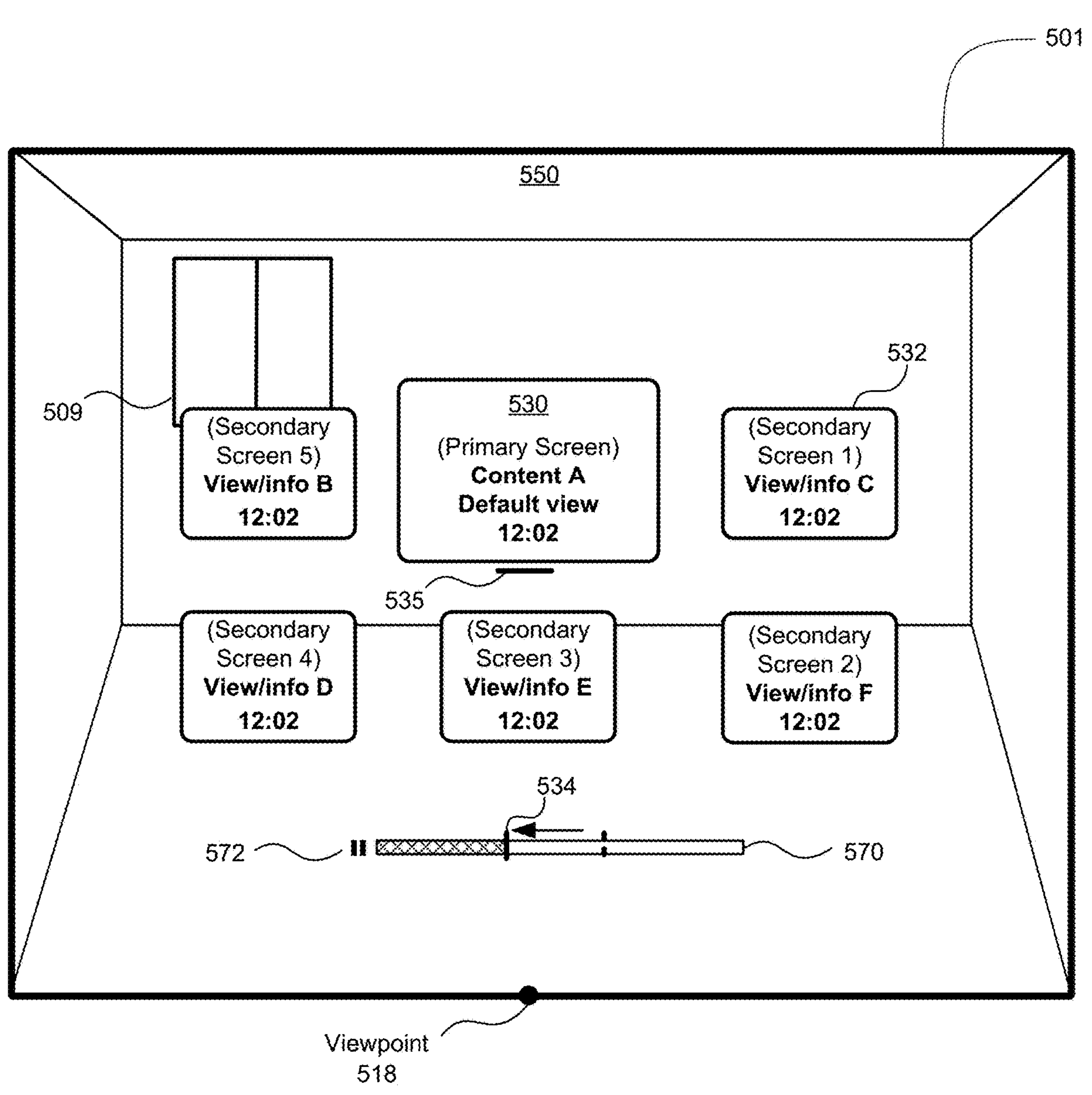
FIG. 5B illustrates the synchronization of the playback of content items in a primary viewing screen and a plurality of secondary viewing screens when a current playback position is moved backward (or forward) in time according to some examples of the disclosure.

FIG. 5B illustrates the synchronization of the playback of content items in primary viewing screen 530 and a plurality of secondary viewing screens 532 when the current playback position is moved backward (or forward) in time according to some examples of the disclosure. In response to detecting scrubbing input 568 (see FIG. 5A), electronic device 501 can update the current playback position (e.g., the position of the player head 534) of the content items being presented in primary viewing screen 530. For example, as shown in FIG. 5B, the electronic device 501 rewinds Content items A in primary viewing screen 530 and also the related content items in the plurality of secondary viewing screens 532 from 12:35 (FIG. 5A) to 12:02 (FIG. 5B).

Figure 5C:
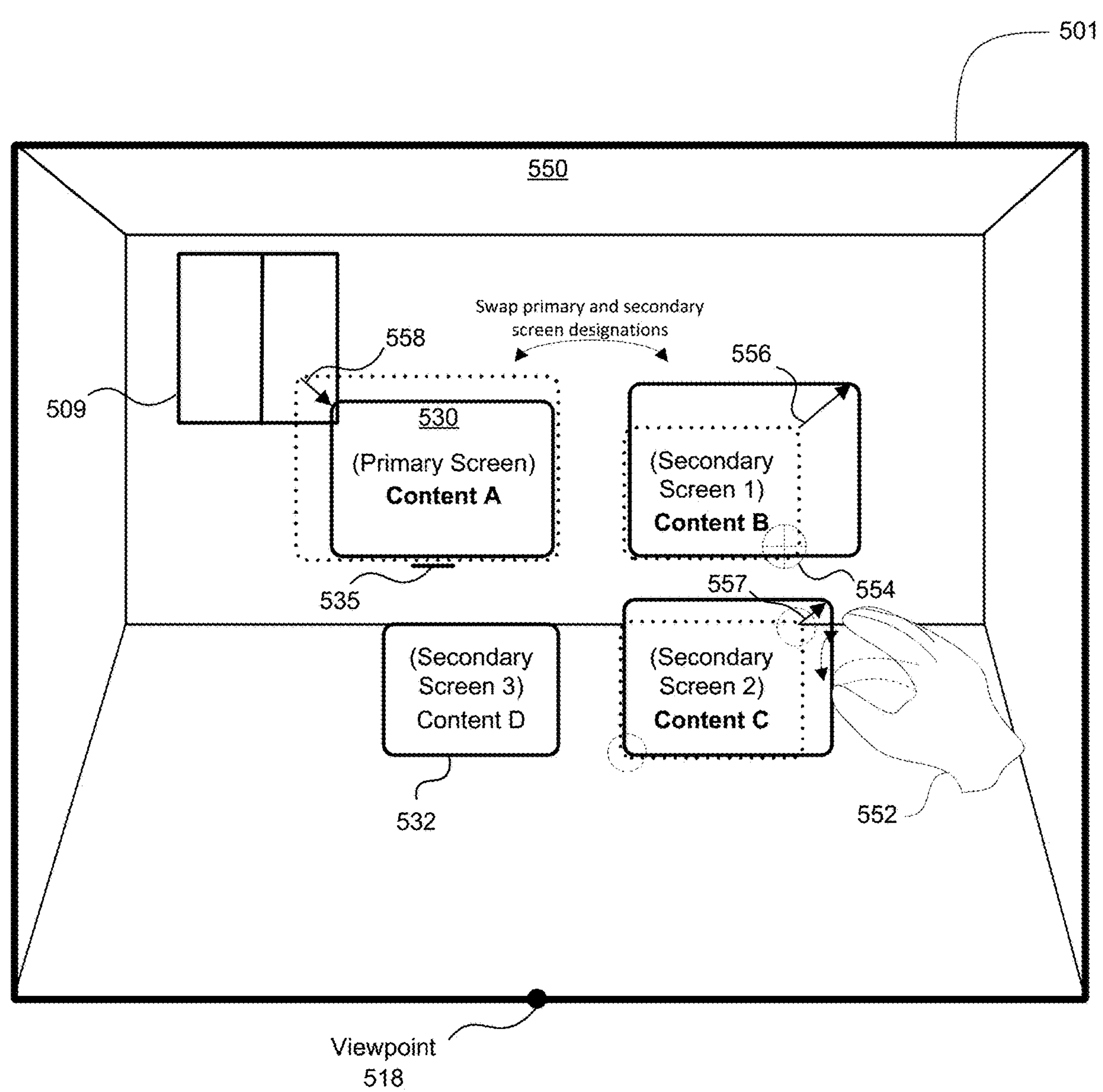
FIG. 5C illustrates the switching of the designation of a viewing screen from secondary to primary, and vice versa, according to some examples of the disclosure.

FIG. 5C illustrates the switching of the designation of a viewing screen from secondary to primary, and vice versa, according to some examples of the disclosure. FIG. 5C is a continuation of the viewer manipulations of screen size in FIG. 3J, except that in the example of FIG. 5C, the viewer's gaze (e.g., a user input) has persisted over Secondary Screen 1 for a long enough period of time such that Secondary Screen 1 has grown in size (see arrow 556) to become larger than primary viewing screen 530, which has decreased in size (see 558), indicating more than a fleeting change in the viewer's focus. In some examples, this condition can represent the satisfaction of a criterion for updating the viewing screens by switching designations, where the screen previously designated as Secondary Screen 1 becomes the primary viewing screen, and the screen previously designated as the primary viewing screen becomes Secondary Screen 1. In other examples, the size of the screens need not change in size; if the viewer's gaze persists over a particular secondary viewing screen 532 for longer than a threshold period of time, representing the satisfaction of a criterion for updating the viewing screens, the previously designed secondary viewing screen can be re-designated as the primary viewing screen, and the previously designated primary viewing screen can be re-designated as a secondary viewing screen. In another alternative example shown in FIG. 5C, the viewer can repeatedly perform a pinch and release gesture (e.g., a user input) within a threshold virtual distance of Secondary Screen 2 using a representation 552 of the viewer's hand to cause Secondary Screen 2 to increase in size (as previously described with respect to FIG. 3J). However, in this example Secondary Screen 2 has increased in size to the point where it becomes larger than the designated primary viewing screen 530, representing the satisfaction of a criterion for causing the designation of Secondary Screen 2 to switch to the primary viewing screen (and the previously designated primary viewing screen to be re-designated as Secondary Screen 2).

Figure 5D:
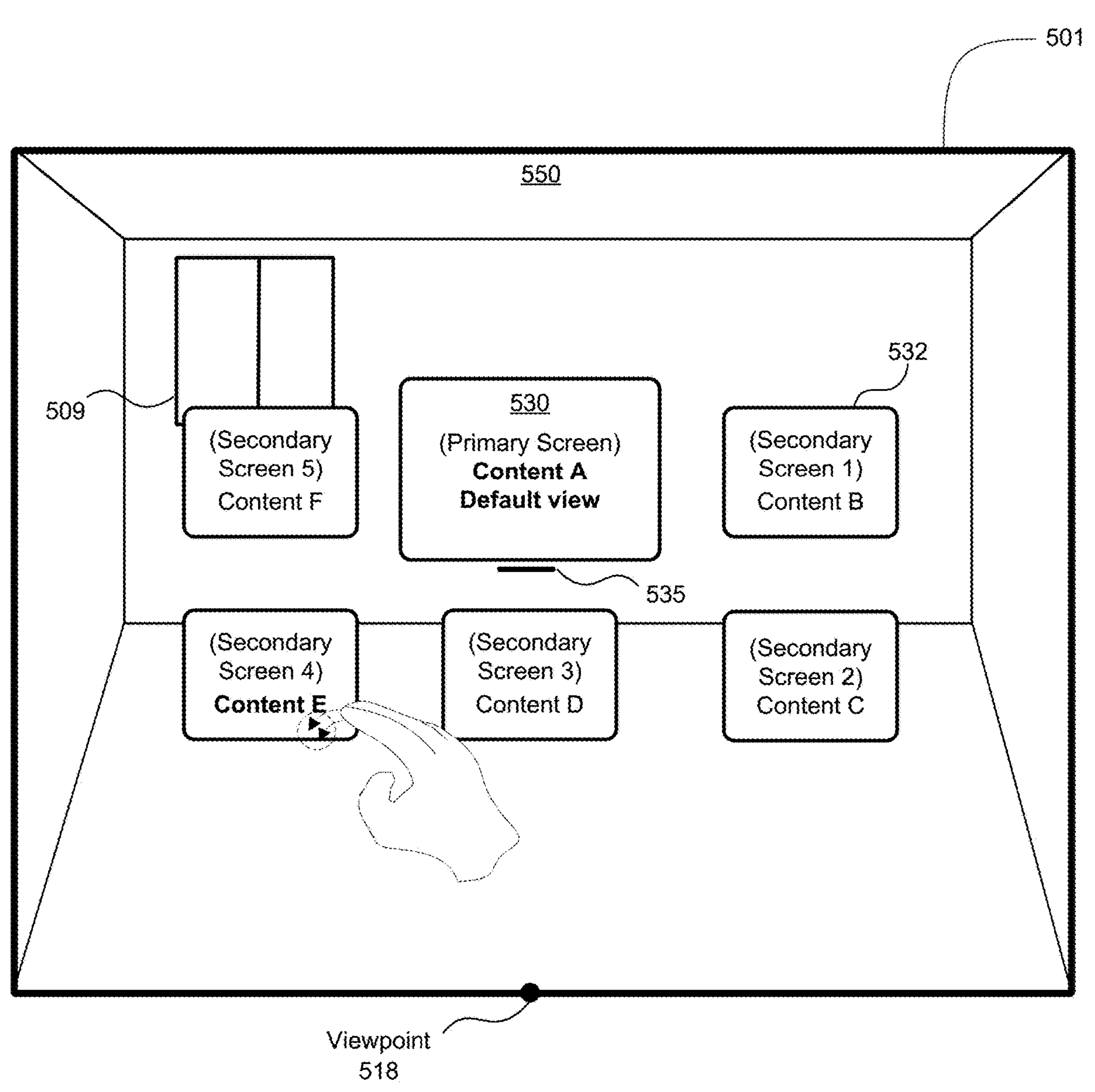
FIG. 5D illustrates the swapping of content items between a primary viewing screen and a secondary viewing screen in response to viewer interaction according to some examples of the disclosure.

FIG. 5D illustrates the swapping of content items between primary viewing screen 530 and a secondary viewing screen 532 in response to viewer interaction according to some examples of the disclosure. In the example of FIG. 5D, primary viewing screen 530 and a plurality of secondary viewing screens 532 are presenting unrelated content items. To change the presentation of specific content items from Secondary Screen 4 to primary viewing screen 530 (and correspondingly change the presentation of content items from the primary viewing screen to Secondary Screen 4), in some examples a viewer can position a representation of the viewer's hand within a threshold virtual distance of Secondary Screen 4 and perform a two finger tap gesture (or other recognized gesture or viewer/user input) over Secondary Screen 4. When that gesture is detected by the multi-view playback application, representing the satisfaction of a criterion for updating the viewing screens, the content items of Secondary Screen 4 is switched to be presented in primary viewing screen 530, while the content items of the primary viewing screen is switched to be presented in Secondary Screen 4.

Figure 5E:
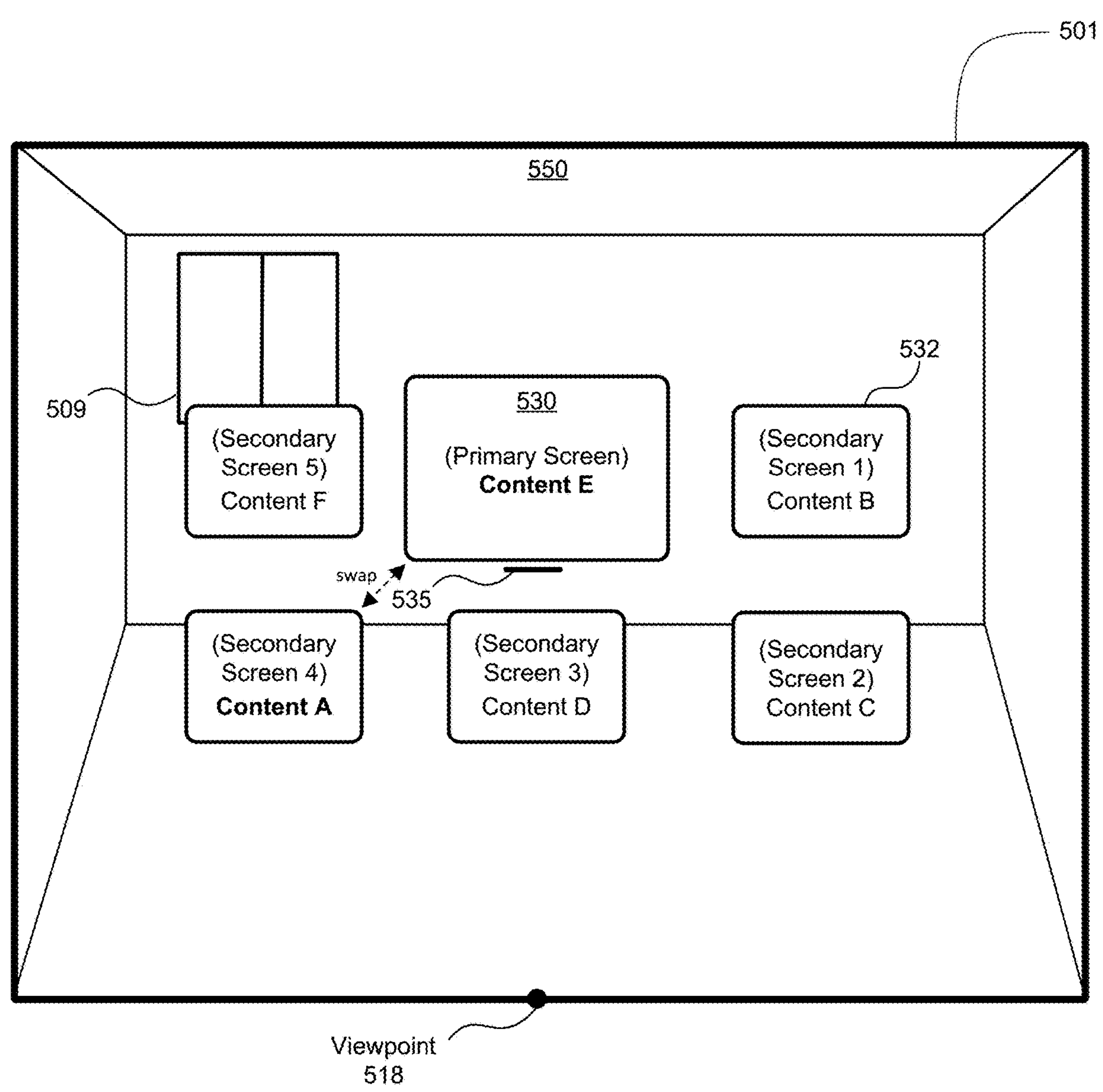
FIG. 5E illustrates the result of swapping content items between a primary viewing screen and a secondary viewing screen in response to a two finger tap gesture according to some examples of the disclosure.

FIG. 5E illustrates the result of swapping content items between primary viewing screen 530 and Secondary Screen 4 in response to the two finger tap gesture of FIG. 5D according to some examples of the disclosure. In the example of FIG. 5E, the locations of the viewing screens designated as primary viewing screen 530 and Secondary Screen 4 have not changed, only the content items presented in those screens has changed. However, in an alternative example not shown in FIG. 5E, the location of the presented content items does not change, but rather the designations of the viewing screens changes (e.g., the screen previously designated Secondary Screen 4 in FIG. 5E is re-designated as the primary viewing screen, and the screen previously designated as the primary viewing screen is re-designated as Secondary Screen 4).

Figure 5F:
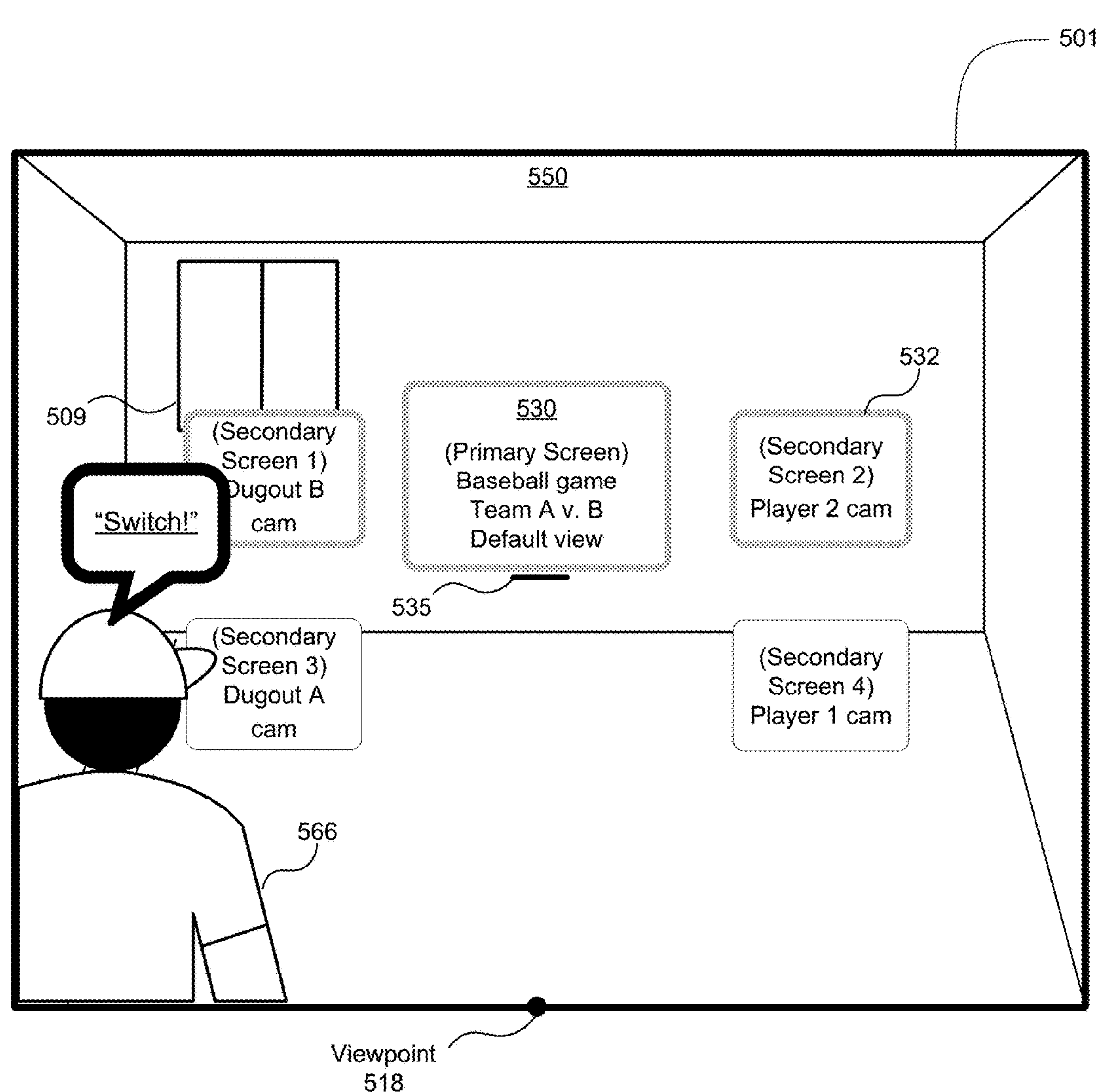
FIG. 5F illustrates receiving an input from a second viewer in a multi-user communication session to switch control of a primary viewing screen to a first viewer according to some examples of the disclosure.

FIG. 5F illustrates receiving an input from a second viewer in a multi-user communication session to switch control of primary viewing screen 530 to a first viewer according to some examples of the disclosure. The example of FIG. 5F is a continuation of the example of FIG. 4E, where the first viewer has accepted the second viewer's invitation to join a multi-user communication session, with the second viewer retaining control of primary viewing screen 430, Secondary Screen 1 and Secondary Screen 2. However, in the example of FIG. 5F, the second viewer is giving the first viewer control of primary viewing screen 530, and therefore issues a user input such as a voice command (e.g., "Switch!") to relinquish control of the primary viewing screen to the first user, representing the satisfaction of a criterion for updating the content items of one or more viewing screens. However, in other examples, other viewer/user inputs such as other voice commands, gestures and the like can be employed to relinquish control to other viewers/users in the multi-user communication session. Although the example of FIG. 5F is presented in the context of a sporting event, the principles of FIG. 5F are also applicable to non-sporting events.

Figure 5G:
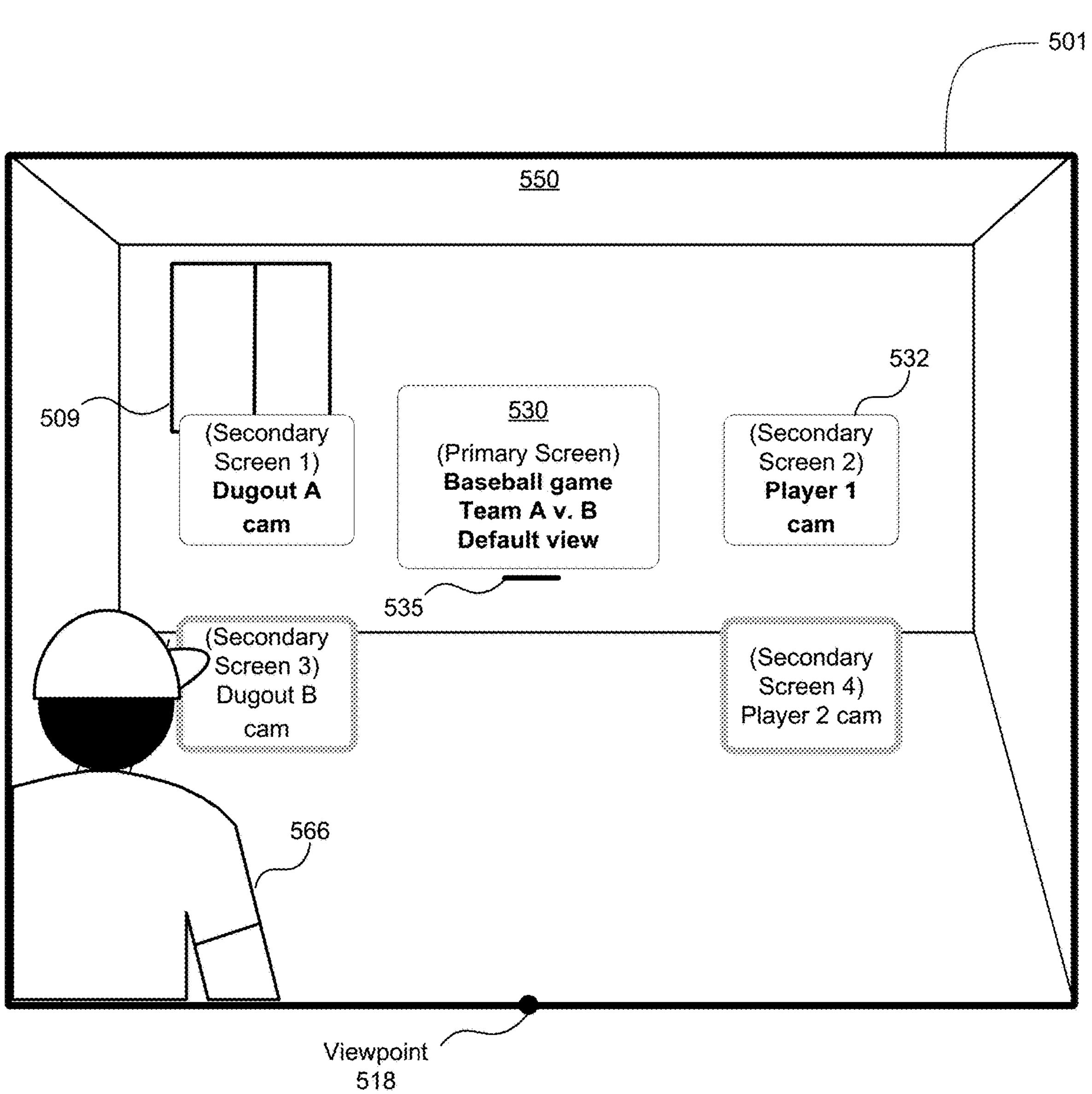
FIG. 5G illustrates the result of the switching of control in a multi-user communication session according to some examples of the disclosure.

FIG. 5G illustrates the result of the switching of control in a multi-user communication session according to some examples of the disclosure. FIG. 5G is a continuation of the example of FIG. 5F, where the second viewer has issued a command to relinquish control of primary viewing screen 530 (and also Secondary Screens 1 and 2) to the first viewer. As a result, the first viewer's content items selections for primary viewing screen 530, Secondary Screen 1 and Secondary Screen 2 are restored, and the second viewer's content items selections for Secondary Screen 1 and Secondary Screen 2 are relocated to Secondary Screen 3 and Secondary Screen 4. In this way, both participants in a multi-user communication session can take turns having control over primary viewing screen 530 during the multi-user communication session.

Figure 5H:
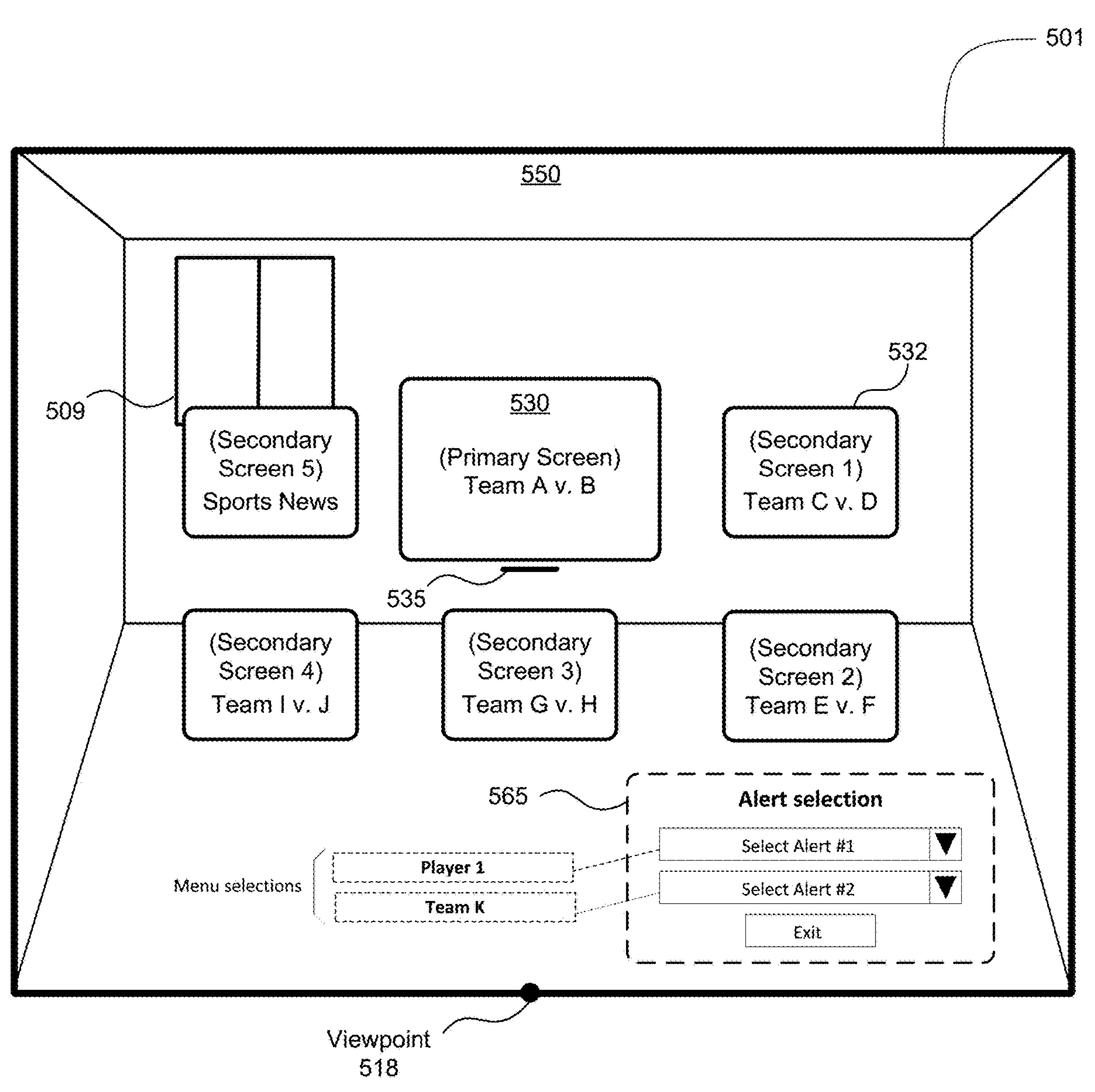
FIG. 5H illustrates an alert selection user interface for selecting alerts that trigger the automatic presentation of content items in one or more viewing screens according to some examples of the disclosure.

FIG. 5H illustrates alert selection user interface 565 for selecting alerts that trigger the automatic presentation of content items in one or more viewing screens according to some examples of the disclosure. Alert selection user interface 565 can be utilized when the viewer wishes to establish one or more alerts (e.g., a favorite player, a favorite team, etc.) that the multi-view playback application can continuously search for. Once the subject matter of the alert is detected, content items related to the alert can automatically appear in primary viewing screen 530 and optionally other secondary viewing screens 532. The viewer can initiate the process of selecting alerts by providing input (not shown) to the multi-view playback application, which then causes alert selection user interface 565 to appear. In the example of FIG. 5H, alert selection user-interface 565 is a window floating in 3D environment 550 that includes pulldown menus to select one or more alerts (e.g., a favorite team or player, a keyword, a certain time in a sporting event, a particular event, etc.). However, it should be understood that this user interface is merely an illustrative example, and that other user interfaces capable of receiving viewer input can alternatively be employed. In the example of FIG. 5H, six different sporting events are being presented in six viewing screens, and the viewer has selected a person-based alert for Player 1 and an entity-based alert for Team K, representing a criterion for updating the content item(s) in one or more viewing screens. Although the example of FIG. 5H is presented in the context of a sporting event, the principles of FIG. 5H are also applicable to non-sporting events.

Figure 5I:
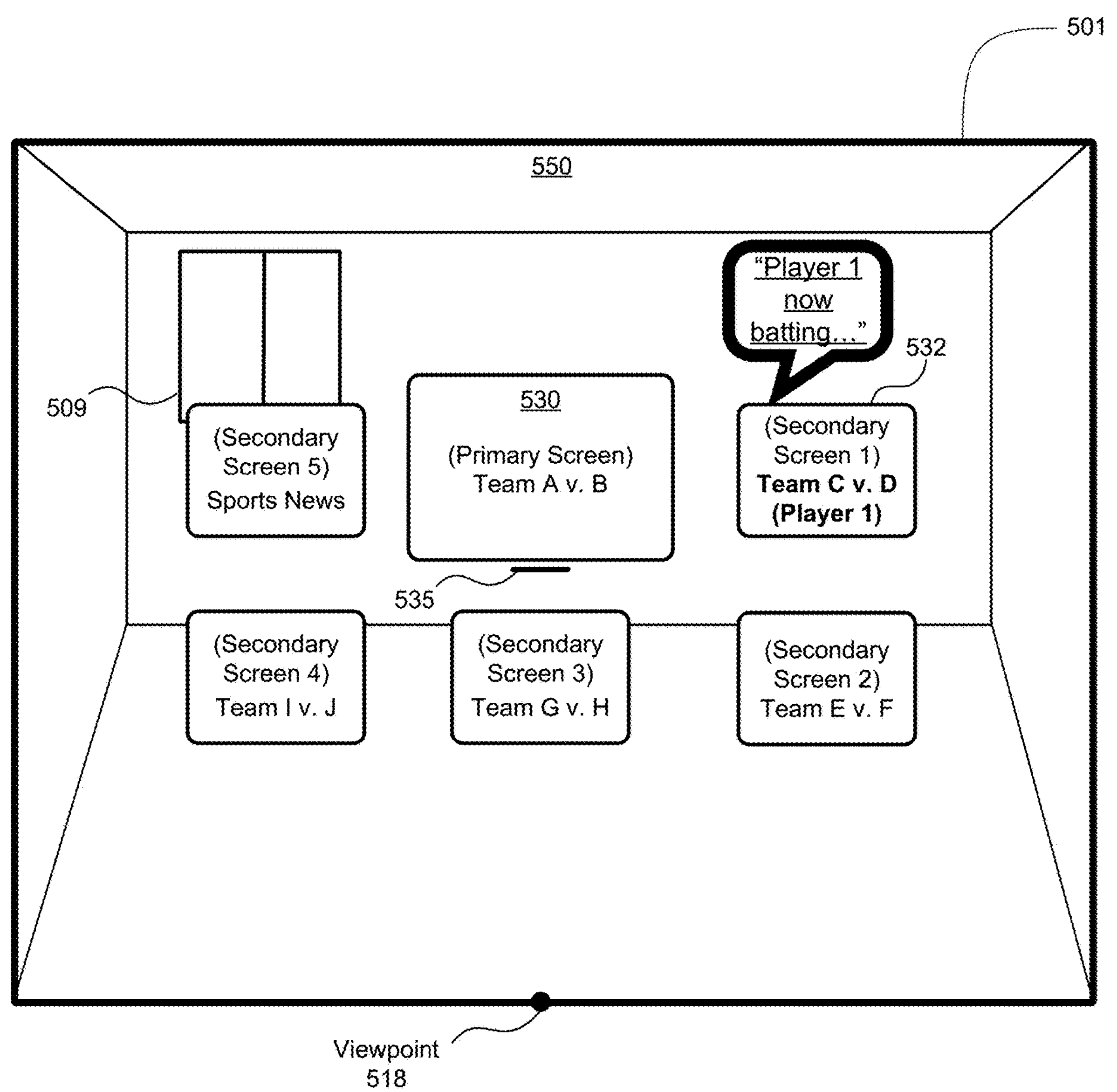
FIG. 5I illustrates the detection of a person-based alert according to some examples of the disclosure.

FIG. 5I illustrates the detection of a person-based alert according to some examples of the disclosure. FIG. 5I is a continuation of the example of FIG. 5H, where a person-based alert for Player 1 and an entity-based alert for Team K were established by the viewer. In the example of FIG. 5I, Player 1 is now at bat in a baseball game featuring Teams C and D. In one example of the detection of an alert, the multi-view playback application has detected metadata in the video feed for Team C v. D, indicating that Player 1 is now being featured. In another example of the detection of an alert, the multi-view playback application has utilized voice recognition to detect an announcer saying "Player 1 is now batting." Both instances represent the satisfaction of a criterion for updating the content items being displayed in one or more of the viewing screens.

Figure 5J:
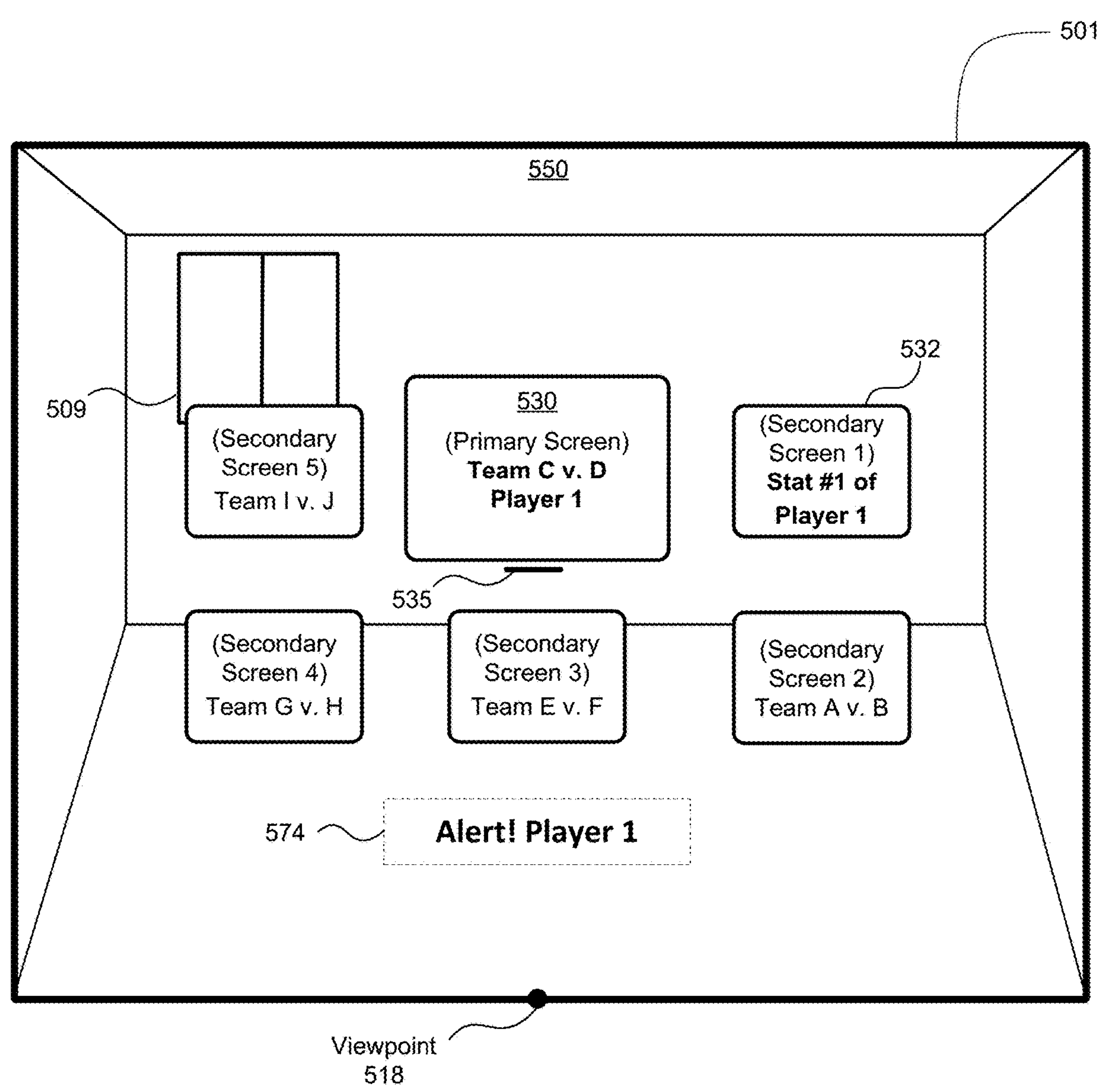
FIG. 5J illustrates the changing of content items in viewing screens due to the detection of a person-based alert according to some examples of the disclosure.

FIG. 5J illustrates the changing of content items in viewing screens due to the detection of a person-based alert according to some examples of the disclosure. FIG. 5J is a continuation of FIG. 5I, where Player 1 has been detected as appearing in the game featuring Team C v. D. Because of the detection of Player 1, the baseball game featuring Teams C and D is automatically switched to primary viewing screen 530 so that the at bat for Player 1 can be enjoyed by the viewer. In some examples, one or more secondary viewing screens can automatically present additional content items related to Player 1 in accordance with selections made by the viewer (in user interfaces not shown herein). For example, in FIG. 5J Secondary Screen 1 has automatically switched to present Stat #1 of Player 1. In some examples, secondary viewing screens 532 are prioritized (e.g., in order from Secondary Screen 1 to Secondary Screen 5 and beyond), such that the content items previously presented in the viewing screens of FIG. 5J are pushed down to lower priority secondary viewing screens. In the example of FIG. 5J, Team A v. B, previously presented in primary viewing screen 530, now appears in Secondary Screen 2; Team E v. F, previously presented in Secondary Screen 2, now appears in Secondary Screen 3, and so on. Sports News, previously presented on Secondary Screen 5, is no longer displayed in any viewing screen. In some examples, message 574 or other indicator (e.g., a flashing border of primary viewing screen 530, etc.) can be presented in 3D environment 550 to notify the viewer that an alert has been detected.

Figure 5K:
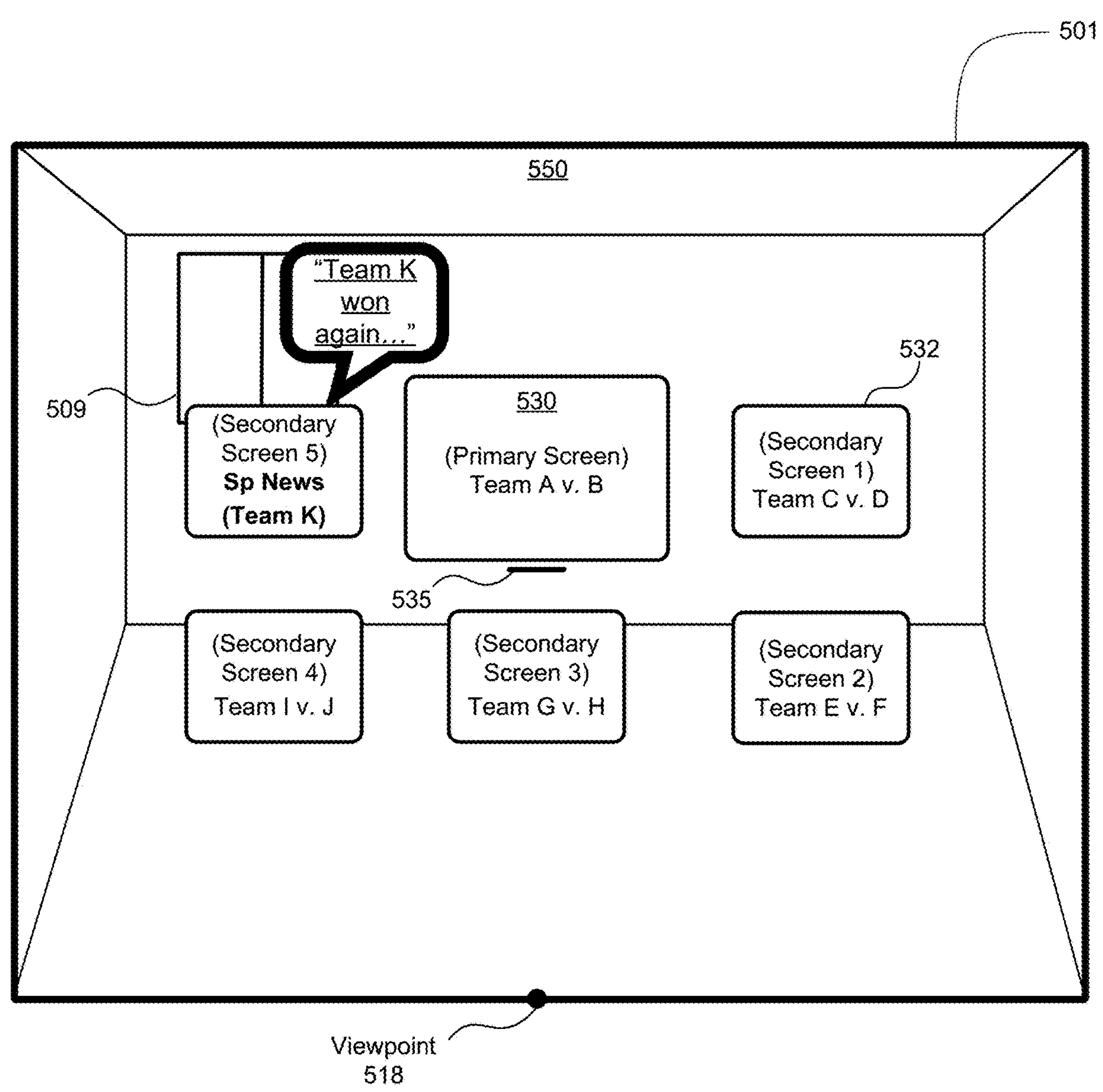
FIG. 5K illustrates the detection of an entity-based alert according to some examples of the disclosure.

FIG. 5K illustrates the detection of an entity-based alert according to some examples of the disclosure. FIG. 5K is a continuation of the example of FIG. 5H, where alerts for Player 1 and Team K were established by the viewer. In the example of FIG. 5K, broadcast sports news is being presented in Secondary Screen 5. In one example of the detection of an alert, the multi-view playback application has detected metadata in the video feed for Sports News, indicating that content items related to Team K is being presented. In another example of the detection of an alert, the multi-view playback application has utilized voice recognition to detect a sports reporter saying "Team K won again." Both instances represent the satisfaction of a criterion for updating content items being displayed in one or more of the viewing screens.

Figure 5L:
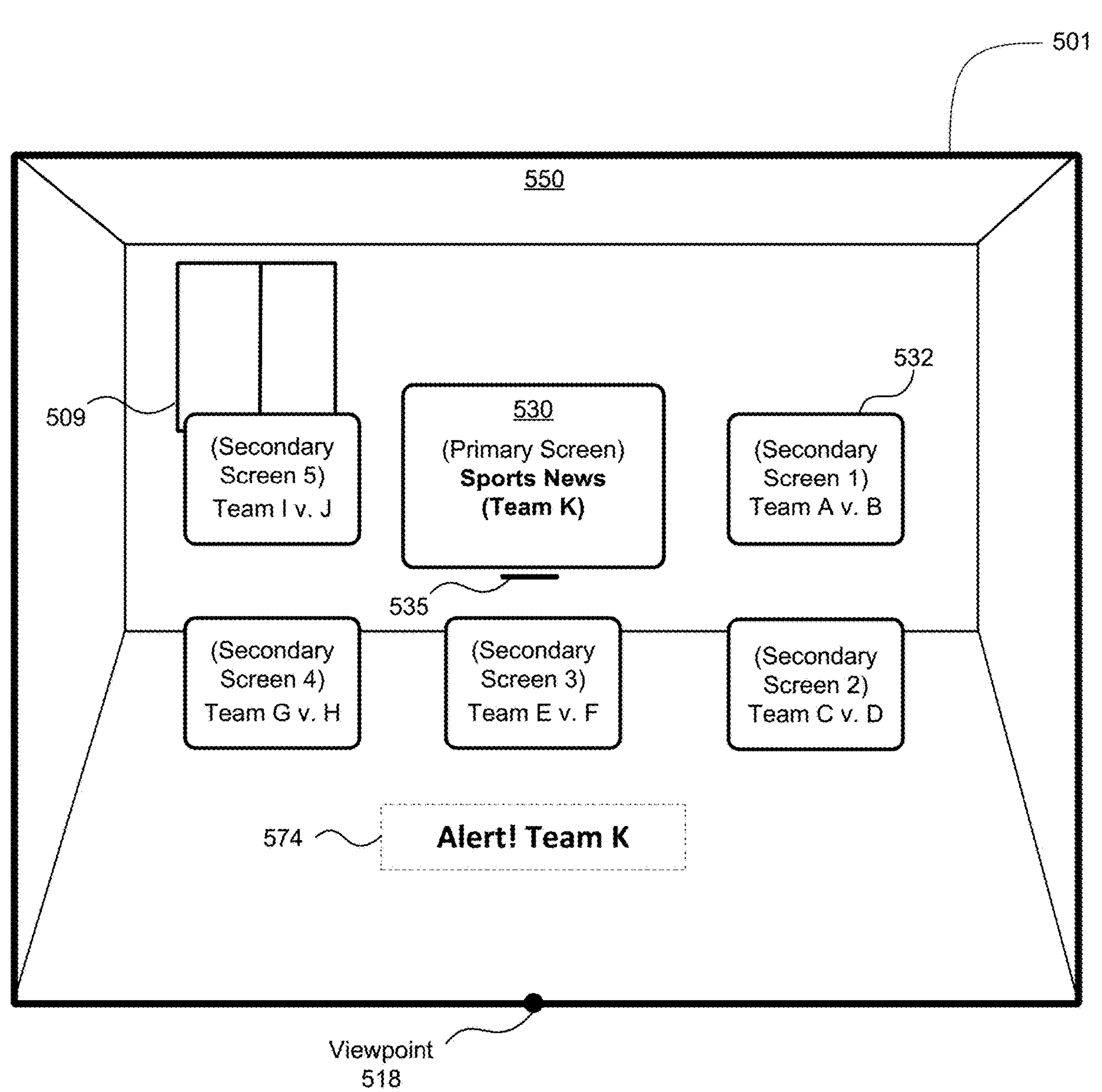
FIG. 5L illustrates the changing of content items in viewing screens due to the detection of an entity-based alert according to some examples of the disclosure.

FIG. 5L illustrates the changing of content items in viewing screens due to the detection of an entity-based alert according to some examples of the disclosure. FIG. 5J is a continuation of FIG. 5I, where Team K has been detected in the presentation of Sports News in Secondary Screen 5. Because of the detection of Team K, the sports news is automatically switched to primary viewing screen 530 so that the highlights of discussion of Team K can be enjoyed by the viewer. In some examples, the content items of secondary viewing screens 532 can be pushed down in priority to lower priority secondary viewing screens, as shown in FIG. 5L. In some examples, message 574 or other indicator (e.g., a flashing border of primary viewing screen 530, etc.) can be presented in 3D environment 550 to notify the viewer that an alert has been detected.

Figure 5M:
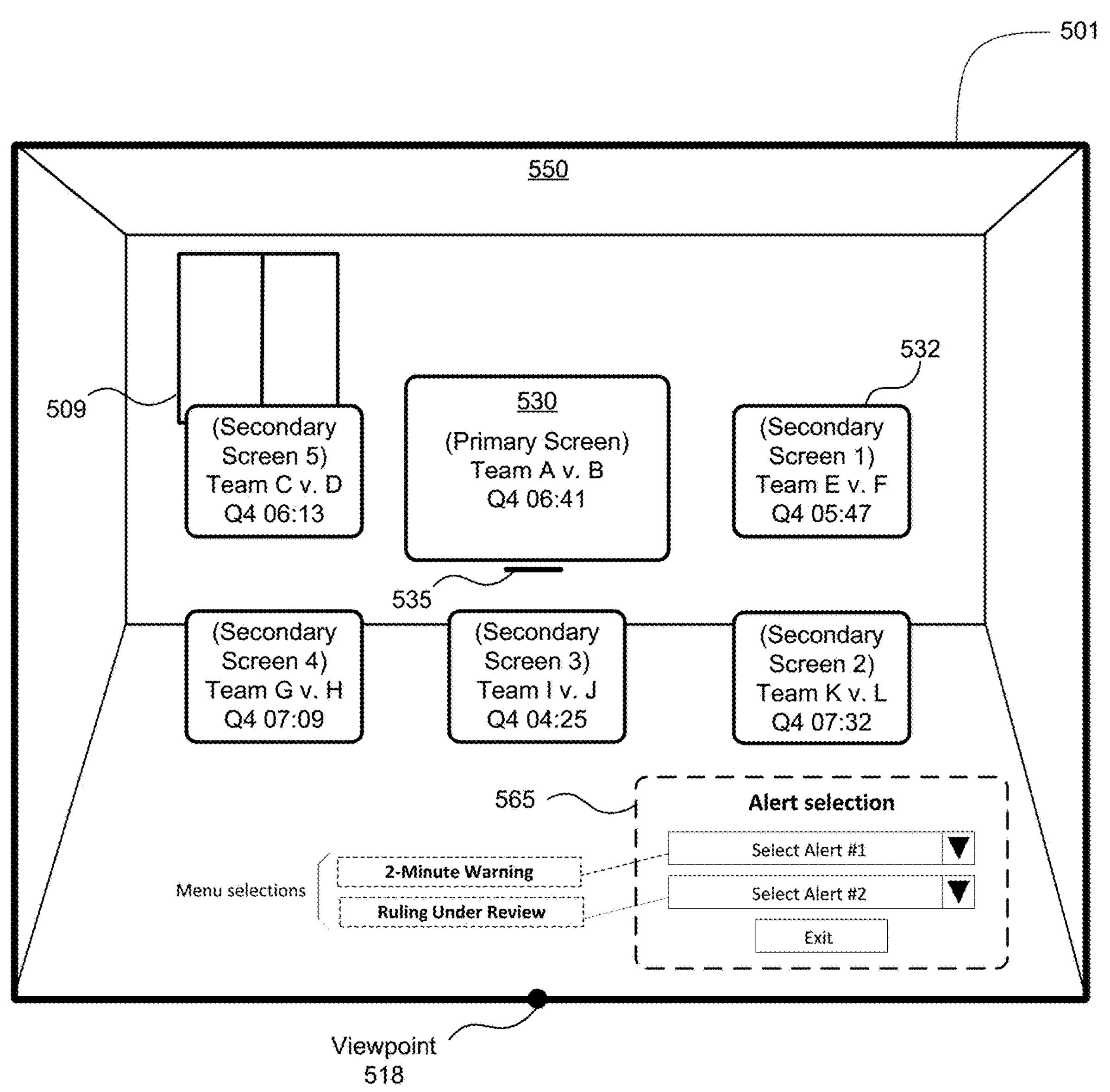
FIG. 5M illustrates the selection of a time-based alert and an event-based alert by a viewer in the context of sporting events according to some examples of the disclosure.

FIG. 5M illustrates the selection of a time-based alert and an event-based alert by a viewer in the context of sporting events according to some examples of the disclosure. In the example of FIG. 5M, six different American football games are being presented in six viewing screens, each game having a game clock, and the viewer has selected a time-based alert, a 2-Minute Warning, and an event-based alert, Ruling Under Review (when a Referee's decision is being reviewed for correctness), representing criterion for updating the content items being displayed in one or more viewing screens. Although the example of FIG. 5M is presented in the context of a sporting event, the principles of FIG. 5M are also applicable to non-sporting events. For example, a time-based alert can be selected to switch a program of interest to the viewer to primary viewing screen 530 when 10 minutes is left in the program, during which time a conclusion may be revealed.

Figure 5N:
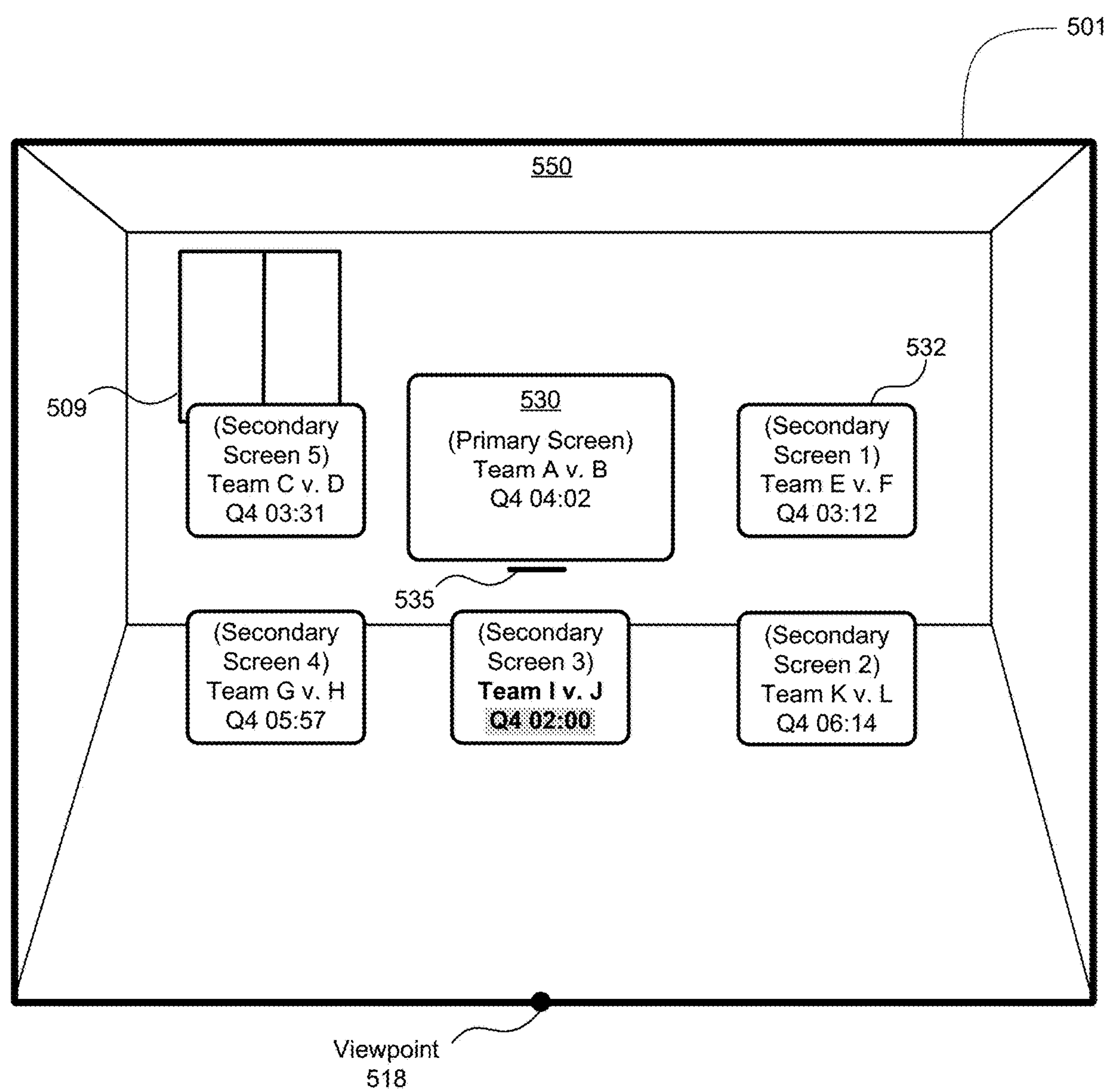
FIG. 5N illustrates the detection of a time-based alert according to some examples of the disclosure.

FIG. 5N illustrates the detection of a time-based alert according to some examples of the disclosure. FIG. 5N is a continuation of the example of FIG. 5M, where alerts for a 2-Minute Warning and a Ruling Under Review were established by the viewer. In the example of FIG. 5L, the American football game featuring Team I v. J has reached the 2-minute warning, as indicated by the game clock showing "Q4 02:00," representing the satisfaction of a criterion for updating the content items in one or more viewing screens.

Figure 5O:
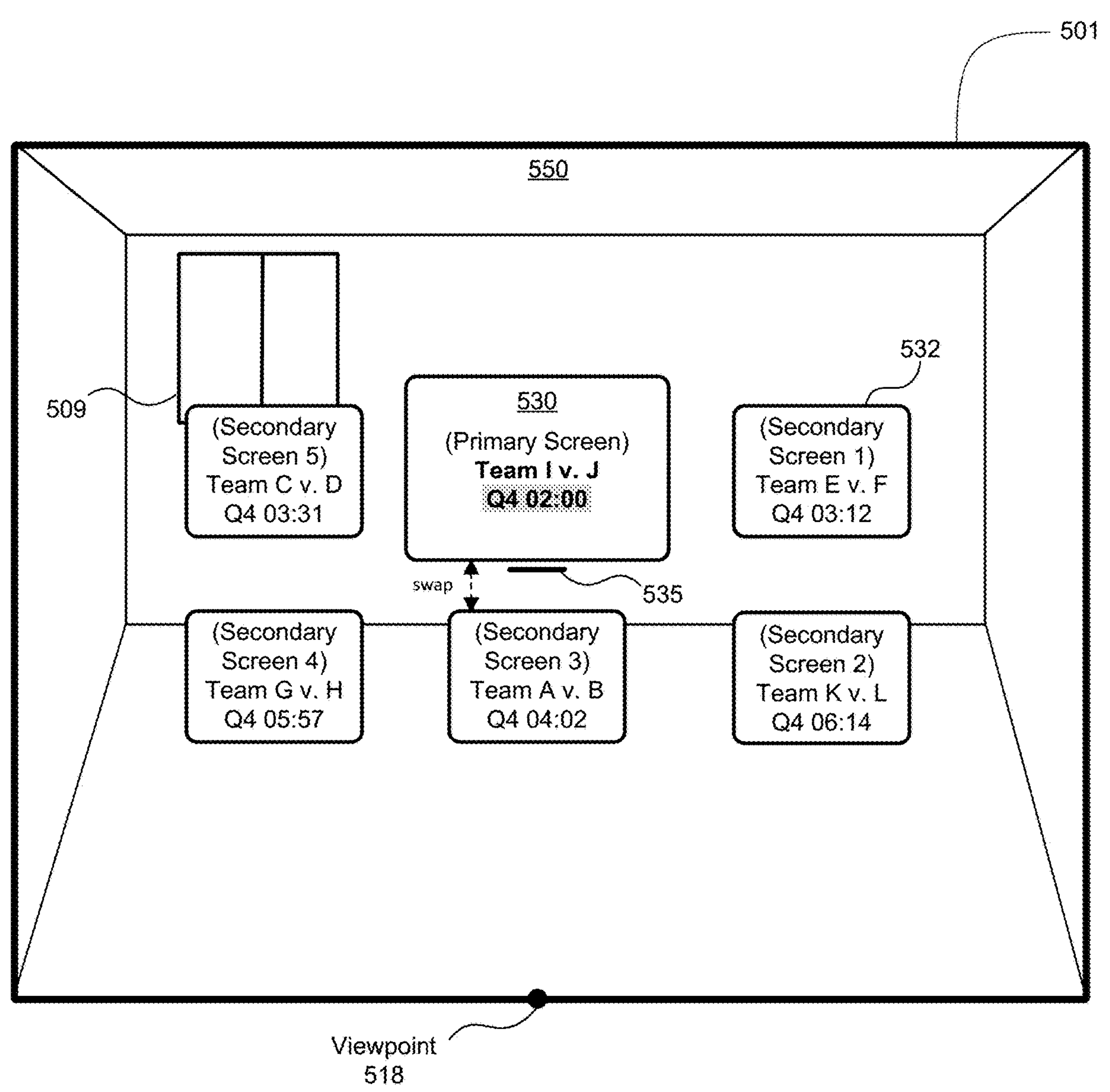
FIG. 5O illustrates the changing of content items in viewing screens due to the detection of a time-based alert according to some examples of the disclosure.

FIG. 5O illustrates the changing of content items in viewing screens due to the detection of a time-based alert according to some examples of the disclosure. FIG. 5O is a continuation of the example of FIGS. 5M and 5N, where the viewer has selected a 2-Minute Warning as an alert (FIG. 5M), and the game featuring Team I v. J has reached the 2-minute warning (FIG. 5N). Because of the detection of the 2-minute warning in the game featuring Team I v. J, which was previously being presented in Secondary Screen 3, that game is now switched to being presented in primary viewing screen 530, while the game featuring Team A v. B, which was previously being presented in the primary viewing screen, has now been switched to Secondary Screen 3. In this manner, the last two minutes of the game featuring Team I v. J, which can be an exciting and impactful part of the game, can now be enjoyed by the viewer in primary viewing screen 530.

Figure 5P:
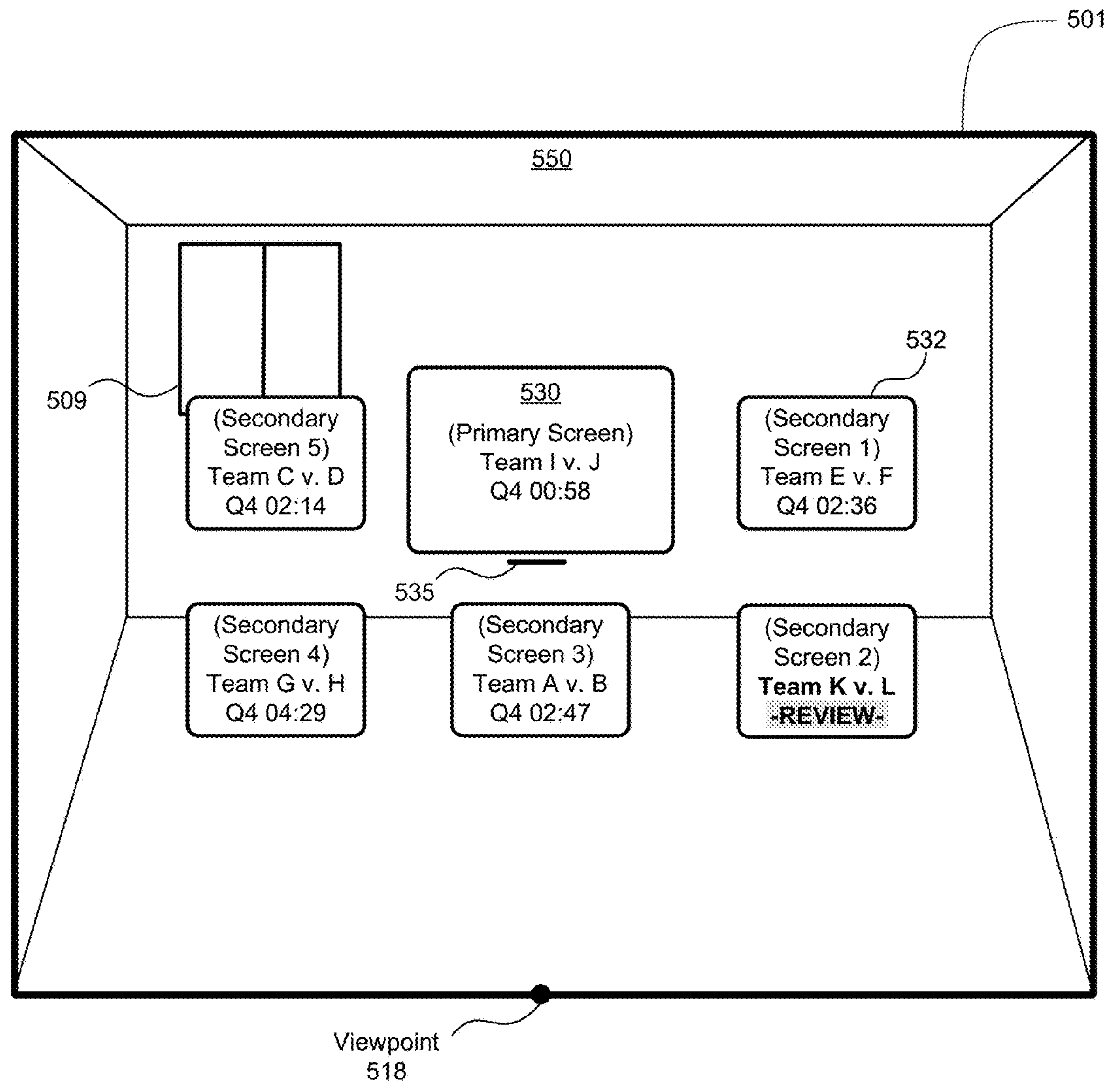
FIG. 5P illustrates the detection of an event-based alert according to some examples of the disclosure.

FIG. 5P illustrates the detection of an event-based alert according to some examples of the disclosure. FIG. 5P is a continuation of the example of FIG. 5M, where alerts for a 2-Minute Warning and a Ruling Under Review were established by the viewer. In the example of FIG. 5P, a Ruling Under Review is now occurring in the American football game featuring Team K v. L, representing the satisfaction of a criterion for updating the content items displayed in one or more viewing screens.

Figure 5Q:
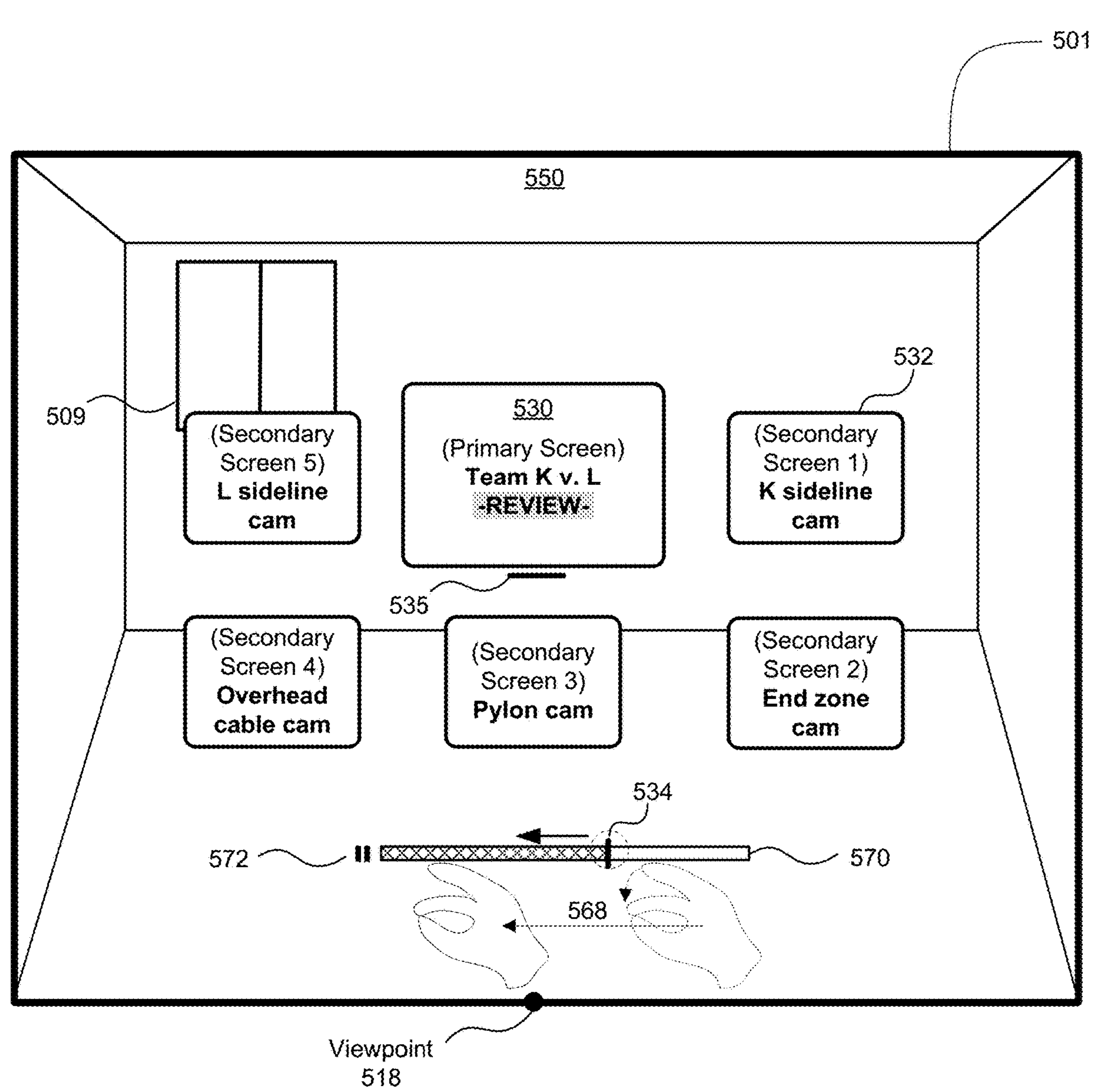
FIG. 5Q illustrates the changing of content items in viewing screens due to the detection of an event-based alert according to some examples of the disclosure.

FIG. 5Q illustrates the changing of content items in viewing screens due to the detection of an event-based alert according to some examples of the disclosure. FIG. 5Q is a continuation of the example of FIG. 5P, where a Ruling Under Review is occurring in the game featuring Team K v. L. In the example of FIG. 5Q, metadata indicating a ruling under review is present in the video feed for Team K v. L, and the multi-view playback application has detected this metadata. Because of the detection of the Ruling Under Review in the game featuring Team K v. L, which was previously being presented in Secondary Screen 2, that game is now switched to being presented in primary viewing screen 530. In addition, if recently recorded (not live) content items from other cameras are available to the viewer (and selected as part of the Ruling Under Review alert in a user interface not shown herein), in some examples these content items can be presented in secondary viewing screens 532. In the example of FIG. 5Q, the recently recorded video from a camera on the sideline of Team K ("K sideline cam") can be presented in Secondary Screen 1, the recently recorded video from a camera in an end zone ("End zone cam") can be presented in Secondary Screen 2, the recently recorded video from an overhead cable camera ("Overhead cable cam") can be presented in Secondary Screen 4, and the recently recorded video from a camera on the sideline of Team L ("L sideline cam") can be presented in Secondary Screen 5.

If the content items in secondary viewing screens 532 are synchronized in time with each other, in some examples the multi-view playback application can provide the viewer with the ability to change the current playback position of the content items in the secondary viewing screens. To accomplish this, a player bar 570 (discussed above with respect to FIGS. 5A and 5B) can be presented in 3D environment 550 to enable the viewer to change the current playback position. Electronic device 501 can then detect scrubbing input 568 over player bar 570 to change the current playback position of the content items being presented in secondary viewing screens 532, representing the satisfaction of a criterion for updating the content items displayed in one or more viewing screens, in some instances to replay the play that resulted in the ruling under review. In this manner, the viewer can see and replay various camera angles of the play that is currently under view, and form an opinion on the ruling being reviewed.

Figure 5R:
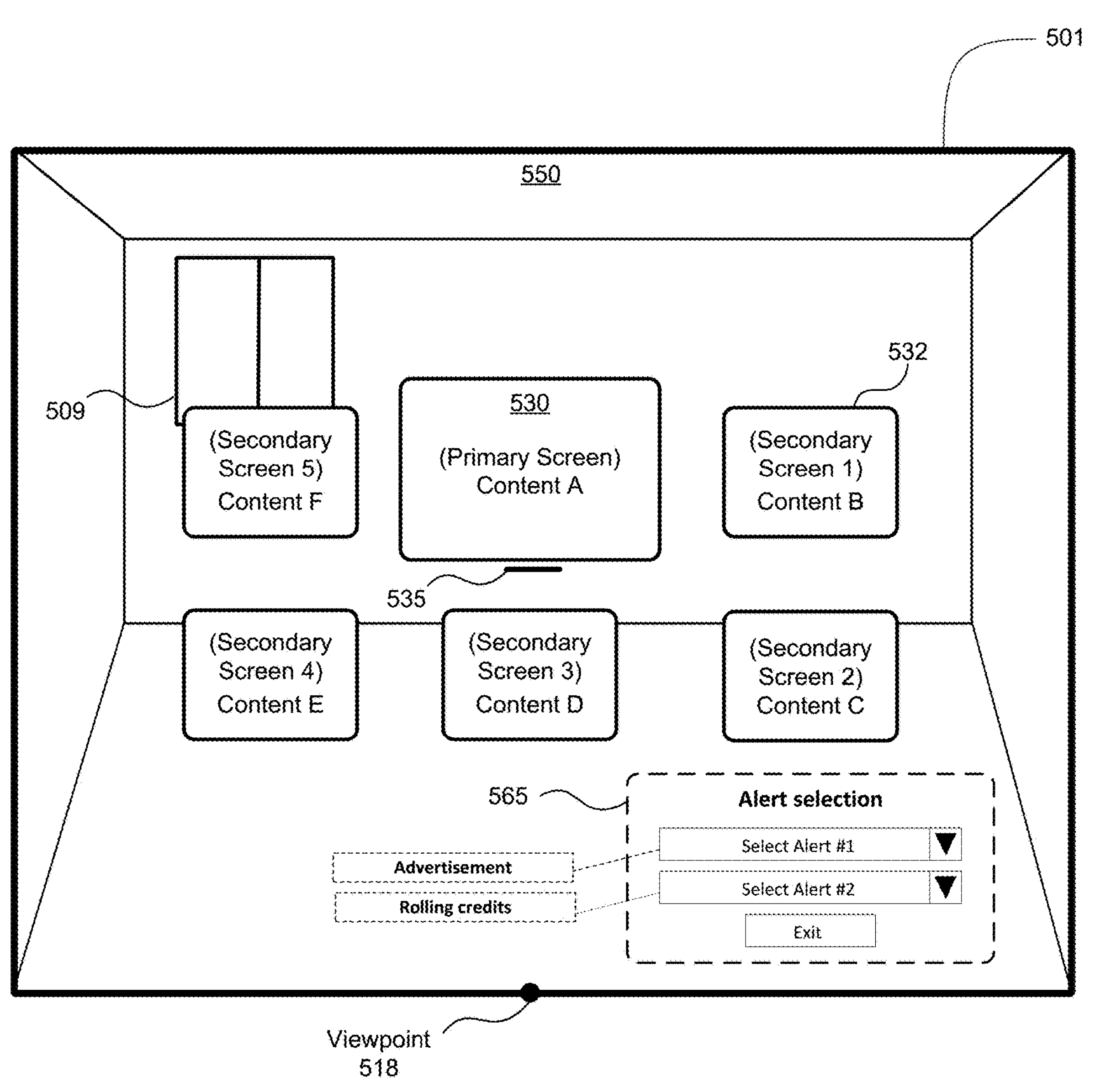
FIG. 5R illustrates the selection of two different negative event-based alerts by a viewer in a non-sports context according to some examples of the disclosure.

FIG. 5R illustrates the selection of two different negative event-based alerts by a viewer in a non-sports context according to some examples of the disclosure. In the example of FIG. 5R, different content items (Content items A-F) are being presented in six viewing screens, and the viewer has selected two negative event-based alerts, an Advertisement alert and a Rolling Credits alert, representing criteria for updating the content items displayed in one or more viewing screens. Negative event-based alerts, unlike regular event-based alerts, are events that the viewer considers to be negative, and thus if such an event is detected in the content items being presented in primary viewing screen 530, the viewer would like to switch away from that content items, at least temporarily.

Figure 5S:
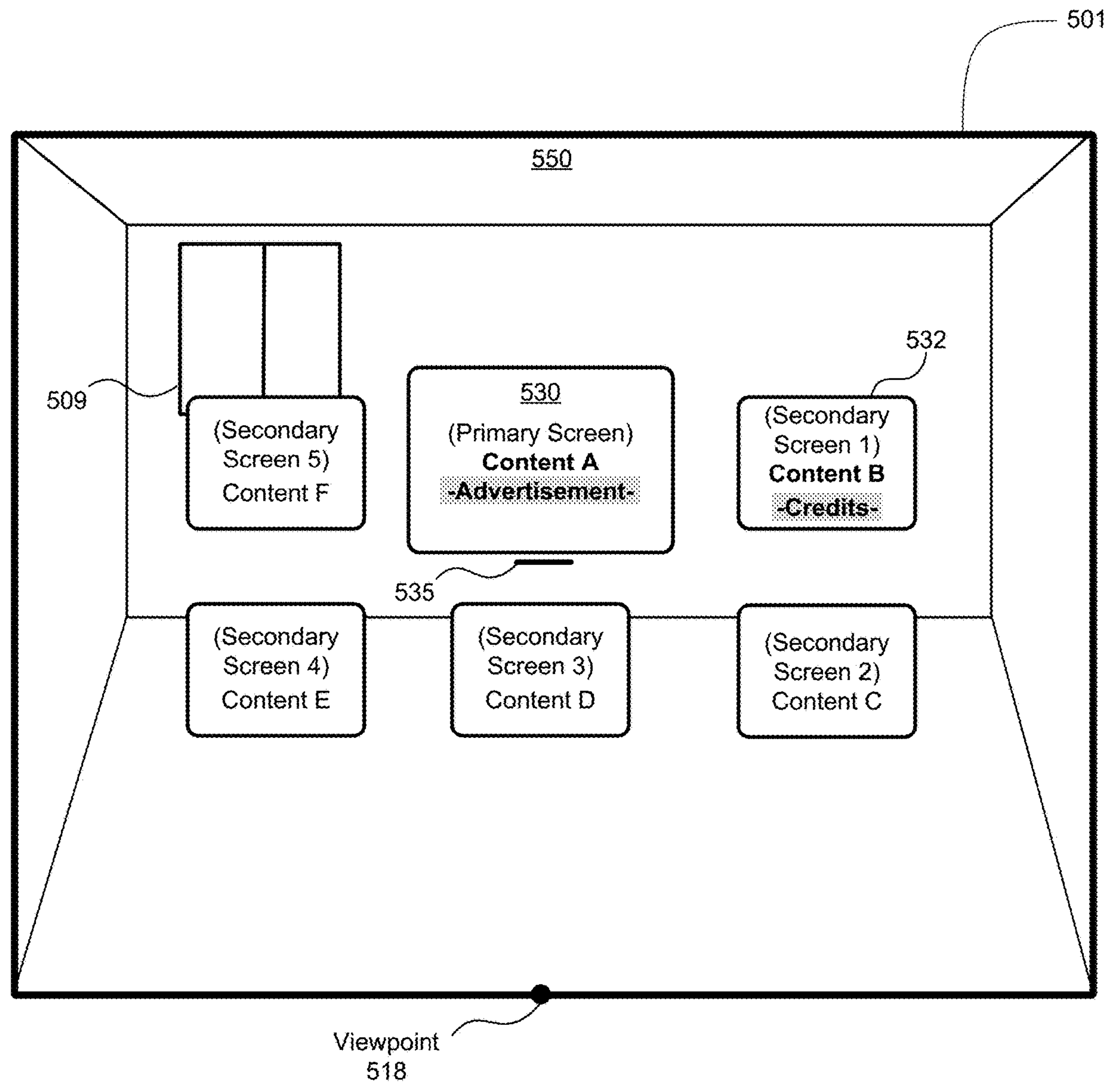
FIG. 5S illustrates the detection of two negative event-based alerts in a non-sports context according to some examples of the disclosure.

FIG. 5S illustrates the detection of two negative event-based alerts in a non-sports context according to some examples of the disclosure. FIG. 5S is a continuation of the example of FIG. 5R, where negative event-based alerts for an Advertisement and Rolling Credits were established by the viewer. In the example of FIG. 5S, an advertisement (e.g., a commercial) has been detected in Content items A being presented in primary viewing screen 530, and rolling credits have been detected in Content items B being presented in Secondary Screen 1, representing satisfaction of criteria for updating the content items in one or more viewing screens.

Figure 5T:
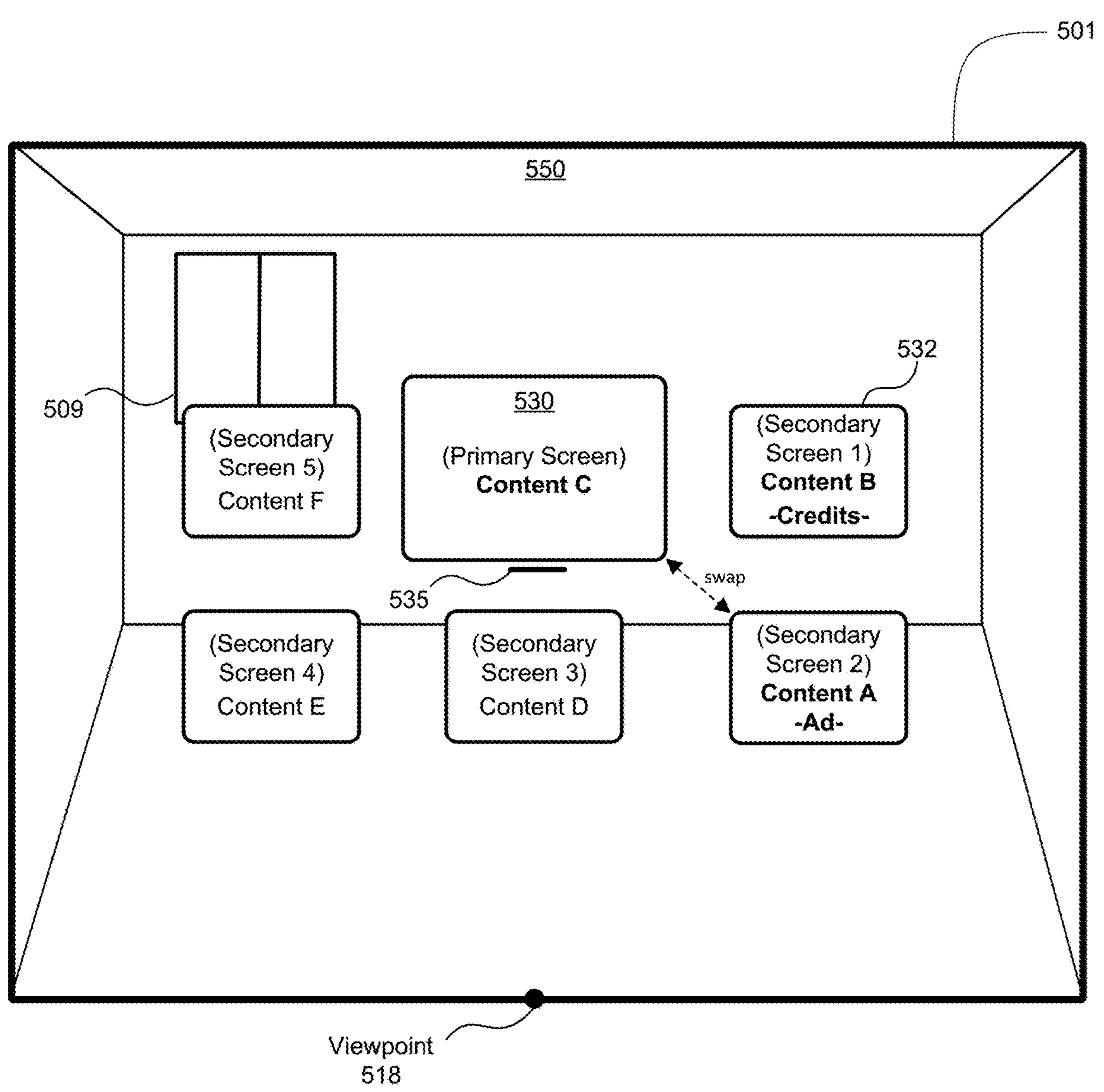
FIG. 5T illustrates the changing of content items in viewing screens due to the detection of an event-based alert in a non-sports context according to some examples of the disclosure.

FIG. 5T illustrates the changing of content items in viewing screens due to the detection of an event-based alert in a non-sports context according to some examples of the disclosure. FIG. 5T is a continuation of the example of FIGS. 5R and 5S, where the viewer has selected an Advertisement alert and a Rolling Credits alert (FIG. 5R), and an advertisement has been detected in Content items A being presented in primary viewing screen 530, and rolling credits have been detected in Content items B being presented in Secondary Screen 1 (FIG. 5S). Because of the detection of an advertisement in Content items A previously being presented in primary viewing screen 530, Content items A is now being presented in Secondary Screen 2, while Content items C, which was previously being presented in Secondary Screen 2, in now being presented in the primary viewing screen. Note that Content items B in Secondary Screen 1 was not moved to primary viewing screen 530, because rolling credits were detected in Content items B. In this manner, the viewer can continue to watch content items of interest, rather than an advertisement or rolling credits.

Figure 5U:
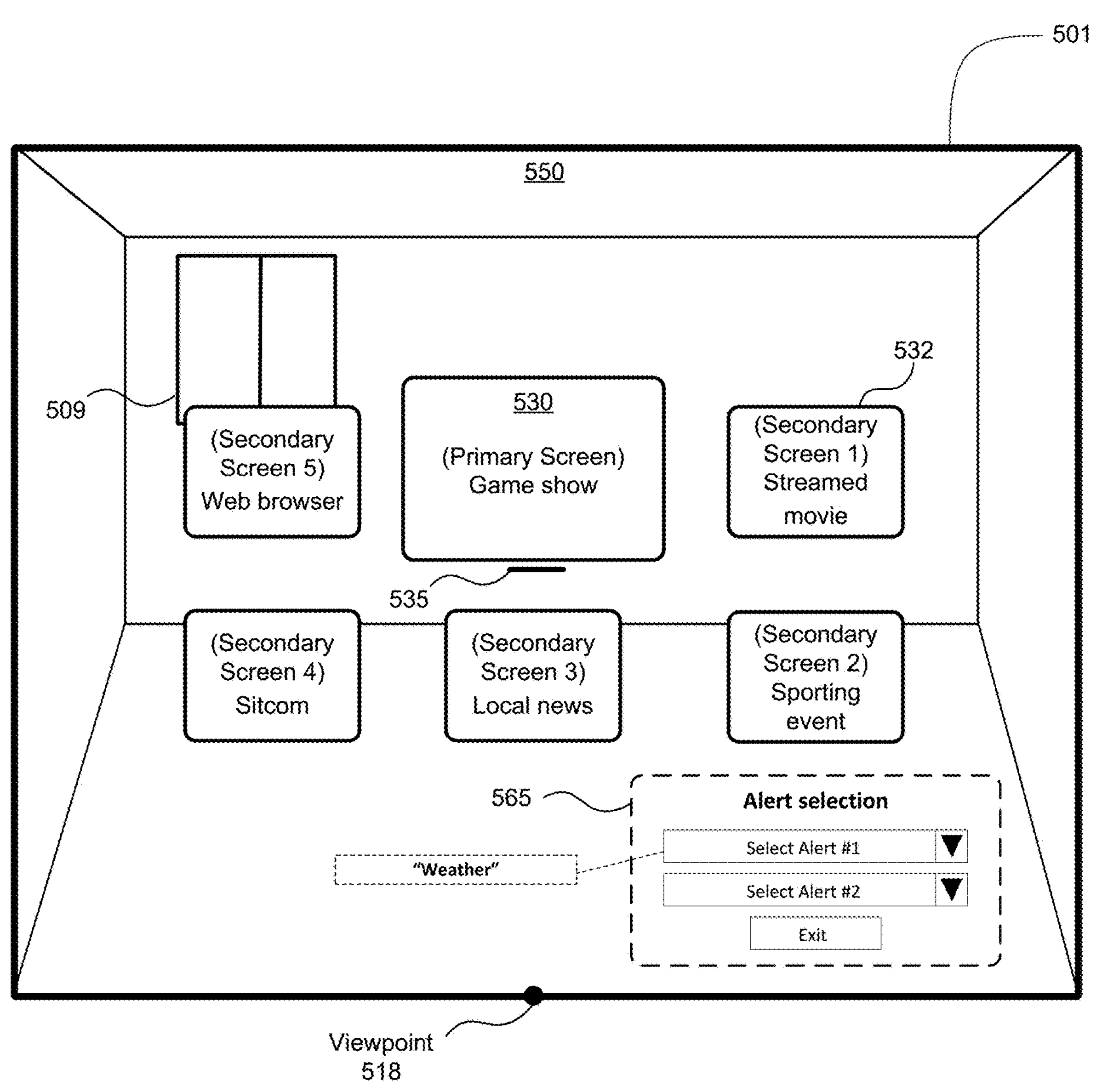
FIG. 5U illustrates the selection of a topic-based alert by a viewer in a non-sports context according to some examples of the disclosure.

FIG. 5U illustrates the selection of a topic-based alert by a viewer in a non-sports context according to some examples of the disclosure. In the example of FIG. 5U, different content items are being presented in six viewing screens, and the viewer has selected a topic-based alert, Weather, representing a criterion for updating the content items displayed in one or more viewing screens.

Figure 5V:
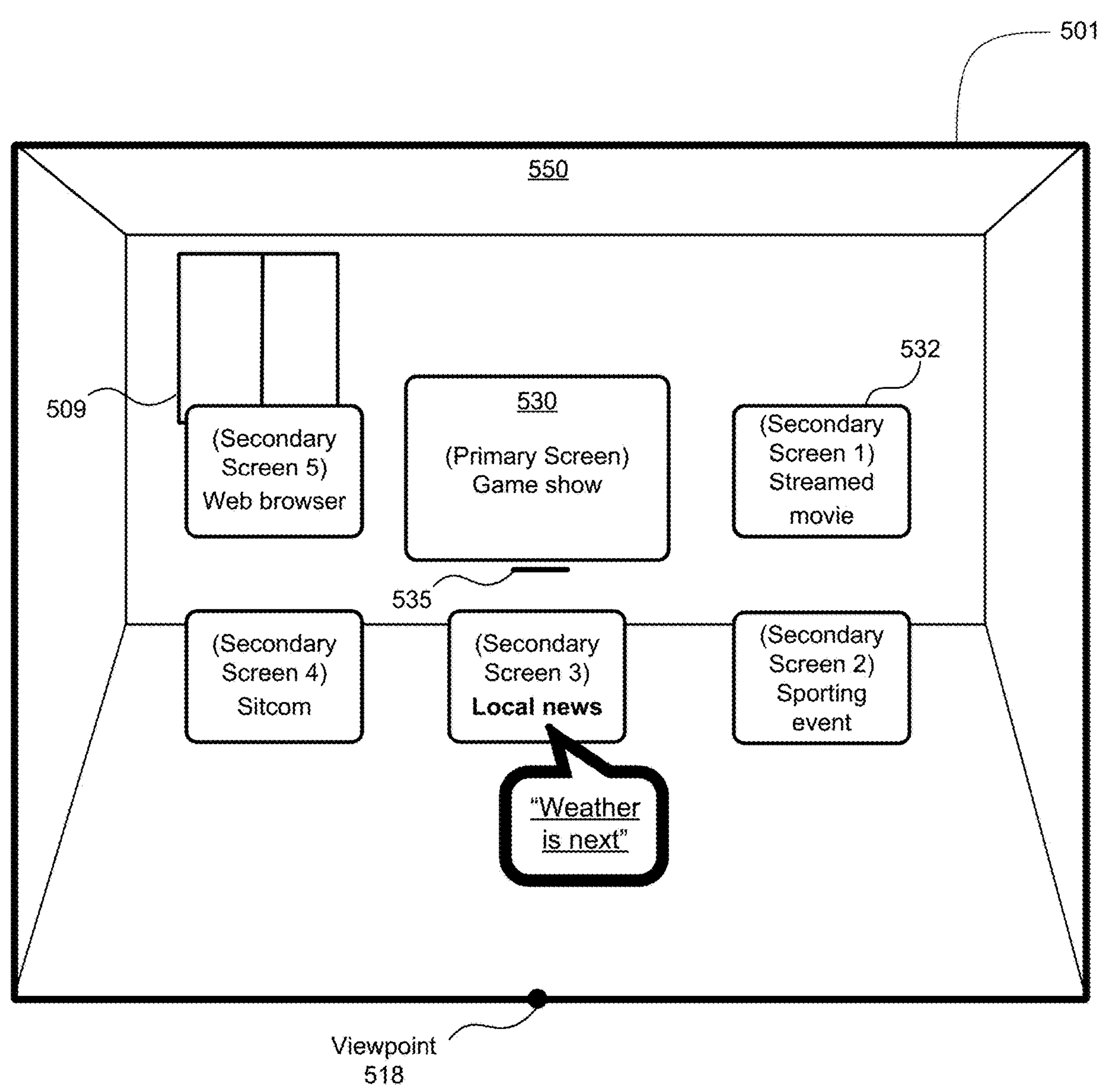
FIG. 5V illustrates the detection of a topic-based alert in a non-sports context according to some examples of the disclosure.

FIG. 5V illustrates the detection of a topic-based alert in a non-sports context according to some examples of the disclosure. FIG. 5V is a continuation of the example of FIG. 5U, where a topic-based alert for Weather was established by the viewer. In the example of FIG. 5V, a news anchor's statement that "weather is next" has been detected in local news being presented in Secondary Screen 3, representing the satisfaction of a criterion for updating the content items displayed in one or more viewing screens.

Figure 5W:
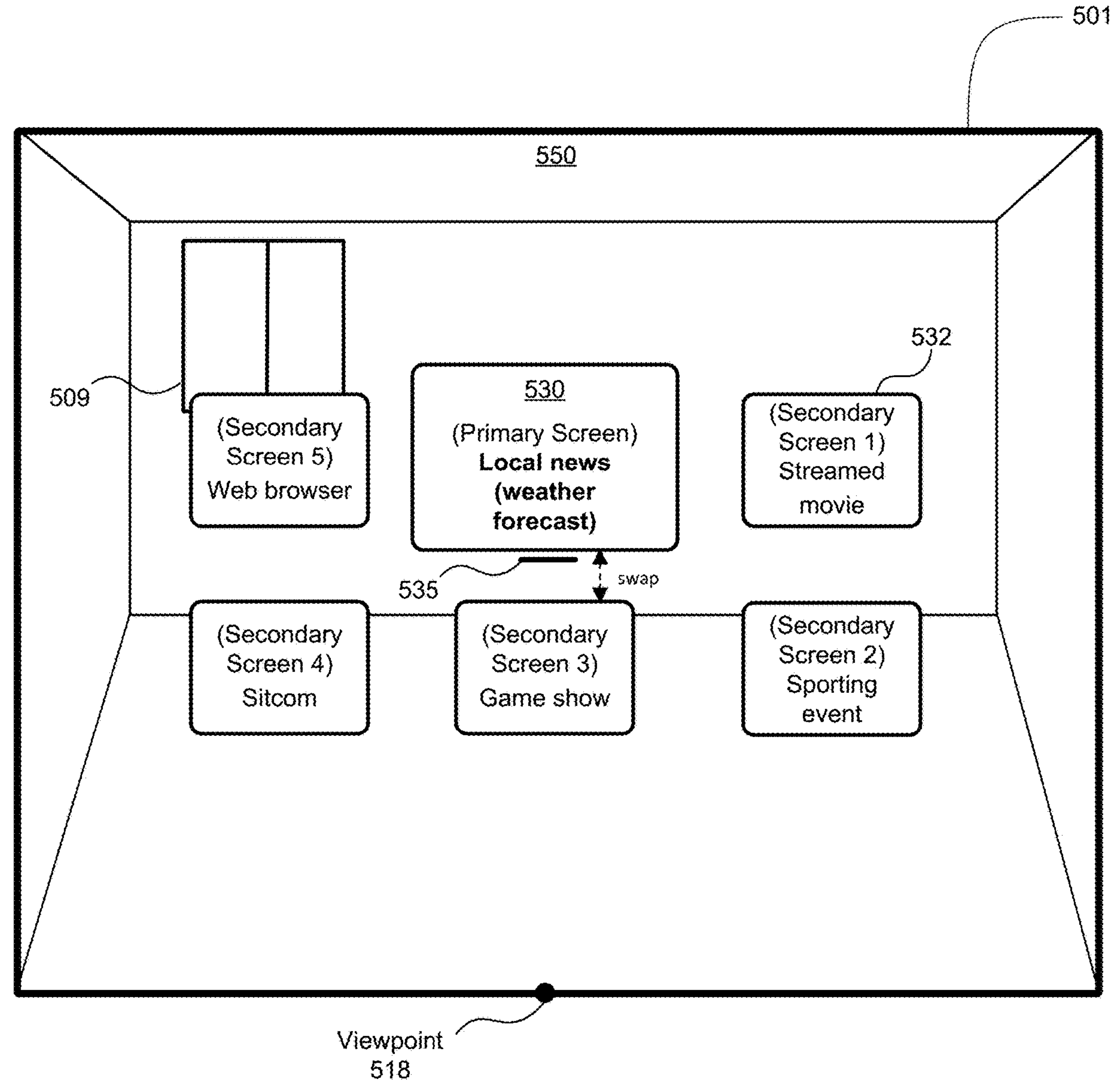
FIG. 5W illustrates the changing of content items in viewing screens due to the detection of a topic-based alert in a non-sports context according to some examples of the disclosure.

FIG. 5W illustrates the changing of content items in viewing screens due to the detection of a topic-based alert in a non-sports context according to some examples of the disclosure. FIG. 5W is a continuation of the example of FIG. 5V, where the topic "Weather" has been detected in local news being presented in Secondary Screen 3. Because of the detection of the topic "Weather" in local news previously being presented in Secondary Screen 3, the local news is now being presented in primary viewing screen 530, while a game show, which was previously being presented in the primary viewing screen, in now being presented in Secondary Screen 3. This can enable the viewer to watch the local news in primary viewing screen 530 to find out about the upcoming weather situation.

Figure 6:
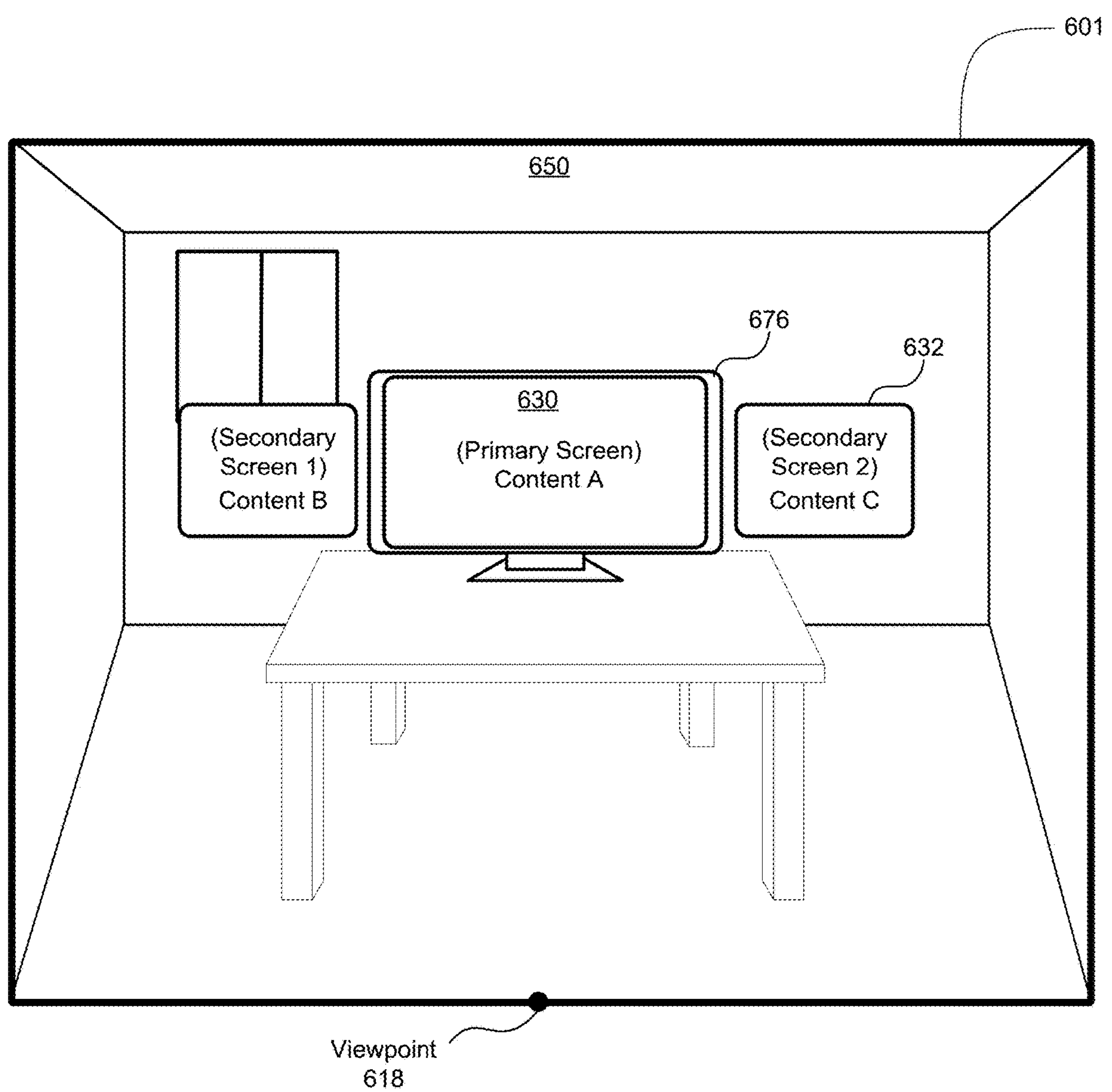
FIG. 6 illustrates an example 3D environment including a physical television or monitor that is viewed through a transparent or translucent display of an electronic device and appears in the 3D environment as a pass-through object along with virtual secondary viewing screens according to some examples of the disclosure.

FIG. 6 illustrates an example 3D environment 650 including a physical television or monitor 676 that is viewed through a transparent or translucent display of electronic device 601 and appears in the 3D environment as an optical see-through object along with virtual secondary viewing screens according to some examples of the disclosure. The configuration of FIG. 6 can be beneficial when some content items are only available on physical television or monitor 676, and is not available on electronic device 601. The display of the physical television or monitor is referred to herein as primary viewing screen 630. As shown in FIG. 6, primary viewing screen 630 is displaying a content item (e.g., "Content A"), which can be live or pre-recorded content items. In addition, electronic device 601 is displaying a plurality of virtual playback user interfaces representing a plurality of secondary viewing screens 632 in the three-dimensional environment 650. Although two secondary viewing screens 632 are shown in the example of FIG. 6, in other examples different numbers of secondary viewing screens in different arrangements around primary viewing screen 630 can also be employed. In some examples, the plurality of secondary viewing screens 632 are associated with a video playback application running on the electronic device 601, such as a media browsing application. In some examples, each secondary viewing screen 632 is configured to display content items in the three-dimensional environment 650, such as two-dimensional video content items. As shown in FIG. 6, secondary viewing screens 332 are displaying different content items (e.g., Content items B and C), which can be live or pre-recorded content items.

In some examples, a viewer can select content items for presentation on secondary viewing screens 632 as described above. In some examples, a viewer can set up alerts so that content items can automatically appear on secondary viewing screens 632, similar to the alerts described above. In some examples, the physical television or monitor can be in electronic communication (e.g., wired, Bluetooth, etc.) with electronic device 601 such that the electronic device can receive information on metadata present in the video data for the physical television or monitor, and can select or change content items being presented in secondary viewing screens 632 in a manner similar to that described above.

Figure 7:
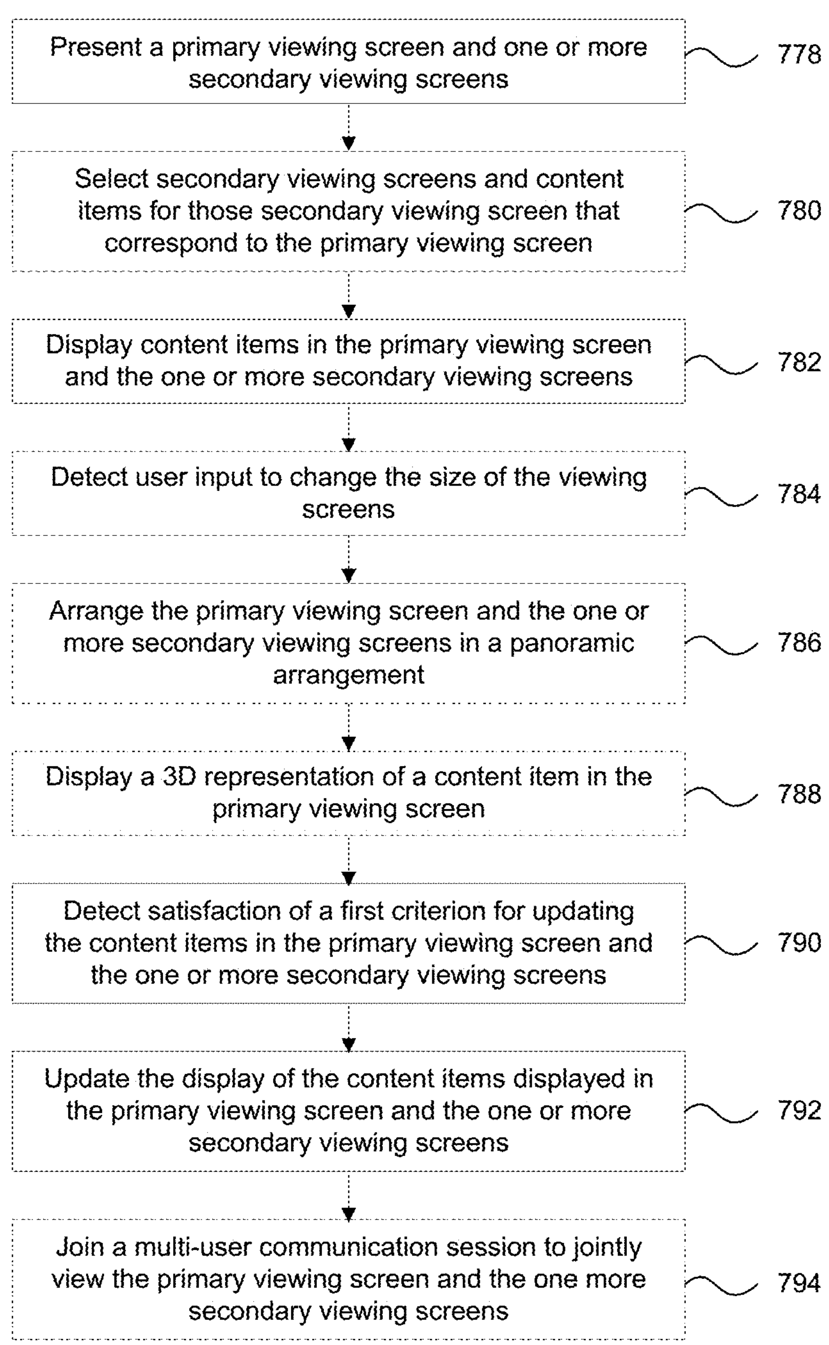
FIG. 7 is a flow diagram illustrating an example process for displaying and updating content items in a primary viewing screen and one or more secondary viewing screens in a computer-generated environment according to some examples of the disclosure.

FIG. 7 is a flow diagram illustrating an example process for displaying and updating content items in a primary viewing screen and one or more secondary viewing screens in a computer-generated environment according to some examples of the disclosure. In some examples, the process begins at an electronic device in communication with a display and one or more input devices. In some examples, the electronic device is optionally a head-mounted display similar or corresponding to electronic device 201 of FIG. 2. As shown in FIG. 7, at 778, the electronic device presents, via the display, a computer-generated environment including a primary viewing screen and one or more secondary viewing screens. (See, e.g., FIGS. 3A-3J, 4A-4G, 5A-5W, and 6.) Optionally, at 780, a viewer can select one or more secondary viewing screens, and content items to be displayed in those viewing screens, that corresponds to the content item being displayed in the primary viewing screen. (See, e.g., FIGS. 3A-3J, 4A-4G, 5A-5W, and 6.) At 782, the electronic device displays content items in the primary viewing screen and the one or more secondary viewing screens. (See, e.g., FIGS. 3A-3J, 4A-4G, 5A-5W, and 6.) Optionally, at 784, a viewer can provide input to change the size of one or more viewing screens. (See, e.g., FIGS. 3B, 3I, 3J and 5C.) Optionally, at 786, a viewer can provide input to arrange the primary viewing screen and the one or more secondary viewing screens in various configurations, such as in a panoramic arrangement for viewing in a 3D environment. (See, e.g., FIGS. 3D-3G, 5C-5G and 5T.) Optionally, at 788, a viewer can provide input to display a 3D representation of a content item being presented in the primary viewing screen. (See, e.g., FIG. 3H.) At 790, the electronic device can detect satisfaction of a criterion, established by the viewer, for updating content items in the primary viewing screen and optionally the one or more secondary viewing screens. (See, e.g., FIGS. 4A-4C, 5A, 5C, 5D, 5F, 5H, 5J-5N, 5P-5S and 5U-5W.) At 792, in response to the detection of the satisfaction of updating criterion, the electronic device can update the content items being displayed in the primary viewing screen and the one or more secondary viewing screens. (See, e.g., FIGS. 5B, 5E, 5G, 5I, 5O, 5Q, 5T, 5W.) Optionally, at 794, the viewer can provide input to join a multi-user communication session to jointly view the primary viewing screen and the one or more secondary viewing screens. (See, e.g., FIGS. 4D-4G, 5F and 5G.)

It is understood that the process of FIG. 7 is an example and that more, fewer, or different operations can be performed in the same or in a different order. Additionally, the operations in FIG. 7 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at an electronic device in communication with a display and one or more input devices, presenting, via the display, a computer-generated environment including a primary viewing screen and one or more secondary viewing screens that are configured to display content items, displaying a first content item in the primary viewing screen in the computer-generated environment, and displaying one or more second content items in the one or more secondary viewing screens in the computer-generated environment, while displaying the first content item in the primary viewing screen and the one or more second content items in the one or more secondary viewing screens in the computer-generated environment, detecting satisfaction of a first criterion for updating at least one of the first content item displayed in the primary viewing screen and the one or more second content items displayed in the one or more secondary viewing screens, and in response to detecting the satisfaction of the first criterion, updating display of at least one of the first content item being displayed in the primary viewing screen and the one or more second content items being displayed in the one or more secondary viewing screens. Additionally or alternatively to one or more of the examples disclosed above, in some examples detecting the satisfaction of the first criterion comprises detecting a user input at a first secondary viewing screen of the one or more secondary screens, and in response to detecting the user input at the first secondary viewing screen, updating display of the first content item being displayed in the primary viewing screen by replacing display of the first content item in the primary viewing screen with a second content item being displayed in the first secondary viewing screen. Additionally or alternatively to one or more of the examples disclosed above, in some examples in response to detecting the user input at the first secondary viewing screen, updating display of the second content item being displayed in the first secondary viewing screen by replacing display of the second content item in the first secondary viewing screen with the first content item. Additionally or alternatively to one or more of the examples disclosed above, in some examples detecting the user input comprises detecting a gaze at the first secondary viewing screen for an amount of time exceeding a first threshold. Additionally or alternatively to one or more of the examples disclosed above, in some examples detecting the user input comprises detecting, via the one or more input devices, a gesture performed by a representation of a hand within a threshold virtual distance of the first secondary screen. Additionally or alternatively to one or more of the examples disclosed above, in some examples detecting satisfaction of the first criterion comprises detecting satisfaction of an alert criterion, and in response to detecting satisfaction of the alert criterion, replacing display of the first content item with a different content item in the primary viewing screen. Additionally or alternatively to one or more of the examples disclosed above, in some examples the alert criterion comprises detection of an indication of a selected person. Additionally or alternatively to one or more of the examples disclosed above, in some examples the alert criterion comprises detection of an indication of a selected entity. Additionally or alternatively to one or more of the examples disclosed above, in some examples the alert criterion comprises detection of an indication of a selected time. Additionally or alternatively to one or more of the examples disclosed above, in some examples the alert criterion comprises detection of an indication of a selected event. Additionally or alternatively to one or more of the examples disclosed above, in some examples the alert criterion comprises detection of an indication of a selected topic. Additionally or alternatively to one or more of the examples disclosed above, in some examples the method further comprises, at the electronic device in communication with the display and the one or more input devices, presenting, via the display, a first affordance for selecting a secondary viewing screen and a second affordance for selecting a third content item for display in the selected secondary viewing screen, the third content item corresponding to the first content item being displayed in the primary viewing screen, while presenting the first affordance and second affordance, detecting selection of a first secondary viewing screen using the first affordance and detecting selection of a third content item using the second affordance, and in response to detecting selection of the first secondary viewing screen and the third content item, displaying the third content item in the first secondary viewing screen. Additionally or alternatively to one or more of the examples disclosed above, in some examples the first content item and the third content item are different views of a same scene. Additionally or alternatively to one or more of the examples disclosed above, in some examples the third content item is data corresponding to the first content item. Additionally or alternatively to one or more of the examples disclosed above, in some examples the method further comprises, at the electronic device in communication with the display and the one or more input devices, detecting user input at a first secondary viewing screen of the one or more secondary viewing screens, and in response to detecting the user input at the first secondary viewing screen, while the detected user input persists at the first secondary viewing screen, continuously increasing a size of the first secondary viewing screen. Additionally or alternatively to one or more of the examples disclosed above, in some examples the user input is a gaze. Additionally or alternatively to one or more of the examples disclosed above, in some examples detecting the user input comprises detecting, via the one or more input devices, a gesture performed by a representation of a hand within a threshold virtual distance of the first secondary screen. Additionally or alternatively to one or more of the examples disclosed above, in some examples the method further comprises, while the detected gaze persists at the first secondary viewing screen, continuously decreasing a size of the primary viewing screen. Additionally or alternatively to one or more of the examples disclosed above, in some examples the computer-generated environment is a three-dimensional (3D) environment, and wherein presenting the computer-generated environment comprises presenting the primary viewing screen and the one or more secondary viewing screens in a panoramic arrangement within the 3D environment. Additionally or alternatively to one or more of the examples disclosed above, in some examples the method further comprises, at the electronic device in communication with the display and the one or more input devices, presenting, via the display, a three-dimensional representation corresponding to the first content item, wherein the three-dimensional representation includes at least one of: representations of participants in a live event and a representation of a venue of the live event. Additionally or alternatively to one or more of the examples disclosed above, in some examples the method further comprises, while concurrently presenting the primary viewing screen and the one or more secondary viewing screens in the computer-generated environment, receiving an invitation to join a multi-user communication session with a user of a second electronic device, different from the electronic device, and in response to receiving the invitation, in accordance with a determination that the invitation is accepted by a user of the electronic device, entering the multi-user communication session with the user of the second electronic device, including concurrently displaying the primary viewing screen and the one or more secondary viewing screens in the computer-generated environment. Additionally or alternatively to one or more of the examples disclosed above, in some examples upon entering the multi-user communication session, control of the one or more secondary viewing screens is divided between the user of the electronic device and the user of the second electronic device. Additionally or alternatively to one or more of the examples disclosed above, in some examples the electronic device includes a head-mounted display. Some examples of the disclosure are directed to an electronic device comprising one or more processors, memory, and one or more programs stored in the memory and configured to be executed by the one or more processors, the one or more programs including instructions for performing a method according to one or more of the examples disclosed above. Some examples of the disclosure are directed to a non-transitory computer readable storage medium storing one or more programs, the one or more programs comprising instructions, which when executed by one or more processors of an electronic device, cause the electronic device to perform a method according to one or more of the examples disclosed above. Some examples of the disclosure are directed to an electronic device comprising one or more processors, memory, and means for performing a method according to one or more of the examples disclosed above.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:

at an electronic device in communication with a display generation component and one or more input devices:

displaying, via the display generation component, a three-dimensional environment including a primary viewing screen and one or more secondary viewing screens that are configured to display content items;

displaying a first content item in the primary viewing screen in the three- dimensional environment, without displaying a second content item, different from the first content item, in the primary viewing screen, and displaying one or more third content items in the one or more secondary viewing screens in the three-dimensional environment;

while displaying the first content item in the primary viewing screen and the one or more third content items in the one or more secondary viewing screens in the three-dimensional environment, detecting satisfaction of a first criterion for updating at least one of the first content item displayed in the primary viewing screen and the one or more third content items displayed in the one or more secondary viewing screens; and in response to detecting the satisfaction of the first criterion:

updating display of content of at least one of the first content item being displayed in the primary viewing screen and the one or more third content items being displayed in the one or more secondary viewing screens, without displaying the second content item in the primary viewing screen, while maintaining display of the one or more third content items in the one or more secondary viewing screens in the three-dimensional environment.

2. The method of claim 1, wherein detecting the satisfaction of the first criterion comprises detecting a user input at a first secondary viewing screen of the one or more secondary viewing screens; and in response to detecting the user input at the first secondary viewing screen, updating display of the first content item being displayed in the primary viewing screen by replacing display of the first content item in the primary viewing screen with a fourth content item being displayed in the first secondary viewing screen.

3. The method of claim 2, wherein in response to detecting the user input at the first secondary viewing screen, updating display of the fourth content item being displayed in the first secondary viewing screen by replacing display of the fourth content item in the first secondary viewing screen with the first content item.

4. The method of claim 2, wherein detecting the user input comprises detecting a gaze at the first secondary viewing screen for an amount of time exceeding a first threshold.

5. The method of claim 2, wherein detecting the user input comprises detecting, via the one or more input devices, a gesture performed by a representation of a hand within a threshold virtual distance of the first secondary viewing screen.

6. The method of claim 1, wherein detecting satisfaction of the first criterion comprises detecting satisfaction of an alert criterion; and in response to detecting satisfaction of the alert criterion, replacing display of the first content item with a different content item in the primary viewing screen.

7. The method of claim 6, wherein the alert criterion comprises detection of an indication of a selected person.

8. The method of claim 6, wherein the alert criterion comprises detection of an indication of a selected entity.

9. The method of claim 6, wherein the alert criterion comprises detection of an indication of a selected time.

10. The method of claim 6, wherein the alert criterion comprises detection of an indication of a selected event.

11. The method of claim 6, wherein the alert criterion comprises detection of an indication of a selected topic.

12. The method of claim 1, further comprising:

at the electronic device in communication with the display generation component and the one or more input devices:

displaying, via the display generation component, a first affordance for selecting a secondary viewing screen and a second affordance for selecting a fourth content item for display in the selected secondary viewing screen, the fourth content item corresponding to the first content item being displayed in the primary viewing screen;

while displaying the first affordance and second affordance, detecting selection of a first secondary viewing screen using the first affordance and detecting selection of a third content item using the second affordance; and in response to detecting selection of the first secondary viewing screen and the fourth content item, displaying the fourth content item in the first secondary viewing screen.

13. The method of claim 12, wherein the first content item and the fourth content item are different views of a same scene.

14. The method of claim 12, wherein the fourth content item is data corresponding to the first content item.

15. The method of claim 1, further comprising:

at the electronic device in communication with the display generation component and the one or more input devices:

detecting user input at a first secondary viewing screen of the one or more secondary viewing screens; and in response to detecting the user input at the first secondary viewing screen:

while the detected user input persists at the first secondary viewing screen, continuously increasing a size of the first secondary viewing screen.

16. The method of claim 15, wherein the user input is a gaze.

17. The method of claim 15, wherein detecting the user input comprises detecting, via the one or more input devices, a gesture performed by a representation of a hand within a threshold virtual distance of the first secondary viewing screen.

18. The method of claim 15, wherein the user input is a gaze, the method further comprising while the detected gaze persists at the first secondary viewing screen, continuously decreasing a size of the primary viewing screen.

19. The method of claim 1, wherein displaying the three-dimensional environment comprises displaying the primary viewing screen and the one or more secondary viewing screens in a panoramic arrangement within the three-dimensional environment.

20. The method of claim 1, further comprising:

at the electronic device in communication with the display generation component and the one or more input devices:

displaying, via the display generation component, a three-dimensional representation corresponding to the first content item, wherein the three-dimensional representation includes at least one of: representations of participants in a live event and a representation of a venue of the live event.

21. The method of claim 1, further comprising while concurrently displaying the primary viewing screen and the one or more secondary viewing screens in the three-dimensional environment, receiving an invitation to join a multi-user communication session with a user of a second electronic device, different from the electronic device; and in response to receiving the invitation:

in accordance with a determination that the invitation is accepted by a user of the electronic device, entering the multi-user communication session with the user of the second electronic device, including concurrently displaying the primary viewing screen and the one or more secondary viewing screens in the three-dimensional environment.

22. The method of claim 21, wherein upon entering the multi-user communication session, control of the one or more secondary viewing screens is divided between the user of the electronic device and the user of the second electronic device.

23. The method of claim 1, wherein the electronic device includes a head-mounted display.

24. An electronic device comprising:

one or more processors;

memory; and one or more programs stored in the memory and configured to be executed by the one or more processors, the one or more programs including instructions for causing the electronic device to:

display, via a display generation component, a three-dimensional environment including a primary viewing screen and one or more secondary viewing screens that are configured to display content items;

display a first content item in the primary viewing screen in the three-dimensional environment, without displaying a second content item, different from the first content item, in the primary viewing screen, and displaying one or more third content items in the one or more secondary viewing screens in the three-dimensional environment;

while displaying the first content item in the primary viewing screen and the one or more third content items in the one or more secondary viewing screens in the three-dimensional environment, detect satisfaction of a first criterion for updating at least one of the first content item displayed in the primary viewing screen and the one or more third content items displayed in the one or more secondary viewing screens; and in response to detecting the satisfaction of the first criterion:

update display of content of at least one of the first content item being displayed in the primary viewing screen and the one or more third content items being displayed in the one or more secondary viewing screens, without displaying the second content item in the primary viewing screen, while maintaining display of the one or more third content items in the one or more secondary viewing screens in the three-dimensional environment.

25. The electronic device of claim 24, wherein detecting the satisfaction of the first criterion comprises detecting a user input at a first secondary viewing screen of the one or more secondary viewing screens; and the instructions further cause the electronic device to, in response to detecting the user input at the first secondary viewing screen, update display of the first content item being displayed in the primary viewing screen by replacing display of the first content item in the primary viewing screen with a fourth content item being displayed in the first secondary viewing screen.

26. The electronic device of claim 25, wherein the instructions further cause the electronic device to, in response to detecting the user input at the first secondary viewing screen, update display of the fourth content item being displayed in the first secondary viewing screen by replacing display of the fourth content item in the first secondary viewing screen with the first content item.

27. The electronic device of claim 24, wherein detecting satisfaction of the first criterion comprises detecting satisfaction of an alert criterion; and the instructions further cause the electronic device to, in response to detecting satisfaction of the alert criterion, replace display of the first content item with a different content item in the primary viewing screen.

28. The electronic device of claim 27, wherein the alert criterion comprises detection of an indication of a selected entity.

29. The electronic device of claim 27, wherein the alert criterion comprises detection of an indication of a selected time.

30. The electronic device of claim 27, wherein the alert criterion comprises detection of an indication of a selected event.

31. The electronic device of claim 27, wherein the alert criterion comprises detection of an indication of a selected topic.

32. The electronic device of claim 24, wherein the instructions further cause the electronic device to:

display, via the display generation component, a first affordance for selecting a secondary viewing screen and a second affordance for selecting a fourth content item for display in the selected secondary viewing screen, the fourth content item corresponding to the first content item being displayed in the primary viewing screen;

while displaying the first affordance and second affordance, detect selection of a first secondary viewing screen using the first affordance and detecting selection of a fourth content item using the second affordance; and in response to detecting selection of the first secondary viewing screen and the fourth content item, display the fourth content item in the first secondary viewing screen.

33. The electronic device of claim 32, wherein the first content item and the fourth content item are different views of a same scene.

34. The electronic device of claim 24, wherein the instructions further cause the electronic device to:

detect user input at a first secondary viewing screen of the one or more secondary viewing screens; and in response to detecting the user input at the first secondary viewing screen:

while the detected user input persists at the first secondary viewing screen, continuously increase a size of the first secondary viewing screen.

35. The electronic device of claim 24, wherein displaying the three-dimensional environment comprises displaying the primary viewing screen and the one or more secondary viewing screens in a panoramic arrangement within the three-dimensional environment.

36. The electronic device of claim 24, wherein the instructions further cause the electronic device to:

display, via the display generation component, a three-dimensional representation corresponding to the first content item, wherein the three-dimensional representation includes at least one of: representations of participants in a live event and a representation of a venue of the live event.

37. A non-transitory computer readable storage medium storing one or more programs, the one or more programs comprising instructions, which when executed by one or more processors of an electronic device, cause the electronic device to:

display, via a display generation component, a three-dimensional environment including a primary viewing screen and one or more secondary viewing screens that are configured to display content items;

display a first content item in the primary viewing screen in the three-dimensional environment, without displaying a second content item, different from the first content item, in the primary viewing screen, and displaying one or more third content items in the one or more secondary viewing screens in the three-dimensional environment;

while displaying the first content item in the primary viewing screen and the one or more third content items in the one or more secondary viewing screens in the three-dimensional environment, detect satisfaction of a first criterion for updating at least one of the first content item displayed in the primary viewing screen and the one or more third content items displayed in the one or more secondary viewing screens; and in response to detecting the satisfaction of the first criterion:

update display of content of at least one of the first content item being displayed in the primary viewing screen and the one or more third content items being displayed in the one or more secondary viewing screens, without displaying the second content item in the primary viewing screen, while maintaining display of the one or more third content items in the one or more secondary viewing screens in the three-dimensional environment.

38. The non-transitory computer readable storage medium of claim 37, wherein:

detecting the satisfaction of the first criterion comprises detecting a user input at a first secondary viewing screen of the one or more secondary viewing screens; and the instructions further cause the electronic device to, in response to detecting the user input at the first secondary viewing screen, update display of the first content item being displayed in the primary viewing screen by replacing display of the first content item in the primary viewing screen with a fourth content item being displayed in the first secondary viewing screen.

39. The non-transitory computer readable storage medium of claim 38, wherein the instructions further cause the electronic device to, in response to detecting the user input at the first secondary viewing screen, update display of the fourth content item being displayed in the first secondary viewing screen by replacing display of the fourth content item in the first secondary viewing screen with the first content item.

40. The non-transitory computer readable storage medium of claim 37, wherein detecting satisfaction of the first criterion comprises detecting satisfaction of an alert criterion; and the instructions further cause the electronic device to, in response to detecting satisfaction of the alert criterion, replace display of the first content item with a different content item in the primary viewing screen.

41. The non-transitory computer readable storage medium of claim 40, wherein the alert criterion comprises detection of an indication of a selected entity.

42. The non-transitory computer readable storage medium of claim 40, wherein the alert criterion comprises detection of an indication of a selected time.

43. The non-transitory computer readable storage medium of claim 40, wherein the alert criterion comprises detection of an indication of a selected event.

44. The non-transitory computer readable storage medium of claim 40, wherein the alert criterion comprises detection of an indication of a selected topic.

45. The non-transitory computer readable storage medium of claim 37, wherein the instructions further cause the electronic device to:

display, via the display generation component, a first affordance for selecting a secondary viewing screen and a second affordance for selecting a fourth content item for display in the selected secondary viewing screen, the fourth content item corresponding to the first content item being displayed in the primary viewing screen;

while displaying the first affordance and second affordance, detect selection of a first secondary viewing screen using the first affordance and detect selection of a fourth content item using the second affordance; and in response to detecting selection of the first secondary viewing screen and the fourth content item, display the fourth content item in the first secondary viewing screen.

46. The non-transitory computer readable storage medium of claim 45, wherein the first content item and the fourth content item are different views of a same scene.

47. The non-transitory computer readable storage medium of claim 37, wherein the instructions further cause the electronic device to:

detect user input at a first secondary viewing screen of the one or more secondary viewing screens; and in response to detecting the user input at the first secondary viewing screen:

while the detected user input persists at the first secondary viewing screen, continuously increase a size of the first secondary viewing screen.

48. The non-transitory computer readable storage medium of claim 37, wherein displaying the three-dimensional environment comprises displaying the primary viewing screen and the one or more secondary viewing screens in a panoramic arrangement within the three-dimensional environment.

49. The non-transitory computer readable storage medium of claim 37, wherein the instructions further cause the electronic device to:

display, via the display generation component, a three-dimensional representation corresponding to the first content item, wherein the three-dimensional representation includes at least one of: representations of participants in a live event and a representation of a venue of the live event.

* * * * *